(12) United States Patent
Ikeda et al.

(10) Patent No.: US 7,604,338 B2
(45) Date of Patent: Oct. 20, 2009

(54) INK JET RECORDING MEDIUM

(75) Inventors: Kenji Ikeda, Shizuoka-ken (JP);
Kousaku Yoshimura, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 78 days.

(21) Appl. No.: 10/824,526

(22) Filed: Apr. 15, 2004

(65) Prior Publication Data
US 2004/0207702 A1 Oct. 21, 2004

(30) Foreign Application Priority Data
Apr. 16, 2003 (JP) ............................ 2003-111465

(51) Int. Cl.
*C09D 11/00* (2006.01)
(52) U.S. Cl. .................. 347/100; 106/31.13
(58) Field of Classification Search ................. 347/100; 106/31.13
See application file for complete search history.

(56) References Cited

U.S. PATENT DOCUMENTS

| | | | | |
|---|---|---|---|---|
| 5,955,185 A | * | 9/1999 | Yoshino et al. | 428/32.33 |
| 6,620,470 B2 | * | 9/2003 | Nojima et al. | 428/32.34 |
| 2001/0028382 A1 | * | 10/2001 | Ichinose | 347/105 |
| 2002/0045035 A1 | * | 4/2002 | Nojima et al. | 428/195 |
| 2002/0174805 A1 | * | 11/2002 | Terase et al. | 106/737 |

FOREIGN PATENT DOCUMENTS

| | | | |
|---|---|---|---|
| JP | 58-45272 A | | 3/1983 |
| JP | 2-31673 B2 | | 7/1990 |
| JP | 2-276670 A | | 11/1990 |
| JP | 6-340835 A | | 12/1994 |
| JP | 7-268254 A | | 10/1995 |
| JP | 2001-246841 A | | 9/2001 |
| JP | 2002-161225 A | | 6/2002 |
| JP | 2003073598 A | * | 3/2003 |

* cited by examiner

*Primary Examiner*—Manish S Shah
*Assistant Examiner*—Laura E Martin
(74) *Attorney, Agent, or Firm*—Sughrue Mion, PLLC

(57) ABSTRACT

An ink jet recording method for recording on an ink jet recording medium including a support and a colorant receiving layer provided on the support having a porous structure containing at least polymer fine particles, using an ink composition including a colored fine particle dispersion containing at least one kind of hydrophobic dye, at least one kind of hydrophobic polymer and at least one kind of organic solvent having a high boiling point, wherein a void volume per unit thickness (A/B) of the colorant receiving layer calculated by dividing a void volume A ($\times 10^{-5}$ ml/cm$^2$) of the colorant receiving layer at a void diameter equal to a particle size of the polymer fine particles obtained from a pore distribution curve by a nitrogen gas adsorption method, by a dry film thickness B (μm) of the colorant receiving layer is 2.0 ($\times 10^{-5}$ ml/cm$^2$/μm) or more.

17 Claims, 2 Drawing Sheets

INK JET RECORDING MEDIUM

CROSS-REFERENCE TO RELATED APPLICATION

This application claims priority under 35 USC 119 from Japanese Patent Application No. 2003-111465 the disclosure of which is incorporated by reference herein.

BACKGROUND OF THE INVENTION

1. Field of the Invention

The present invention relates to an ink jet recording method, and more particularly, to an ink jet recording method that reduces nozzle clogging, is excellent in discharge stability, and is excellent in ink absorptivity, print density, bleeding resistance over time, light fastness and the like.

2. Description of the Related Art

Recently, with rapid development of the information technological industry, various information processing systems have been developed, and recording methods and recording apparatuses suitable for the information processing systems have also been developed, and respectively put into practical use. Of these recording methods, ink jet recording methods are widely used for both home and office use due to the fact that recording can be performed on various recording materials, and that the hardware (apparatus) thereof is relatively inexpensive and compact and has quiet operation.

In addition, with the increase in resolution of recent ink jet printers, it has also become possible to obtain a so-called photographic level high image quality recorded product, and with such advances in hardware (apparatus), recording media for ink jet recording have also been variously developed.

Desirable properties for recording media for ink jet recording generally include: (1) a quick drying property (high absorption speed of ink), (2) appropriate and uniform diameters of ink dots (no occurence of bleeding), (3) excellent granularity, (4) high circularity of dots, (5) high color density, (6) high saturation (no occurence of dullness), (7) excellent water resistance, light fastness and ozone resistance of printed portion, (8) high whiteness of recording media, (9) excellent storability of recording media (no yellowing even in storage for long period of time, no occurence of color bleeding of images in storage for a long period of time (excellent color-edge definition over a long period of time)), (10) no tendency of deform and excellent dimensional stability (a sufficiently small amount of curling), (11) excellent running property in hardware.

In the application of photographic glossy paper used for the purpose of obtaining a so-called photographic level high image quality recorded product, glossiness, surface smoothness, photographic paper-like feeling similar to that of silver salt photographs and the like are also required, in addition to the various properties mentioned above.

In order to satisfy such requirements, a wide variety of types of recording media have been conventionally proposed. For example, in order to obtain excellent absorptivity, color forming property, resolution and the like, Japanese Patent Application Laid-Open (JP-A) No. 2-276670 proposes a recording medium having a porous layer containing inorganic particles (alumina hydrate or the like) on a substrate. JP-A No. 4-101880 proposes a recording medium having an ink fixation layer constituted of a transparent resin which is dissolved or swollen by a solvent in the ink, on a substrate. Further, Japanese Patent Application Publication (JP-B) No. 2-18146 and JP-B No. 2-31673 propose recording media having thermoplastic resin particles, an emulsion and latex on a substrate.

Japanese Patent Application Laid-Open (JP-A) No. 9-99634 proposes a recording medium containing a polymer complex obtained by mixing a binder and organic particles once they have been dissolved, whose receiving layer contains a polymer complex composed of a basic polymer and a styrene/(meth) acrylic acid polymer. JP-A No. 9-156211 proposes a recording medium having a transparent support carrying thereon an ink receiving layer made of a water-soluble resin and cross-linked polymer fine particles having an average particle size of 200 nm or less, and having a sheet permeability of 80% or more. JP-A 10-324053 proposes a recording medium having a porous coating layer formed of a coating auxiliary and an emulsion containing nitrates of carboxycellulose.

However, while such conventional technologies improve various abilities of the recording media such as ink absorptivity, resolution, image density, transparency, and glossiness of images formed of the recording media, even in the case of these recording media, several problems occur when high quality images comparable to silver salt photographs are printed at high speed, due to remarkable progress of recent recording apparatus (hardware).

For example, a recording medium having a porous layer composed of inorganic particles (alumina hydrate or the like) formed on the surface of the medium, disclosed in JP-A No. 2-276670, has excellent image quality and glossiness. However, its surface is easily scratched, whereby, the medium tends to be scratched during conveyance depending on the conveying method in a printer. Further, because of a combination of inorganic particles and an organic resin, when the combination is applied to a transparency type sheet such as an OHP film or the like, even if the transparency is high and the haze value is relatively low, there is a problem in that the shadow of the sheet is projected.

In the case of a recording medium having an ink fixation layer using a resin which is dissolved or swollen in a solvent for an ink such as described in JP-A No. 4-101880, there is a problem in that in ink drying speed is slow, and the medium remains sticky for a while after recording. Further, there is also a problem in that sufficient water resistance of the ink receiving layer itself cannot be obtained, and migration of a dye occurs under the influence of humidity. Furthermore, due to lack of water resistance of ink receiving layer itself, there is also a problem in that when recording is carried out using a pigment as a colorant, cracks form at printed parts (particularly, at solid portions).

In the case of a recording medium having an ink receiving layer composed of thermoplastic resin particles, emulsion and latex formed on a substrate such as recording media described in Japanese Patent Application Publication (JP-B) Nos. 2-18146 and 2-31673, there is a problem in that since the medium utilizes only the gaps between thermoplastic resin particles, although the ink absorption speed is high, it is necessary to increase the thickness of an ink receiving layer to obtain sufficient ink absorbing ability, resulting in a decrease in the transparency and strength of the layer.

In the case of a recording medium having an ink receiving layer composed of a combination of a binder and organic particles as provided in JP-A No. 9-99634, a binder and organic particles are first dissolved in a solvent and then mixed to obtain a polymer complex which is used to form an ink receiving layer. Under this constitution, sufficient cavities are not formed in the ink receiving layer, and sufficient ink absorption speed cannot be expected.

In the case of a recording medium having an ink receiving layer composed of a water-soluble resin and cross-linked polymer fine particles having an average particle size of 200 nm or less formed on a transparent support, as described in JP-A No. 9-156211, since a water-soluble resin is used as a binder, sufficient gaps cannot be formed among the fine particles. Additionally, since a water-soluble resin is mixed in a high ratio of 1:1 to 1:10 based on the fine particles, it is difficult to increase ink absorption speed in the gaps.

In the case of a recording medium having a porous coating layer formed of a coating auxiliary and an emulsion containing nitrates of carboxy cellulose as described in JP-A No. 10-324053, gaps are formed among the emulsion particles. However, it is difficult to control a pH value in the porous coating layer, and when the pH value is low in the acidic range, a dye undergoes specific aggregation after printing with the ink, sometimes resulting in a color tone different from that of a conventional dye.

Known ink compositions for ink jet recording include oil-based inks, aqueous inks, and solid inks. Aqueous inks are preferable from the viewpoints of production suitability, handling property, odor, and safety. However, most aqueous inks exhibit a lack of water resistance since the dye is water-soluble and cause bleed in printing on normal paper to deteriorate printing quality, and these inks also have poor light fastness. Further, "photographic level image quality paper" having an ink receiving layer containing porous inorganic fine particles provided on the surface of the paper has a drawback in that image storability is poor due to the influence of an oxidizing gas.

Aqueous inks using a pigment or a disperse dye for the purpose of solving aforementioned these problems are proposed, for example, in JP-A Nos. 56-157468, 4-18468, 10-110126 and 10-195355. However, in the case of these aqueous inks, there are problems in that water resistance is not sufficient (although it is improved to a certain extent), the storage stability of a dispersion of the pigment or the disperse dye in the aqueous ink is low, and clogging at ink discharge ports tends to occur. Further, the photographic level image quality paper also has a problem in that the ink using the pigment or the dye shows poor permeability into the paper, and the pigment and the dye are easily peeled from the surface when rubbed with fingers.

For example, JP-A Nos. 58-45272, 6-340835, 7-268254, 7-268257 and 7-268260 provide a method of enclosing a dye in urethane or polyester dispersion particles. However, in the case of an ink jet ink obtained by this method, the color tone is insufficient, color reproducibility is not sufficient, and color fading resistance is also insufficient. In the case of printing on photographic level image quality paper, abrasion resistance to a rubber eraser and the like is not satisfactory.

As described above, an ink jet recording method which exhibits an excellent handling property, odorlessness and safety, and at the same time, has a small dispersed particle size and has excellent storage stability and stability of a dispersion over time, and which therefore, when applied to an ink composition, provides excellent ink ejecting stability with no clogging at the nozzle, shows no paper-dependency, and is excellent in color forming property and color tone (hue), and which, even when the photographic level image quality paper is used, shows excellent ink permeability, provides excellent water resistance and light fastness after printing, and particularly excellent image storability and abrasion resistance, and enables recording of high image quality at high density, has not yet been provided to date.

SUMMARY OF THE INVENTION

The present invention has been accomplished in view of such conditions, and a subject thereof is to solve the conventional problems and to attain the following objects.

An object of the invention is to provide an ink jet recording method which is suitable for thermal, piezoelectric, electric field and acoustic ink jet modes, has excellent handling property, and safety, has a small particle size of dispersed particles and, has excellent storage stability and dispersion stability of a dispersion, particularly, causes little clogging at the nozzle tip, and provides a colorant receiving layer having a porous structure optimized by polymer fine particles (latex), shows excellent ink absorptivity, and manifests excellent print density, bleeding resistance over time and light fastness.

Another object of the invention is attained by ink jet recording method for recording on an ink jet recording medium including a support and a colorant receiving layer provided on the support having a porous structure containing at least polymer fine particles, using an ink composition including a colored fine particle dispersion containing at least one kind of hydrophobic dye, at least one kind of hydrophobic polymer and at least one kind of organic solvent having a high boiling point, wherein a void volume per unit thickness (A/B) of the colorant receiving layer calculated by dividing a void volume $A$ ($\times 10^{-5}$ ml/cm$^2$) of the colorant receiving layer at a void diameter equal to a particle size of the polymer fine particles obtained from a pore distribution curve by a nitrogen gas adsorption method, by a dry film thickness $B$ (μm) of the colorant receiving layer is 2.0 ($\times 10^{-5}$ ml/cm$^2$/μm) or more.

DETAILED DESCRIPTION OF THE INVENTION

Figure 1:
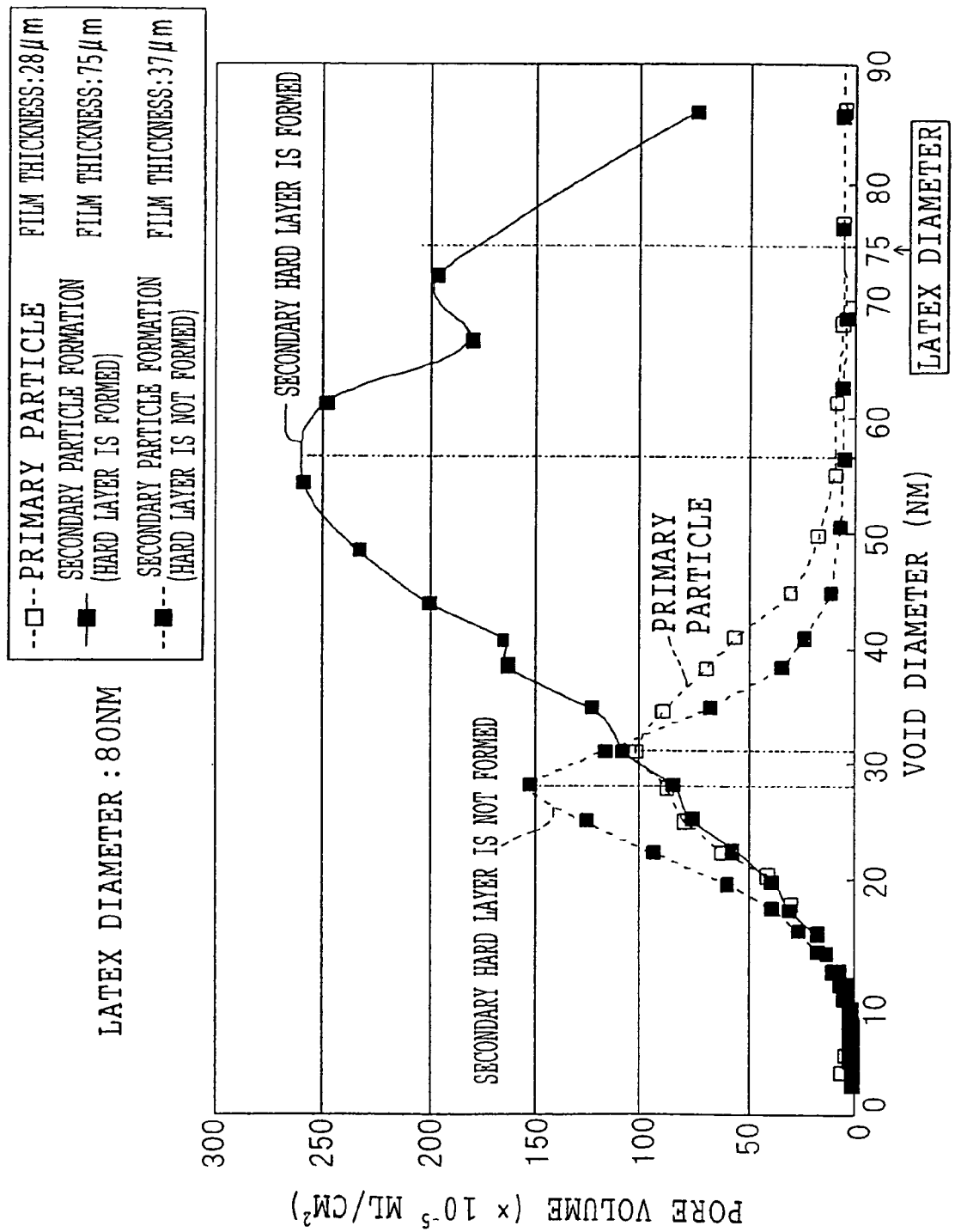
FIG. 1 is a graph showing a pore distribution curve of an ink jet recording sheet.

The ink composition containing a colored fine particle dispersion of the present invention contains at least one kind of hydrophobic dye, at least one kind of hydrophobic polymer and at least one kind of organic solvents having a high boiling point, and depending on the object and necessity, other components and additives and the like appropriately selected can be contained in the composition.

First, the main components constituting the ink composition used in the invention will be described in detail below.

(Hydrophobic Dye)

The hydrophobic dye which is one of components constituting the colored fine particle dispersion of the invention means a dye substantially insoluble in water. Specifically, it indicates a dye having a solubility in water at 25° C. (mass of dye soluble in 100 g of water) of 1 g or less, preferably 0.5 g or less, more preferably 0.1 g or less. Therefore, the hydrophobic dye means a so-called water-insoluble pigment and oil-based dye, and among them, an oil-based dye is preferable.

As the hydrophobic dye, dyes having a melting point of 200° C. or less is preferable, dye having a melting point of 150° C. or less is more preferable, dyes having a melting point of 100° C. or less is further preferable. By use of a hydrophobic dye having a low melting point, precipitation of the crystal of the dye in a colored fine particle dispersion and ink composition is suppressed, and the storage stability of the ink composition is improved.

In the colored fine particle dispersion and ink composition of the invention, hydrophobic dyes may be used singly or in combination of two or more. If necessary, other coloring materials such as water-soluble dyes, disperse dyes and pigments may be contained in amount not disturbing the effect of the invention.

Examples of the hydrophobic dye usable in the colored fine particle dispersion and ink composition of the invention include anthraquinone, naphthoquinone, styryl, indoaniline, azo, nitro, coumarine, methine, porphyrin, azaporphyrin and phthalocyanine-based dyes. For completion as an ink jet ink for full color printing, at least four dyes of three primary colors of yellow (Y), magenta (M) and cyan (C), and black added thereto, are usually necessary.

Among hydrophobic dyes usable in the invention, any yellow dyes can be used. Examples thereof include aryl or heteryl azo dyes having phenols, naphthols, anilines, pyrazolones, pyridones, open chain type active methylene compounds as coupling components; azomethine dyes having open chain type active methylene compounds as coupling components; methine dyes such as benzylidene dyes, monomethineoxonol dyes; quinone-based dyes such as naphthoquinone dyes, anthraquinone dyes. Examples of dye species other than them are quinophthalone dyes, nitro and nitroso dyes, acridine dyes and acridinone dyes.

Among hydrophobic dyes usable in the invention, any magenta dyes can be used. Examples thereof include aryl or heteryl azo dyes having phenols, naphthols, anilines as coupling components; azomethine dyes having pyrazolones, pyrazolotriazoles as coupling components; methine dyes such as arylidene dyes, styryl dyes, merocyanine dyes, oxonol dyes; carbonium dyes such as diphenylmethane dyes, triphenylmethanes, xanthene dyes; quinone-based dyes such as naphthoquinone, anthraquinone, anthrapyridone; condensed polycyclic dyes such as dioxadine dyes.

Among hydrophobic dyes usable in the invention, any cyan dyes can be used. Examples thereof include indoaniline dyes, indophenol dyes or azomethine dyes having pyrrolotriazoles as coupling components; polymethine dyes such as cyanine dyes, oxonol dyes, merocyanine dyes; carbonium dyes such as diphenymethane dyes, triphenylmethanes, xanthene dyes; phthalocyanine dyes: anthraquinone dyes; aryl or heterylazo dyes having phenols, naphthols, anilines as coupling components; indigo and thioindigo dyes.

The dye may be that which does not exhibit a color of yellow, magenta and cyan until partial dissociation of achromophore, and the counter cation in this case may be an inorganic cation such as alkali metal and ammonium, or an organic cation such as pyridinium, quaternary ammonium salt, further, a polymer cation having them as a partial structure.

Among the hydrophobic dyes, preferable specific examples thereof include, but not limited to, the following compounds.

For example, C. I. Solvent Black 3, 7, 27, 29 and 34; C. I. Solvent Yellow 14, 16, 19, 29, 30, 56, 82, 93 and 162; C. I. Solvent Red 1, 3, 8, 18, 24, 27, 43, 49, 51, 72, 73, 109, 122, 132 and 218; C. I. Solvent Violet 3; C. I. Solvent Blue 2, 11, 25, 35, 38, 67 and 70; C. I. Solvent Green 3 and 7; C. I. Solvent Orange 2; and the like.

Among them, Nubian Black PC-0850, Oil Black HBB, Oil Yellow 129, Oil Yellow 105, Oil Pink 312, Oil Rd 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.), Neopen Yellow 075, Neopen Mazenta SE 1378, Neopen Blue 808, Neopen Blue FF 4012, Neopen Cyan FF 4238 (manufactured by BASF Japan Ltd.) and the like are preferable.

In the invention, a disperse dye can also be used in amount dissolvable in a non-water-miscible organic solvent, and preferable specific examples thereof include, but not limited to, the following compounds.

For example, C. I. Disperse Yellow 5, 42, 54, 64, 79, 82, 83, 93, 99, 100, 119, 122, 124, 126, 160, 184:1, 186, 198, 199, 201, 204, 224 and 237; C. I. Disperse Orange 13, 29, 31:1, 33, 49, 54, 55, 66, 73, 118, 119 and 163; C. I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C. I. Disperse Green 6:1 and 9, and the like are preferable.

Among the hydrophobic dyes, compounds represented by the following general formula (I) (azo dyes) and compounds represented by the following general formula (II) (azomethine dyes) are suitably listed. Azomethine dyes represented by the following general formula (II) are known as dyes generated from a coupler and developing agent by oxidization, in photographic materials.

Compounds represented by the general formula (I) and general formula (II) will be described below, and preferable are compounds in which at least one of groups in the following general formula (I) and general formula (II) is selected from preferable range shown below, more preferable are compounds in which more groups are selected from the preferable range, and particularly preferable are compounds in which all groups are selected from the preferable range.

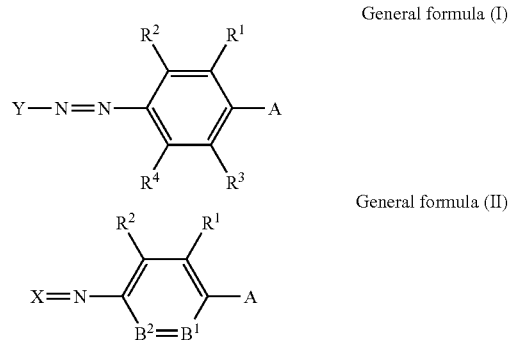

In the general formula (I) and general formula (II), $R^1$, $R^2$, $R^3$ and $R^4$ each independently represents a hydrogen atom, halogen atom, aliphatic group, aromatic group, heterocyclic group, cyano group, hydroxy group, nitro group, amino group, alkylamino group, alkoxy group, aryloxy group, amide group, arylamino group, ureide group, sulfamoylamino group, alkylthio group, arylthio group, alkoxycarbonylamino group, sulfoneamide group, carbamoyl group, sulfamoyl group, sulfonyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, sulfinyl group, phosphoryl group, acyl group, carboxyl group, or sulfo group.

Among them, $R^2$ represents preferably a hydrogen atom, halogen atom, aliphatic group, alkoxy group, aryloxy group, amide group, ureide group, sulfamoylamino group, alkoxycarbonylamino group or sulfonamido group.

In the general formula (I) and general formula (II), A represents —$NR^5R^6$ or hydroxyl group. A preferably represents —$NR^5R^6$.

The $R^5$ and $R^6$ each independently represents a hydrogen atom, aliphatic group, aromatic group or heterocyclic group. Among them, the $R^5$ and $R^6$ preferably represent each independently a hydrogen atom, alkyl group or substituted alkyl group, or aryl group or substituted aryl group, and most preferably a hydrogen atom, alkyl group having 1 to 18 carbon atoms, or substituted alkyl group having 1 to 18 carbon atoms. $R^5$ and $R^6$ may mutually bond to form a ring.

In the general formula (II), $B^1$ represents =$C(R^3)$— or =N—. $B^2$ represents —$C(R^4)$= or —N=. It is preferable that $B^1$ and $B^2$ do not simultaneously represent —N=, and it is more preferable that $B^1$ represents =$C(R^3)$— and $B^2$ represents —$C(R^4)$=.

In the general formula (I) and the general formula (II), $R^1$ and $R^5$, $R^3$ and $R^6$, and/or $R^1$ and $R^2$ may mutually bond to form an aromatic ring or heterocyclic ring.

In the present specification, the aliphatic group means an alkyl group, substituted alkyl group, alkenyl group, substituted alkenyl group, alkynyl group, substituted alkynyli group, aralkyl group or substituted aralkyl group.

The aliphatic group may be branched or cyclic. The number of carbon atoms in the aliphatic group is preferably from 1 to 20, and more preferably from 1 to 18.

The aryl moiety of the aralkyl group and substituted aralkyl group is preferably a phenyl group or naphthyl group, and more preferably a phenyl group.

As the substituent of the alkyl part in the substituted alkyl group, substituted alkenyl group, substituted alkynyl group and substituted aralkyl group, the same groups as examples of the substituents mentioned for $R^1$, $R^2$, $R^3$ and $R^4$ are listed.

As the substituent of the aryl moiety in the substituted aralkyl group, the same groups as examples of the substituents on the substituted aryl group described below are listed.

In the present specification, the aromatic group means an aryl group or substituted aryl group. As the aryl group, a phenyl group and naphthyl group are preferable and a phenyl group is more preferable.

The aryl moiety on the substituted aryl group is the same as in the case of the aryl group.

As the substituent on the substituted aryl group, the same groups as examples of the substituents mentioned for $R^1$, $R^2$, $R^3$ and $R^4$ are listed.

In the general formula (I), Y represents a unsaturated heterocyclic group. Y is preferably a 5 or 6-membered unsaturated heterocyclic ring. On the heterocyclic ring, an aliphatic ring, aromatic ring or other heterocyclic ring may be condensed. Examples of the hetero atom in the heterocyclic ring include N, O and S.

Preferable examples of the unsaturated heterocylic ring include a pyrazole ring, imidazole ring, thiazole ring, isothiazole ring, thiadiazole ring, thiophene ring, benzothiazole ring, benzooxazole ring, benzoisothiazole ring, pyrimidine ring, pyridine ring and quinoline ring. The unsaturated heterocyclic ring may have a substituent mentioned for $R^1$ to $R^4$.

In the general formula (II), X represents a moiety of a color photographic coupler. As the coupler, the following couplers are preferable.

Examples of the yellow dye-forming coupler include couplers represented by the general formulae (I) and (II) in U.S. Pat. Nos. 3,933,501, 4,022,620, 4,326,024, 4,401,752, 4,248, 961, JP-B No. 58-10739, U.K. Patent Nos. 1,425,020, 1,476, 760, U.S. Pat. Nos. 3,973,968, 4,314,023, 4,511,649, EP Nos. 249,473A, 502,424A, couplers (particularly, Y-28 in page 18) of the formulae (I) and (II) in EP No. 513,496A, couplers represented by the general formula (I) in claim 1 of EP No. 568,037A, couplers represented by the general formula (I) in U.S. Pat. No. 5,066,576, column 1, lines 45 to 55, couplers represented by the general formula (I) in JP-A No. 4-274425, paragraph 0008, couplers (particularly, D-35 in page 18) described in EP No. 498,381A1, p. 40, claim 1, couplers (particularly, Y-1 (p. 17), Y-54 (p. 41)) represented by the general formula (Y) in EP No. 447,969A1, p. 4, couplers (particularly, II-17, 19 (column 17), II-24 (column 19)) of the formulae (II) to (IV) in U.S. Pat. No. 4,476,219, column 7, lines 36 to 58.

Examples of the magenta dye-forming coupler include U.S. Pat. Nos. 4,310,619, 4,351,897, EP No. 73,636, U.S. Pat. Nos. 3,061,432, 3,725,067, Research Disclosure Nos. 24220 (June, 1984), 24230 (June, 1984), JP-A Nos. 60-33552, 60-43659, 61-72238, 60-35730, 55-118034, 60-185951, U.S. Pat. Nos. 4,500,630, 4,540,654, 4,556,630, International Publication WO 88/04795, JP-A Nos. 3-39737 (L-57 (p. 11, right lower), L-68 (p. 12, right lower), L-77 (p. 13, right lower), EP No. 456,257 [A-4]-63 (p. 134), [A-4]-73, -75 (p. 139), EP No. 486,965, M-4, -6 (p. 26), M-7 (p. 27), EP No. 571,959A, M-45 (p. 19), JP-A No. 5-204106, (M–1) (p. 6), JP-A No. 4-362631, paragraph 0237, M-22, and the like.

Examples of the cyan dye-forming coupler include CX-1, 3, 4, 5, 11, 12, 14, 15 (pp. 14 to 16) in U.S. Pat. Nos. 4,052, 212, 4,146,396, 4,228,233, 4,296,200, EP No. 73,636, JP-A No. 4-204843; C-7, 10 (p. 35), 34, 35 (p. 37), (1-1), (1-17) (pp. 42 to 43) of JP-A No. 4-43345; couplers represented by the general formula (Ia) or (Ib) in JP-A No. 6-67385, claim 1, and the like.

In addition, couplers described in JP-A Nos. 62-215272 (p. 91), 2-33144 (p. 3, p. 30), EP 355,660A (p. 4, p. 5, p. 45. p. 47) are also useful.

Among the dyes represented by the general formula (I), dyes represented by the following general formula (III) are particularly preferable as the magenta dye.

General formula (III)

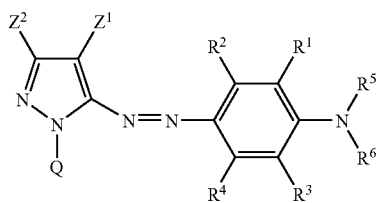

In the general formula (III), $Z^1$ represents an electron attractive group having a Hammett's substituent constant $\sigma_p$ value of 0.20 or more. As $Z^1$, an electron attractive group having a $\sigma_p$ value of 0.30 or more and 1.0 or less is preferable. As the preferable specific substituent, electron attractive substituents described later are listed, and among them, acyl groups having 2 to 12 carbon atoms, alkyloxycarbonyl groups having 2 to 12 carbon atoms, nitro group, cyano group, alkylsulfonyl groups having 1 to 12 carbon atoms, arylsulfonyl groups having 6 to 18 carbon atoms, carbamoyl groups having 1 to 12 carbon atoms and halogenated alkyl groups having 1 to 12 carbon atoms are more preferable, and a cyano group, alkylsulfonyl groups having 1 to 12 carbon atoms and arylsulfonyl groups having 6 to 18 carbon atoms are further preferable, and a cyano group is particularly preferable.

$R^1$ to $R^6$ are as defined in the general formula (I). $z^2$ represents a hydrogen atom, aliphatic group or aromatic group.

Q represents a hydrogen atom, aliphatic group, aromatic group or heterocyclic group. Among them, as Q, groups composed of non-metal atoms necessary for forming 5- to 8-membered rings are preferable, and aromatic groups or heterocyclic groups are more preferable. The 5- to 8-membered rings may be substituted, and may be saturated or have an unsaturated bond. As the non-metal atoms, a nitrogen atom, oxygen atom, sulfur atom or carbon atom is preferable.

Examples of the 5- to 8-membered rings include a benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzoimidazole ring, oxazole ring, benzooxazole ring, oxane ring, sulfolane ring and thian ring are suitably listed, and when these rings have further a substituent, the groups exemplified for $R^1$ to $R^4$ are preferable as the substituent.

The preferable structures of dyes represented by the general formula (III) are described in JP-A No. 2001-335714.

Among dyes represented by the general formula (II), dyes represented by the following general formula (IV) are particularly preferable as the magenta dye.

General formula (IV)

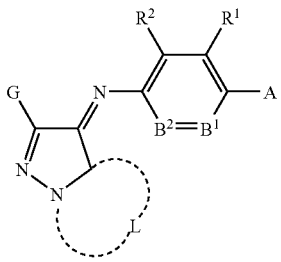

In the general formula (IV), G represents a hydrogen atom, aliphatic group, aromatic group, heterocyclic group, cyano group, alkoxy group, aryloxy group, alkylthio group, arylthio group, ester group, amino group, carbamoyl group, sulfonyl group, sulfamoyl group, ureide group, urethane group, acyl group, amide group or sulfoneamide group.

$R^1$, $R^2$, A, $B^1$ and $B^2$ are as defined for the general formula (II) and preferable range thereof is also the same as for the general formula (II).

L represents an atom group forming a 5- or 6-membered nitrogen-containing heterocyclic ring, and the atom group forming the nitrogen-containing heterocyclic ring may be substituted with at least one of aliphatic groups, aromatic groups, heterocyclic groups, cyano group, alkoxy groups, aryl groups, oxy group, alkylthio groups, arylthio groups, ester groups, amino groups, carbamoyl groups, sulfonyl groups, sulfamoyl groups, ureide group, urethane group, acyl group, amide group and sulfoneamide group, and may further form a condensed ring with other ring.

In dyes represented by the general formula (IV), A is preferably —$NR^5R^6$, and L is preferably one forming a 5-membered nitrogen-containing heterocyclic ring, and preferable examples of the 5-membered nitrogen-containing heterocyclic include an imidazole ring, triazole ring and tetrazole ring.

Among dyes represented by the general formula (I) and the general formula (II), compounds (M–1 to M70) described in Japanese Patent Application No. 2002-10361 are suitably listed as exemplary compounds of the magenta dye, however, the scope of the invention is not limited to them.

Compounds usable in the invention are described in Japanese Patent Application No. 11-365187, JP-A Nos. 2001-181549, 2001-335714, in addition to the exemplified compounds, however, the compounds are not limited to them.

Dyes represented by the general formula (III) in the invention can be synthesized referring to methods described, for example, in JP-A Nos. 2001-335714, 55-161856.

Dyes represented by the general formula (IV) in the invention can be synthesized referring to methods described, for example, in JP-A No. 4-126772, JP-B No. 7-94180 and JP-A No. 2001-240763.

Among dyes represented by the general formula (II), pyrrolotriazoleazomethine dyes represented by the following general formula (V) are particularly preferable as the cyan dye.

General formula (V)

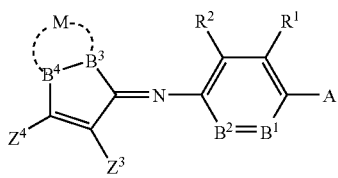

In the general formula (V), A, $R^1$, $R^2$, $B^1$ and $B^2$ are as defined for the general formula (II), and preferable range thereof is also as defined for the general formula (II).

$Z^3$ and $Z^4$ each independently represents the same as G in the general formula (IV). $Z^3$ and $Z^4$ may mutually bond to form a ring structure.

M is an atom group capable of forming a 1,2,4-triazole ring condensed with a 5-membered ring represented by the general formula (V), and one of two atoms $B^3$ and B4 at the condensed part is a nitrogen atom and another is a carbon atom.

Further, among pyrrolotriazoleazomethine dyes represented by the general formula (V), those in which $Z^3$ represents an electron attractive group having a Hammett's substituent constant $\sigma_p$ value of 0.30 or more are preferable due to a sharp absorption characteristic, those in which $Z^3$ represents an electron attractive group having a Hammett's substituent constant $\sigma_p$ value of 0.45 or more are further preferable, and those in which $Z^3$ represents an electron attractive group having a Hammett's substituent constant $\sigma_p$ value of 0.60 or more are particularly preferable.

Those in which the sum of the Hammett's substituent constant $\sigma_p$ values in $Z^3$ and $Z^4$ is 0.70 or more manifests an excellent color hue as the cyan color and is most preferable.

The pyrrolotriazoleazomethine dye represented by the general formula (V) can be used as a magenta dye by changing a substituent, however, this dye is preferably used as a cyan dye.

Here, the Hammett's substituent constant $\sigma_p$ value used in the present specification will be described.

The Hammett's law is an empirical law provided by L. P. Hammett in 1935, to quantitatively discuss the influence by a substituent on reaction or equilibrium of a benzene derivative, and its validity is widely appreciated now.

The substituent constant defined in the Hammett law includes a $\sigma_p$ value and a $\sigma_m$ value, and these values are found in a lot of general books, and these are described in detail in, for example, J. A. Dean ed., "Lange's Handbook of Chemistry", vol. 12, 1979 (McGraw-Hill) and "Chemical Region", special number, No. 122, pp. 96 to 103, 1979 (Nankodo).

In the invention, substituents are limited and explained by Hammett's substituent constant σp, however, this does not mean that literature-known values found in the books are limited to only certain substituents, and it is needless to say that even if the value is not known in literatures, substituents having a value which would be involved in its range when measured based on Hammett law are also included.

The general formula (I) to the general formula (V) of the invention include those other than benzene derivatives, and the $\sigma_p$ value is used as a measure showing the electronic effect of a substituent, irrespective of substitution position. Therefore, in the invention, the $\sigma_p$ value is used in such meaning.

Examples of the electron attractive group having a Hammett's substituent constant $\sigma_p$ value of 0.60 or more include a cyano group, nitro group, alkylsulfonyl groups (for example, methanesulfonyl group), arylsulfonyl groups (for example, benzenesulfonyl group).

Examples of the electron attractive group having a Hammett's $\sigma_p$ value of 0.45 or more include acyl groups (for example, acetyl group), alkoxycarbonyl groups (for example, dodecyloxycarbonyl group), aryloxycarbonyl groups (for example, m-chlorophenoxycarbonyl), alkylsulfinyl groups (for example, n-propylsulfinyl), arylsulfinyl groups (for example, phenylsulfinyl), sulfamoyl groups (for example, N-ethylsulfamoyl, N,N-dimethylsulfamoyl), halogenated alkyl groups (for example, trofluoromethyl), in addition to the groups.

Examples of the electron attractive group having a Hammett's $\sigma_p$ value of 0.30 or more include acyloxy groups (for example, acetoxy), carbamoyl groups (for example, N-ethylcarbamoyl, N,N-dibutylcarbamoyl), halogenated alkoxy groups (for example, trifluoromethyloxy), halogenated aryloxy groups (for example, pentafluorophenyloxy), sulfonyloxy groups (for example, methylsulfonyloxy group), halogenated alkylthio groups (for example, difluoromethylthio), aryl groups substituted with two or more electron attractive groups having a $\sigma_p$ value of 0.15 or more (for example, 2,4-dinitrophenyl, pentachlorophenyl), and heterocylic rings (for example, 2-benzooxazolyl, 2-benzothiazolyl, 1-phenyl-2-benzimidazolyl), in addition to the groups.

Example of the electron attractive group having a Hammett's $\sigma_p$ value of 0.20 or more includes halogen atoms are mentioned, in addition to the groups.

Among pyrrolotriazoleazomethine dyes in the invention, compounds (C-1 to C-9) described in Japanese Patent Application No. 2002-10361 are suitably listed as cyan dye exemplary compounds, however, the scope of the invention is not limited to them.

As the dye usable in the invention, exemplary compounds described in Japanese Patent Application No. 2001-181547 are further listed, however, the scope of the invention is not limited to them.

As the yellow dye used as the hydrophobic dye of the invention, compounds (dyes) represented by the following general formula (Y-I) are preferable.

General Formula (Y-I)

In the general formula (Y-I), A and B each independently represents a heterocyclic ring group optionally substituted.

The heterocyclic ring is preferably a heterocyclic ring constituted of a 5- or 6-membered ring, and may have a mono-cyclic structure or a poly-cyclic structure composed of two or more condensed rings, and may be an aromatic heterocyclic ring or non-aromatic heterocyclic ring. Preferable examples of the hetero atom constituting the heterocyclic ring include a nitrogen atom, oxygen atom and sulfur atom.

As the heterocyclic ring represented by A in the general formula (Y-I), 5-pyrazolone, pyrazole, oxazolone, isooxazolone, barbituric acid, pyridone, rhodanine, pyrazolidindione, pyrazolopyridone, meldrumic acid and condensed heterocyclic rings obtained by further condensation of a hydrocarbon aromatic ring and heterocyclic ring to these heterocyclic rings are preferable. Among them, 5-pyrazolone, 5-aminopyrazole, pyridone, pyrazoloazoles are preferable, and 5-aminopyrazole, 2-hydroxy-6-pyridone, pyrazolotriazole are particularly preferable.

Preferable examples of the heterocyclic ring represented by B in the general formula (Y-I) include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzoimidazole, triazole, oxazole, isooxazole, benzooxazole, thiazole, benzothiazole, isothiazole, benzoisothiazole, thiadiazole, benzoisooxazole, pyrrolidine, piperidine, piperazine, imidazolidine, thiazoline. Among them, preferable examples are pyridine, quinoline, thiophene, benzothiophene, pyrazole, imidazole, benzoimidazole, triazole, oxazole, isooxazole, benzooxazole, thiazole, benzothiazole, isothiazole, benzoisothiazole, thiadiazole, benzoisooxazole, and more preferable examples are quinoline, thiophene, pyrazole, thiazole, benzooxazole, benzoisooxazole, isothiazole, imidazole, benzothiazole, thiadiazole, and particularly preferable examples are pyrazole, benzothiazole, benzooxazole, imidazole, 1,2,4-thiadiazole, 1,3,4-thiaziazole.

Examples of the substituent to be substituted on the A and B include halogen atoms, alkyl groups, cycloalkyl groups, aralkyl groups, alkenyl groups, alkynyl groups, aryl groups, heterocyclic groups, cyano group, hydroxyl group, nitro group, alkoxy groups, aryloxy groups, silyloxy groups, heterocyclic oxy groups, acyloxy groups, carbamoyloxy groups, alkoxycarbonyloxy groups, aryloxycarbonyloxy groups, amino groups, acylamino groups, aminocarbonylamino groups, alkoxycarbonylamino groups, aryloxycarbonylamino groups, sulfamoylamino groups, alkyl and arylsulfonylamino groups, mercapto groups, alkykthio groups, arylthio groups, heterocyclic thio groups, sulfamoyl groups, alkyl and arylsulfinyl groups, alkyl and arylsulfonyl groups, acyl groups, aryloxycarbonyl groups, alkoxycarbonyl groups, carbamoyl groups, imide groups, phosphino groups, phosphinyl groups, phosphinyloxy groups, phosphinylamino groups and silyl groups.

Among dyes represented by the general formula (Y-I), dyes represented by the following general formulae (Y-II), (Y-III) and (Y-IV) are more preferable.

General formula (Y-II)

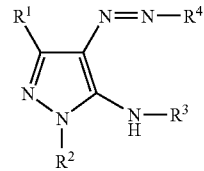

In the general formula (Y-II), $R^1$ and $R^3$ represent a hydrogen atom, cyano group, alkyl group, cycloalkyl group, aralkyl group, alkoxy group, alkylthio group, arylthio group, aryl group or ionic hydrophilic group. $R^2$ represents a hydrogen atom, alkyl group, cycloalkyl group, aralkyl group, carbamoyl group, acyl group, aryl group or heterocylic group. $R^4$ represents a heterocyclic group.

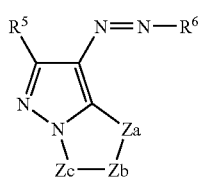

General formula (Y-III)

In the general formula (Y-III), $R^5$ represents a hydrogen atom, cyano group, alkyl group, cycloalkyl group, aralkyl group, alkoxy group, alkylthio group, arylthio group, aryl group or ionic hydrophilic group. Za represents —N=, —NH— or $C(R^{11})=$, Zb and Zc represent each independently —N= or $C(R^{11})=$, and the $R^{11}$ represents a hydrogen atom or non-metal substituent. $R^6$ represents a heterocyclic group.

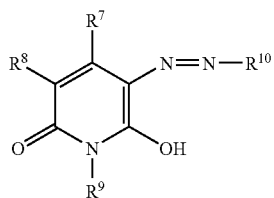

General formula (Y-IV)

In the general formula (Y-IV), $R^7$ and $R^9$ represent each independently a hydrogen atom, cyano group, alkyl group, cycloalkyl group, aralkyl group, aryl group, alkylthio group, arylthio group, alkoxycarbonyl group, carbamoyl group, or ionic hydrophilic group. $R^8$ represents a hydrogen atom, halogen atom, alkyl group, alkoxy group, aryl group, aryloxy group, cyano group, acylamino group, sulfonylamino group, alkoxycarbonylamino group, ureide group, alkylthio group, arylthio group, alkoxycarbonyl group, carbamoyl group, sulfamoyl group, sulfonyl group, acyl group, alkylamino group, arylamino group, hydroxy group or ionic hydrophilic group. $R^{10}$ represents a heterocyclic group.

Substituents represented by $R^1$, $R^2$, $R^3$, $R^5$, $R^7$, $R^8$ and $R^9$ in the general formulae (Y-II), (Y-III) and (Y-IV) will be described below.

The alkyl group represented by $R^1$, $R^2$, $R^3$, $R^5$, $R^7$, $R^8$ and $R^9$ includes alkyl groups carrying substituents and unsubstituted alkyl groups.

The alkyl group is preferably an alkyl group having 1 to 20 carbon atoms, and examples of the substituent include a hydroxyl group, alkoxy groups, cyano group, halogen atoms and ionic hydrophilic groups.

Suitable examples of the alkyl group include methyl, ethyl, butyl, isopropyl, t-butyl, hydroxylethyl, methoxy ethyl, cyanoethyl, trifluoromethyl, 3-sulfopropyl, and 4-sulfobutyl.

The cycloalkyl group represented by $R^1$, $R^2$, $R^3$, $R^5$, $R^7$, $R^8$ and $R^9$ includes cycloalkyl groups carrying substituents and unsubstituted cycloalkyl groups.

The cycloalkyl group is preferably a cycloalkyl group having 5 to 12 carbon atoms, and as the substituent, ionic hydrophilic groups are exemplified.

As the cycloalkyl group, cyclohexyl is suitably exemplified.

The aralkyl group represented by $R^1$, $R^2$, $R^3$, $R^5$, $R^7$, $R^8$ and $R^9$ includes aralkyl groups carrying substituents and unsubstituted aralkyl groups.

The aralkyl group is preferably an aralkyl group having 7 to 20 carbon atoms, and as the substituent, ionic hydrophilic groups are exemplified.

As the aralkyl group, benzyl and 2-phenetyl are suitably exemplified.

The aryl group represented by $R^1$, $R^2$, $R^3$, $R^5$, $R^7$, $R^8$ and $R^9$ includes aryl groups carrying substituents and unsubstituted aryl groups.

The aryl group is preferably an aryl group having 6 to 20 carbon atoms, and examples of the substituent include alkyl groups, alkoxy groups, halogen atoms, alkylamino groups, and ionic hydrophilic groups.

Suitable examples of the aryl group include phenyl, p-tolyl, p-methoxyphenyl, o-chlorophenyl and m-(3-sulfopropylamino)phenyl.

The alkylthio group represented by $R^1$, $R^2$, $R^3$, $R^5$, $R^7$, $R^8$ and $R^9$ includes alkylthio groups carrying substituents and unsubstituted alkylthio groups.

The alkylthio group is preferably an alkylthio group having 1 to 20 carbon atoms, and as the substituent, ionic hydrophilic groups are listed.

As the alkylthio group, methylthio and ethylthio are suitably listed.

The arylthio group represented by $R^1$, $R^2$, $R^3$, $R^5$, $R^7$, $R^8$ and $R^9$ includes arylthio groups carrying substituents and unsubstituted arylthio groups.

The arylthio group is preferably an arylthio group having 6 to 20 carbon atoms, and as the substituent, alkyl groups and ionic hydrophilic groups are listed.

As the arylthio group, for example, phenylthio and p-tolylthio are suitably listed.

The heterocyclic group represented by $R^2$ is preferably a 5- or 6-membered heterocyclic ring, and its may be further ring-condensed. As the hetero atom constituting the heterocyclic ring, a nitrogen atom, sulfur atom and oxygen atom are preferable. It may be an aromatic heterocyclic ring or a non-aromatic heterocyclic ring. The heterocyclic ring may further be substituted, and as the substituent, the same examples as the substituents of aryl groups described later are suitably listed. As the preferable heterocyclic ring, 6-membered nitrogen-containing aromatic heterocyclic rings are listed, and among them, triazine, pyrimidine and phthalazine are particularly preferable.

As the halogen atom represented by $R^8$, a fluorine atom, chlorine atom and bromine atom are suitably listed.

The alkoxy group represented by $R^1$, $R^3$, $R^5$ and $R^8$ includes alkoxy groups carrying substituents and unsubstituted alkoxy groups.

The alkoxy group is preferably an alkoxy group having 1 to 20 carbon atoms, and examples of the substituent include a hydroxyl group and ionic hydrophilic groups.

Suitable examples of the alkoxy group include methoxy, ethoxy, isopropoxy, methoxyethoxy, hydroxyethoxy and 3-carboxypropoxy.

The aryloxy group represented by $R^8$ includes aryloxy groups carrying substituents and unsubstituted aryloxy groups.

The aryloxy group is preferably an aryloxy group having 6 to 20 carbon atoms, and examples of the substituent include alkoxy groups and ionic hydrophilic groups.

Examples of the aryloxy group include phenoxy, p-methoxyphenoxy and o-methoxyphenoxy.

The acylamino group represented by $R^8$ includes acylamino groups carrying substituents and unsubstituted acylamino groups.

The acylamino group is preferably an acylamino group having 2 to 20 carbon atoms, and examples of the substituent include ionic hydrophilic groups.

Suitable examples of the acylamino include acetamide, propionamide, benzamide and 3,5-disulfobenzamide.

The sulfonylamino group represented by $R^8$ includes sulfonylamino groups carrying substituents and unsubstituted sulfonylamino groups.

The sulfonylamino group is preferably a sulfonylamino group having 1 to 20 carbon atoms.

Suitable examples of the sulfonylamino group include methylsulfonylamino and ethylsulfonylamino.

The alkoxycarbonylamino group represented by $R^8$ includes alkoxycarbonylamino groups carrying substituents and unsubstituted alkoxycarbonylamino groups.

The alkoxycarbonylamino group is preferably an alkoxycarbonylamino group having 2 to 20 carbon atoms, and examples of the substituent include ionic hydrophilic groups.

Suitable examples of the alkoxycarbonylamino group include ethoxycarbonylamino.

The ureide group represented by $R^8$ includes ureide groups carrying substituents and unsubstituted ureide groups.

The ureide group is preferably a ureide group having 1 to 20 carbon atoms.

Examples of the substituent include alkyl groups and aryl groups.

Suitable examples of the ureide group include 3-methylureide, 3,3-dimethylureide and 3-phenylureide.

The alkoxycarbonyl group represented by $R^7$, $R^8$, $R^9$ includes alkoxycarbonyl groups carrying substituents and unsubstituted alkoxycarbonyl groups.

The alkoxycarbonyl group is preferably an alkoxycarbonyl group having 2 to 20 carbon atoms, and examples of the substituent include ionic hydrophilic groups.

Suitable examples of the alkoxycarbonyl group include methoxycarbonyl and ethoxycarbonyl.

The carbamoyl group represented by $R^2$, $R^7$, $R^8$, $R^9$ includes carbamoyl groups carrying substituents and unsubstituted carbamoyl groups. Examples of the substituent include alkyl groups.

Suitable examples of the carbamoyl group include a methylcarbamoyl group and dimethylcarbamoyl group.

The sulfamoyl group represented by $R^8$ includes sulfamoyl groups carrying substituents and unsubstituted sulfamoyl groups. Examples of the substituent include alkyl groups.

Suitable examples of the sulfamoyl group include a dimethylsulfamoyl group and di-(2-hydroxyethyl)sulfamoyl group.

The sulfonyl group represented by $R^8$ includes methanesulfonyl and phenylsulfonyl.

The acyl group represented by $R^2$, $R^8$ includes acyl groups carrying substituents and unsubstituted acyl groups. As the acyl group, acyl groups having 1 to 20 carbon atoms are preferable, and examples of the substituent include ionic hydrophilic groups.

Preferable Examples of the acyl group include acetyl and benzoyl.

The amino group represented by $R^8$ includes amino groups carrying substituents and unsubstituted amino groups. Examples of the substituent include alkyl groups, aryl groups and heterocyclic groups.

Suitable examples of the amino group include methylamino, diethylamino, anilino and 2-chloroanilino.

The heterocyclic group represented by $R^4$, $R^6$, $R^{10}$ is the same as the optionally substituted heterocyclic group represented by B in the general formula (Y-I), and preferable examples, further preferable examples, and particularly preferable examples are also the same as described above.

Examples of the substituent include ionic hydrophilic groups, alkyl groups having 1 to 12 carbon atoms, aryl groups, alkyl or arylthio groups, halogen atoms, cyano group, sulfamoyl groups, sulfoneamino groups, carbamoyl groups, and acylamino group and the like, and the alkyl and aryl groups may further have a substituent.

In the general formula (Y-III), Za represents —N═, —NH— or $C(R^{11})$═. Zb and Zc each independently represents —N═ or $C(R^{11})$═. $R^{11}$ represents a hydrogen atom or non-metal substituent. The non-metal substituent represented by $R^{11}$ is preferably a cyano group, cycloalkyl group, aralkyl group, aryl group, alkylthio group, arylthio group or ionic hydrophilic group. The substituents are as defined for $R^1$, and preferable examples thereof are also as defined for $R^1$. Examples of skeletons of heterocyclic rings composed of two 5-membered rings included in the general formula (Y-III) are shown below.

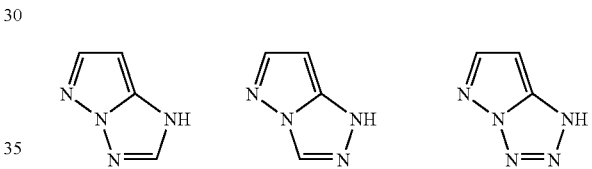

As examples of substituents when the above-explained substituents may further have substituents, substituents optionally substituted on the heterocyclic rings A and B of the general formula (Y-I) are listed.

Suitable specific examples of the dyes represented by the general formula (Y-I) include, but in the invention not limited to, compounds (Y-101 to Y-155) described in Japanese Patent Application No. 2002-10361. These compounds can be synthesized referring to JP-A Nos. 2-24191, 2001-279145.

Further, as the oil-soluble dyes suitably used as the hydrophobic dye of the invention, compounds represented by the following general formula (M-I) (hereinafter, referred to as "azo dye" in some cases) are preferable. Compounds represented by the general formula (M-I) of the invention will be described below.

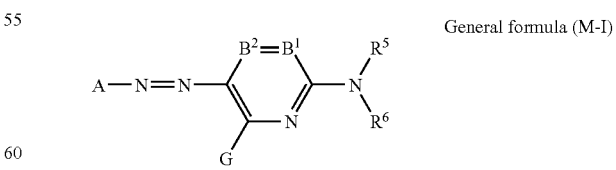

General formula (M-I)

In the general formula (M-I), A represents a moiety of a 5-membered heterocyclic diazo component (A-NH$_2$).

With respect to $B^1$ and $B^2$, $B^1$ represents ═CR$^1$— and $B^2$ represents —CR$^2$═, alternatively one represents a nitrogen atom and another represents ═CR$^1$— or —CR$^2$═.

$R^5$ and $R^6$ each independently represents a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. Each group may further have a substituent.

G, $R^1$ and $R^2$ each independently represents a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxyl group, heterocyclic oxy group, alkoxycarbonyloxy group, aryloxycarbonyloxy group, amino group substituted with an alkyl group, aryl group or heterocyclic group, acylamino group, ureide group, sulfamoylamino group, alkoxycarbonylamino group, aryloxycarbonylamino group, alkylarylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group, or heterocyclic thio group. Each group may further be substituted.

$R^1$ and $R^5$, or $R^5$ and $R^6$ may bond to form a 5 to 6-membered ring.

Compounds represented by the general formula (M-I) of the invention will be described in detail.

In the general formula (M-I), A represents a moiety of a 5-membered heterocyclic diazo component (A-NH$_2$). Examples of the hetero atom in the 5-membered heterocyclic ring include N, O and S. It is preferably a nitrogen-containing 5-membered heterocyclic ring, and to the heterocyclic ring, an aliphatic ring, aromatic ring or other heterocyclic ring maybe condensed.

Preferable examples of the heterocyclic ring A include a pyrazole ring, imidazole ring, thiazole ring, isothiazole ring, thiadiazole ring, benzothiazole ring, benzooxazole ring, benzoisothiazole ring. Each heterocyclic group may further have a substituent. Among them, apyrazole ring, imidazole ring, isothiazole ring, thiadiazole ring and benzothiazole ring represented by the following general formulae (M-a) to (M-f) are preferable.

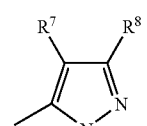
(M-a)

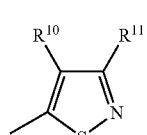
(M-b)

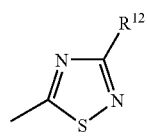
(M-c)

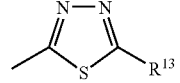
(M-d)

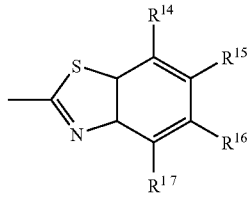
(M-e)

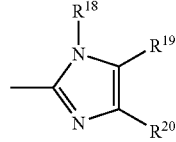
(M-f)

$R^7$ to $R^{20}$ in the general formulae (M-a) to (M-f) represent the same substituents as for G, $R^1$ and $R^2$ described later.

Among compounds represented by the general formulae (M-a) to (M-f), preferable are a pyrazole ring and isothiazole ring represented by the general formulae (M-a) and (M-b), and most preferable is a pyrazole ring represented by the general formulae (M-a).

With respect to $B^1$ and $B^2$, $B^1$ represents =CR$^1$— and $B^2$ represents —CR$^2$=, alternatively one represents a nitrogen atom and another represents =CR$^1$— or —CR$^2$=, and it is more preferable that $B^1$ represents =CR$^1$— and $B^2$ represents —CR$^2$=.

$R^5$ and $R^6$ represent each independently a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. Each group may further have a substituent. As the preferable substituent represented by $R^5$ and $R^6$, a hydrogen atom, aliphatic groups, aromatic groups, heterocyclic groups, acyl groups, alkylsulfonyl groups, and arylsulfonyl groups are listed. Further preferably, a hydrogen atom, aromatic groups, heterocyclic groups, acyl groups, alkylsulfonyl groups, and arylsulfonyl groups are listed. Most preferable are a hydrogen atom, aryl groups and heterocyclic groups. Each group may further have a substituent. $R^5$ and $R^6$ are not simultaneously a hydrogen atom.

G, $R^1$ and $R^2$ represent each independently a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxyl group, heterocyclic oxy group, alkoxycarbonyloxy group, aryloxycarbonyloxy group, amino group substituted with an alkyl group, aryl group or heterocyclic group, acylamino group, ureide group, sulfamoylamino group, alkoxycarbonylamino group, aryloxycarbonylamino group, alkylarylsulfonylamino group, arylsulfonylamino group, nitro group, alkylthio group, arylthio group, heterocyclic thio group, alkylsulfonyl group, arylsulfonyl group, alkylsulfinyl group, arylsulfinyl group, sulfamoyl group or sulfo group, and each group may further be substituted.

Preferable examples of the preferable substituent represented by G include a hydrogen atom, halogen atoms, aliphatic groups, aromatic groups, hydroxyl group, alkoxy groups, aryloxy groups, acyloxy groups, heterocyclic oxy group, alkyl groups, amino group substituted with an alkyl group, aryl group or heterocyclic group, acylamino groups, ureide groups, sulfamoylamino groups, alkoxycarbonylamino groups, aryloxycarbonylamino groups, alkylthio groups, arylthio groups, and heterocyclic thio groups, and more preferable examples are a hydrogen atom, halogen atoms, alkyl groups, hydroxy group, alkoxy groups, aryloxy groups, acyloxy groups, amino group substituted with an alkyl group, aryl group or heterocyclic group, and acylamino groups, and among them, most preferable examples are a hydrogen atom, arylamino groups and amide groups. Each group may further have a substituent.

Preferable examples of the substituent represented by $R^1$ and $R^2$, a hydrogen atom, alkyl groups, alkoxycarbonyl groups, carboxyl group, carbamoyl groups and cyano group. Each group may further have a substituent.

$R^1$ and $R^5$, or $R^5$ and $R^6$ may bond to form a 5- to 6-membered ring.

As the substituent when substituents represented by A, $R^1$, $R^2$, $R^5$, $R^6$ and G have further a substituent, the substituents listed for G, $R^1$, $R^2$ are mentioned.

The substituents represented by G, $R^1$ and $R^2$ are described below.

Examples of the halogen atom include a fluorine atom, chlorine atom and bromine atom.

The aliphatic group means an alkyl group, substituted alkyl group, alkenyl group, substituted alkenyl group, alkynyl group, substituted alkynyl group, aralkyl group or substituted aralkyl group. The aliphatic group may be branched or may form a ring. The number of carbon atoms in the aliphatic group is preferably from 1 to 20, and more preferably from 1 to 16. The aryl part of the aralkyl group and substituted aralkyl group is preferably phenyl or naphthyl, and particularly preferably phenyl. Examples of the aliphatic group include a method group, ethyl group, butyl group, isopropyl group, t-butyl group, hydroxyethyl group, methoxyethyl group, cyanoethyl group, trifluoromethyl group, 3-sulfopropyl group, 4-sulfobutyl group, cyclohexyl group, benzyl group, 2-phenetyl group, vinyl group and allyl group.

In the present specification, the aromatic group means an aryl group or substituted aryl group. As the aryl group, a phenyl group and naphthyl group are preferable and a phenyl group is particularly preferable. The number of carbon atoms of the aromatic group is preferably from 6 to 20, further preferably from 6 to 16.

Examples of the aromatic ring include a phenyl group, p-tolyl group, p-methoxyphenyl group, o-chlorophenyl group and m-(3-sulfopropylamino)phenyl group.

The heterocyclic group includes heterocyclic groups carrying substituents, and unsubstituted heterocyclic groups. To the heterocyclic ring, an aliphatic ring, aromatic ring or other heterocyclic ring may be condensed. The heterocyclic group is preferably a 5- or 6-membered heterocyclic group. Examples of the substituent include aliphatic groups, halogen atoms, alkylsulfonyl groups, arylsulfonyl groups, acyl groups, acylamino groups, sulfamoyl groups, carbamoyl groups and ionic hydrophilic groups. Examples of the heterocyclic group include a 2-pyridyl group, 2-thienyl group, 2-thiazolyl group, 2-benzothiazoyl group, 2-benzooxazolyl group and 2-furyl group.

Examples of the alkylsulfonyl group and arylsulfonyl group include a methanesulfonyl group and phenylsulfonyl group, respectively.

Examples of the alkylsulfinyl group and arylsulfinyl group include a methanesulfinyl group and phenylsulfinyl group, respectively.

The acyl group includes acyl groups carrying substituents and unsubstituted acyl groups. The acyl group is preferably an acyl group having 1 to 12 carbon atoms. Examples of the substituent include ionic hydrophilic groups. Examples of the acyl group include an acetyl group and benzoyl group.

The amino group includes amino groups substituted with an alkyl group, aryl group or heterocyclic group, and the alkyl group, aryl group or heterocyclic group may further have a substituent. Unsubstituted amino groups are not included. The alkylamino group is preferably an alkylamino group having 1 to 6 carbon atoms. Examples of the substituent include ionic hydrophilic groups. Examples of the alkylamino group include a methylamino group and diethylamino group.

The arylamino group includes arylamino groups carrying substituents and unsubstituted arylamino groups. The arylamino group is preferably an arylamino group having 6 to 12 carbon atoms. Examples of the substituent include halogen atoms and ionic hydrophilic groups. Examples of the arylamino group include an anilino group and 2-chloroanilino group.

The alkoxy group includes alkoxy groups carrying substituents and unsubstituted alkoxy groups. The alkoxy group is preferably an alkoxy group having 1 to 12 carbon atoms. Examples of the substituent include alkoxy groups, hydroxyl group and ionic hydrophilic groups. Examples of the alkoxy group include a methoxy group, ethoxy group, isopropoxy group, methoxyethoxy group, hydroxyethoxy group and 3-carboxypropoxy group.

The aryloxy group includes aryloxy groups carrying substituents and unsubstituted aryloxy groups. The aryloxy group is preferably an aryloxy group having 6 to 12 carbon atoms. Examples of the substituent include alkoxy groups, and ionic hydrophilic groups. Examples of the aryloxy group include a phenoxy group, p-methoxyphenoxy group and o-methoxyphenoxy group.

The acylamino group includes acylamino groups carrying substituents. The acylamino group is preferably an acylamino group having 2 to 12 carbon atoms. Examples of the substituent include ionic hydrophilic groups. Examples of the acylamino group include an acetylamino group, propionylamino group, benzoylamino group, N-phenylacetylamino group and 3,5-disulfobenzoylamino group.

The ureide group includes ureide groups carrying substituents and unsubstituted ureide groups. The ureide group is preferably a ureide group having 1 to 12 carbon atoms. Examples of the substituent include alkyl and aryl groups. Examples of the ureide group include a 3-methylureide group, 3,3-dimethylureide group and 3-phenylureide group.

The sulfamoylamino group includes sulfamoylamino groups carrying substituents and unsubstituted sulfamoylamino groups. Examples of the substituent include alkyl groups. Examples of the sulfamoyl group include an N,N-dipropylsulfamoylamino group.

The alkoxycarbonylamino group includes alkoxycarbonylamino groups carrying substituents and unsubstituted alkoxycarbonylamino groups. The alkoxycarbonylamino group is preferably an alkoxycarbonylamino group having 2 to 12 carbon atoms. Examples of the substituent include ionic hydrophilic groups. Examples of the alkoxycarbonylamino group include an ethoxycarbonylamino group.

The alkylsulfonylamino group and arylsulfonylamino group include alkyl and arylsulfonylamino groups carrying substituents and unsubstituted alkyl and arylsulfonylamino groups. The alkyl and arylsulfonylamino groups are preferably alkyl and arylsulfonylamino groups having 1 to 12 carbon atoms. Examples of the substituent include ionic hydrophilic groups. Examples of the alkyl and arylsulfonylamino groups include a methanesulfonylamino group, N-phenylmethanesulfonylamino group, benzenesulfonylamino group and 3-carboxybenzenesulfonylamino group.

The carbamolyl group includes carbamolyl groups carrying substituents and unsubstituted carbamolyl groups. Examples of the substituent include alkyl groups. Examples of the carbamolyl group include a methylcarbamoyl group and dimethylcarbamoyl group.

The sulfamolyl group includes sulfamolyl groups carrying substituents and unsubstituted sulfamolyl groups. Examples of the substituent include alkyl groups. Examples of the sulfamolyl group include a dimethylsulfamoly group and di-(2-hydroxyethyl)sulfamoyl group.

The alkoxycarbonyl group includes alkoxycarbonyl groups carrying substituents and unsubstituted alkoxycarbonyl groups. The alkoxycarbonyl group is preferably an alkoxycarbonyl group having 2 to 12 carbon atoms. Examples of the substituent include ionic hydrophilic groups. Examples of the alkoxycarbonyl group include a methoxycarbonyl group and ethoxycarbonyl group.

The acyloxy group includes acyloxy groups carrying substituents and unsubstituted acyloxy groups. The acyloxy group is preferably an acyloxy group having 1 to 12 carbon atoms. Examples of the substituent include ionic hydrophilic groups. Examples of the acyloxy group include an acetoxy group and benzoyloxy group.

The carbamoyloxy group includes carbamoyloxy groups carrying substituents and unsubstituted carbamoyloxy groups. Examples of the substituent include alkyl groups. Examples of the carbamoyloxy group include an N-methylcarbamoyloxy group.

The aryloxycarbonyl group includes aryloxycarbonyl groups carrying substituents and unsubstituted aryloxycarbonyl groups. The aryloxycarbonyl group is preferably an aryloxycarbonyl group having 7 to 12 carbon atoms. The substituent includes ionic hydrophilic groups. Examples of the aryloxycarbonyl group include a phenoxycarbonyl group.

The aryloxycarbonylamino group includes aryloxycarbonylamino groups carrying substituents and unsubstituted aryloxycarbonylamino groups. The aryloxycarbonylamino group is preferably an aryloxycarbonylamino group having 7 to 12 carbon atoms. Examples of the substituent include ionic hydrophilic groups. Examples of the aryloxycarbonylamino group include a phenoxycarbonylamino group.

The alkyl, aryl and heterocyclic thio groups include alkyl, aryl and heterocyclic thio groups carrying substituents and unsubstituted alkyl, aryl and heterocyclic thio groups. The alkyl, aryl and heterocyclic thio groups preferably have 1 to 12 carbon atoms. Examples of the substituent include ionic hydrophilic groups. Examples of the alkyl, aryl and heterocyclic thio groups include a methylthio group, phenylthio group and 2-pyridylthio group.

In the invention, the particularly preferable azo dye includes compounds represented by the following general formula (M-II).

General formula (M-II)

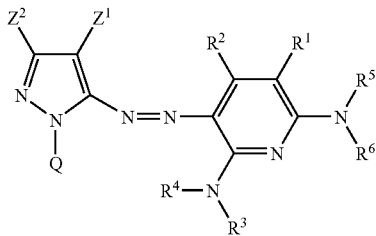

In the general formula (M-II), $Z^1$ represents an electron attractive group having a Hammett's substituent constant $\sigma_p$ value of 0.20 or more. As $Z^1$, an electron attractive group having a $\sigma_p$ value of 0.30 to 1.0 is preferable. As the preferable specific substituent, electron attractive substituents described later are listed, and among them, acyl groups having 2 to 12 carbon atoms, alkyloxycarbonyl groups having 2 to 12 carbon atoms, nitro group, cyano group, alkylsulfonyl groups having 1 to 12 carbon atoms, arylsulfonyl groups having 6 to 18 carbon atoms, carbamoyl groups having 1 to 12 carbon atoms and halogenated alkyl groups having 1 to 12 carbon atoms are preferable. A cyano group, alkylsulfonyl groups having 1 to 12 carbon atoms and arylsulfonyl groups having 6 to 18 carbon atoms are particularly preferable, and a cyano group is most preferable.

$R^1$, $R^2$, $R^5$ and $R^6$ are as defined in the general formula (M-I).

$R^3$ and $R^4$ represent each independently a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. Among them, a hydrogen atom, aromatic group, heterocyclic group, acyl group, alkylsulfonyl group, arylsulfonyl group are preferable, and a hydrogen atom, aromatic group, heterocyclic group are particularly preferable, $Z^2$ represents a hydrogen atom, aliphatic group, aromatic group or heterocyclic group.

Q represents a hydrogen atom, aliphatic group, aromatic group or heterocyclic group. Among them, as Q, groups composed of non-metal atoms necessary for forming 5- to 8-membered rings are preferable. The 5- to 8-membered rings may be substituted, and saturated, and have an unsaturated bond. Among them, aromatic groups and heterocyclic groups are particularly preferable. As the preferable non-metal atoms, a nitrogen atom, oxygen atom, sulfur atom and carbon atom are mentioned. Specific examples of the 5- to 8-membered rings include a benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzoimidazole ring, oxazole ring, benzooxazole ring, thiazole ring, benzothiazole ring, oxane ring, sulfolane ring and thian ring.

The groups described in the general formula (M-II) may further have a substituent. When these groups have further a substituent, listed as this substituent are groups described in the general formula (M-I), groups exemplified for G, $R^1$ and $R^2$, and ionic hydrophilic groups.

Here, regarding the substituent $Z^1$, the Hammett's substituent constant $\sigma_p$ value used in the present specification will be described.

The Hammett's law is an empirical law provided by L. P. Hammett in 1935, to quantitatively discuss the influence by a substituent on reaction or equilibrium of a benzene derivative, and its validity is widely appreciated now. The substituent constant defined in the Hammett law includes a $\sigma_p$ value and a $\sigma_m$ value, and these values are found in a lot of general books, and these are described in detail in, for example, J. A. Dean, "Lange's Handbook of Chemistry", vol. 12, 1979 (McGraw-Hill) and "Chemical Region", special number, No. 122, pp. 96 to 103, 1979 (Nankodo). In the invention, substituents are limited and explained by Hammett's substituent constant $\sigma_p$, however, this does not mean that literature-known values found in the books are limited to only certain substituents, and it is needless to say that even if the value is not known in literatures, substituents having a value which would be involved in its range when measured by Hammett law are also included. The general formulae (M-I) and (M-II)

of the invention include those other than benzene derivatives, and the $\sigma_p$ value is used as a measure showing the electronic effect of a substituent, irrespective of substitution position. Therefore, in the invention, the $\sigma_p$ value is used in such meaning.

Examples of the electron attractive group having a Hammett's substituent constant $\sigma_p$ value of 0.60 or more include a cyano group, nitro group, alkylsulfonyl groups (for example, methanesulfonyl group), arylsulfonyl groups (for example, benzenesulfonyl group).

Examples of the electron attractive group having a Hammett's $\sigma_p$ value of 0.45 or more include acyl groups (for example, acetyl group), alkoxycarbonyl groups (for example, dodecyloxycarbonyl group), aryloxycarbonyl groups (for example, m-chlorophenoxycarbonyl), alkylsulfinyl groups (for example, n-propylsulfinyl), arylsulfinyl groups (for example, phenylsulfinyl), sulfamoyl groups (for example, N-ethylsulfamoyl, N,N-dimethylsulfamoyl), halogenated alkyl groups (for example, trofluoromethyl), in addition to the groups.

Examples of the electron attractive group having a Hammett's $\sigma_p$ value of 0.30 or more include acyloxy groups (for example, acetoxy), carbamoyl groups (for example, N-ethylcarbamoyl, N,N-dibutylcarbamoyl), halogenated alkoxy groups (for example, trifluoromethyloxy), halogenated aryloxy groups (for example, pentafluorophenyloxy), sulfonyloxy groups (for example, methylsulfonyloxy group), halogenated alkylthio groups (for example, difluoromethylthio), aryl groups substituted with two or more electron attractive groups having a $\sigma_p$ value of 0.15 or more (for example, 2,4-dinitrophenyl, pentachlorophenyl), and heterocylic rings (for example, 2-benzooxazolyl, 2-benzothiazolyl, 1-phenyl-2-benzimidazolyl), in addition to the groups.

Example of the electron attractive group having a Hammett's $\sigma_p$ value of 0.20 or more includes halogen atoms, in addition to the groups.

With respect to compound of the general formula (M-I), particularly preferable substituent combinations are as described below.

(i) $R^5$ and $R^6$ are preferably a hydrogen atom, alkyl group, aryl group, heterocyclic group, sulfonyl group or acyl group, further preferably a hydrogen atom, aryl group, heterocyclic group or sulfonyl group, most preferably a hydrogen atom, aryl group or heterocyclic group. However, $R^5$ and $R^6$ are not at the same time a hydrogen atom.

(ii) G represents preferably a hydrogen atom, halogen atom, alkyl group, hydroxyl group, amino group or amide group, further preferably a hydrogen atom, halogen atom, amino group or amide group, most preferably a hydrogen atom or amide group.

(iii) A represents preferably a pyrazole ring, imidazole ring, isothiazole ring, thiadiazole ring orbenzothiazole ring, further preferably a pyrazole ring or -isothiazole ring, most preferably a pyrazole ring.

(iv) $B^1$ and $B^2$ represent each $=CR^1—$ or $—CR^2=$, and $R^1$ and $R^2$ represent each preferably a hydrogen atom, halogen atom, cyano group, carbamoyl group, carbonyl group, alkyl group, hydroxyl group or alkoxy group, further preferably a hydrogen atom, cyano group, carbamoyl group or alkoxy group.

With respect to preferable substituent combinations of compounds represented by the general formula (M-I), compounds in which at least one of various substituents is the preferable group are preferable, compounds in which more various substituents are the preferable group are more preferable, and compounds in which all substituents are the preferable group are most preferable.

As the exemplary compounds represented by the general formula (M-I), compounds described in Japanese Patent Application No. 2002-10361 (a-1 to a-27, b-1 to b-6, c-1 to c-3, d-1 to d-4, e-1 to e-4) are suitably listed, however, the scope of the invention is not limited to them.

As the oil-soluble dyes in the invention, compounds represented by the following general formula (C-I) (hereinafter, referred to as "phthalocyanine dye" in some cases) are preferably used. Compounds represented by the general formula (C-I) will be described below.

General formula (C-I)

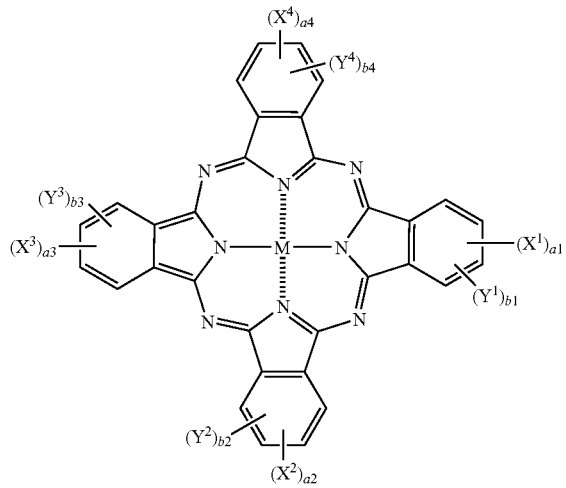

In the general formula (C-I), $X^1$, $X^2$, $X^3$ and $X^4$ each independently represents $—SO-Z^1$, $—SO_2-Z^1$ or $—SO_2NR^{21}R^{22}$.

$Z^1$ represents a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group, and particularly, substituted or unsubstituted alkyl groups, substituted or unsubstituted aryl groups, substituted or unsubstituted heterocyclic groups are preferable, and among them, substituted alkyl groups, substituted aryl groups and substituted heterocyclic groups are most preferable.

$R^{21}$ and $R^{22}$ each independently represents a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group, and particularly, a hydrogen atom, substituted or unsubstituted alkyl groups, substituted or unsubstituted aryl groups, substituted or unsubstituted heterocyclic groups are preferable, and among them, a hydrogen atom, substituted alkyl groups, substituted aryl groups and substituted heterocyclic groups are most preferable. However, $R^{21}$ and $R^{22}$ are not at the same time a hydrogen atom.

The substituted or unsubstituted alkyl group represented by $R^{21}$, $R^{22}$ and $Z^1$ is preferably an alkyl group having 1 to 30 carbon atoms. Examples of the substituent are the same as substituents when $Z^1$, $R^{21}$, $R^{22}$, $Y^1$, $Y^2$, $Y^3$ and $Y^4$ can further have a substituent as described later. Among them, a hydroxyl group, alkoxy groups, cyano groups and halogen atoms are preferable.

The cycloalkyl groups carrying substituents or unsubstituted cycloalkyl groups represented by $R^{21}$, $R^{22}$ and $Z^1$ is preferably a cycloalkyl group having 5 to 30 carbon atoms. Examples of the substituent are the same as substituents when $Z^1$, $R^{21}$, $R^{22}$, $Y^1$, $Y^2$, $Y^3$ and $Y^4$ can further have a substituent as described later. Among them, a hydroxyl group, alkoxy groups, cyano groups and halogen atoms are preferable.

The alkenyl groups carrying substituents or unsubstituted alkenyl groups represented by $R^{21}$, $R^{22}$ and $Z^1$ is preferably an alkenyl group having 2 to 30 carbon atoms. Examples of the substituent are the same as substituents when $Z^1$, $R^{21}$, $R^{22}$, $Y^1$, $Y^2$, $Y^3$ and $Y^4$ can further have a substituent as described later. Among them, a hydroxyl group, alkoxy groups, cyano groups and halogen atoms are preferable.

The aralkyl groups carrying substituents or unsubstituted aralkyl groups represented by $R^{21}$, $R^{22}$ and $Z^1$ is preferably an aralkyl group having 7 to 30 carbon atoms. Examples of the substituent are the same as substituents when $Z^1$, $R^{21}$, $R^{22}$, $Y^1$, $Y^2$, $Y^3$ and $Y^4$ can further have a substituent as described later. Among them, a hydroxyl group, alkoxy groups, cyano groups and halogen atoms are preferable.

The substituents on aryl groups represented by $R^{21}$, $R^{22}$ and $Z^1$ are the same as substituents when $Z^1$, $R^{21}$, $R^{22}$, $Y^1$, $Y^2$, $Y^3$ and $Y^4$ can further have a substituent as described later. Preferable examples of the substituent include halogen atoms, heterocyclic groups, cyano groups, hydroxyl group, nitro group, carboxyl group, acylamino groups, ureide groups, sulfamoylamino groups, alkyloxycarbonyl groups, alkyloxycarbonylamino groups, sulfoneamide groups, sulfamoyl groups, carbamoyl groups, sulfonyl groups, acyloxy groups, carbamoyloxy groups, imide groups, heterocylic thio groups, acyl groups, sulfo group and quaternary ammonium group, and among them, more preferable examples are heterocyclic groups, cyano groups, carboxyl group, acylamino groups, sulfonamide groups, sulfamoyl groups, carbamoyl groups, sulfonyl group, imide groups and acyl groups, and further preferable examples are cyano groups, carboxyl group, sulfamolyl groups, carbamoyl groups, sulfonyl group, imide groups and acyl groups.

The heterocyclic groups represented by $R^{21}$, $R^{22}$ and $Z^1$ are preferably 5-or 6-membered cyclic groups, and these may further be condensed. It may be aromatic or non-aromatic.

The heterocyclic groups represented by $R^{21}$, $R^{22}$ and $Z^1$ are exemplified below in the form of heterocycle omitting substitution position, however, the substitution position is not limited, and in the case of, for example, pyridine, substitution at 2-position, 3-position and 4-position is possible.

Examples include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzoisothiazole, thiadiazole, isooxazole, benzisooxazole, pyrrolidine, piperidine, piperazine, imidazolidine, thiazoline and the like. Among them, aromatic heterocyclic groups are preferable, and preferable examples thereof include, as described above, pyridine, pyrazine, pyrimidine, pyridazine, triazine, pyrazole, imidazole, benzimidazole, triazole, thiazole, benzothiazole, isothiazole, benzisothiazole, thiadiazole. These may have a substituent.

$Y^1$, $Y^2$, $Y^3$ and $Y^4$ each independently represents a hydrogen atom, halogen atom, alkyl group, cycloalkyl group, alkenyl group, aralkyl group, aryl group, heterocyclic group, cyano group, hydroxyl group, nitro group, amino group, alkylamino group, alkoxy group, aryloxy group, amide group, arylamino group, ureide group, sulfamoylamino group, alkylthio group, arylthio group, alkoxycarbonylamino group, sulfoneamide group, carbamoyl group, sulfamoyl group, sulfonyl group, alkoxycarbonyl group, heterocyclic oxy group, azo group, acyloxy group, carbamoyloxyl group, silyloxy group, aryloxycarbonyl group, aryloxycarbonylamino group, imide group, heterocyclic thio group, phosphoryl group, acyl group, carbonyl group or sulfo group, and each of them may further have a substituent.

Among them, a hydrogen atom, halogen atoms, alkyl groups, aryl groups, cyano groups, alkoxy groups, amide groups, ureide group, sulfoneamide groups, carbamoyl groups, sulfamoyl groups, and alkoxycarbonyl groups are preferable, and particularly, a hydrogen atom, halogen atoms and cyano groups are preferable, and a hydrogen atom is most preferable.

When $Z^1$, $R^{21}$, $R^{22}$, $Y^1$, $Y^2$, $Y^3$ and $Y^4$ are a group capable of further carrying substituents, substituents as described below may further be carried.

Halogen atoms (for example, chlorine atom, bromine atom), linear or branched alkyl groups having 1 to 30 carbon atoms, aralkyl groups having 7 to 30 carbon atoms, alkenyl groups having 2 to 30 carbon atoms, linear or branched alkynyl groups having 2 to 30 carbon atoms, linear or branched cycloalkyl groups having 3 to 30 carbon atoms, linear or branched cycloalkenyl groups having 3 to 30 carbon atoms, more specifically (for example, methyl, ethyl, propyl, isopropyl, t-butyl, 2-methanesulfonylethyl, 3-phenoxypropyl, trifluoromethyl, cyclopentyl), aryl groups (for example, phenyl, 4-t-butylphenyl, 2,4-di-t-amylphenyl), heterocyclic groups (for example, imidazolyl, pyrazolyl, triazolyl, 2-furyl, 2-thienyl, 2-pyrimidinyl, 2-benzothiazolyl), cyano groups, hydroxyl group, nitro group, carboxy group, amino groups, alkyloxygroups (for example, methoxy, ethoxy, 2-methoxyethoxy, 2-methanesulfonylethoxy), aryloxy groups (for example, phenoxy, 2-methylphenoxy, 4-t-butylphenoxy, 3-nitrophenoxy, 3-t-butyloxycarbamoylphenoxy, 3-methoxycarbamoyl), acylamino groups (for example, acetamide, benzamide, 4-(3-t-butyl-4-hydroxyphenoxy)butaneamide), alkylamino groups (for example, methylamino, butylamino, diethylamino, methylbutylamino), anilino groups (for example, phenylamino, 2-chloroanilino), ureide groups (for example, phenylureide, methylureide, N,N-dibutylureide), sulfamoylamino groups (for example, N,N-dipropylsulfamoylamino), alkylthio groups (for example, methylthio, octylthio, 2-phenoxyethylthio), arylthio groups (for example, phenylthio, 2-butoxy-5-t-octylphenylthio, 2-carboxyphenylthio), alkyloxycarbonylamino groups (for example, methoxycarbonylamino), sulfoneamide groups (for example, methanesulfoneamide, benzenesulfoneamide, p-toluenesulfoneamide), carbamolyl groups (for example, N-ethylcarbamoyl, N,N-dibutylcarbamoyl), sulfamolyl groups (for example, N-ethylsulfamoly, N,N-dipropylsulfamoyl, N-phenylsulfamoyl), sulfonyl groups (for example, methanesulfonyl, octanesulfonyl, benzenesulfonyl, toluenesulfonyl), alkylthiocarbonyl groups (for example, methoxycarbonyl, butyloxycarbonyl), heterocyclic oxy groups (for example, 1-phenyltetrazole-5-oxy, 2-tetrahydropyranyloxy), azo groups (for example, phenylazo, 4-methoxyphenylazo, 4-pivaloylaminophenylazo, 2-hydroxy-4-propanoylphenylazo), acyloxy groups (for example, acetoxy), carbamoyloxy groups (for example, N-methylcarbamoyloxy, N-phenylcarbamoyloxy), silyloxy groups (for example, trimethylsilyloxy, dibutylmethylsilyloxy), aryloxycarbonylamino groups (for example, phenoxycarbonylamino), imide groups (for example, N-succinimide, N-phthalimide), heterocyclic thio groups (for example, 2-benzothiazolylthio, 2,4-di-phenoxy-1,3,5-triazole-6-thio, 2-pyridylthio), sulfinyl groups (for example, 3-phenoxypropylsulfinyl), phosphonyl groups (for example, phenoxyphosphoryl, octyloxyphosphoryl, phenylphosphoryl), aryloxycarbonyl groups (for example, phenoxycarbonyl), acyl groups (for example, acetyl, 3-phenyl-propanoyl, benzoyl), ionic hydrophilic groups (for example, carboxyl group, sulfo group, and quaternary ammonium group) and the like.

$a^1$ to $a^4$, and $b^1$ to $b^4$ represent substituents of $X^1$ to $X^4$, and $Y^1$ to $Y^4$, respectively, and $a^1$ to $a^4$ represent each independently an integer of 0 to 4, and $b^1$ to $b^4$ represent each independently an integer of 0 to 4. The sum of $a^1$ to $a^4$ are 2 or more. Here, $a^1$ to $a^4$ and $b^1$ to $b^4$ represent an integer of 2 or more, a plurality of $X^1$ to $X^4$ and $Y^1$ to $Y^4$ may be the same or different.

$a^1$ and $b^1$ each independently represents an integer of 0 to 4 satisfying the relation of $a^1+b^1=4$, and particularly preferable are combinations in which $a^1$ represents 1 or 2 and $b^1$ represents 3 or 2, and among them, a combination in which $a^1$ represents 1 and $b^1$ represents 3 is most preferable.

$a^2$ and $b^2$ each independently represents an integer of 0 to 4 satisfying the relation of $a^2+b^2=4$, and particularly preferable are combinations in which $a^2$ represents 1 or 2 and $b^2$ represents 3 or 2, and among them, a combination in which $a^2$ represents 1 and $b^2$ represents 3 is most preferable.

$a^3$ and $b^3$ represent each independently an integer of 0 to 4 satisfying the relation of $a^3+b^3=4$, and particularly preferable are combinations in which $a^3$ represents 1 or 2 and $b^3$ represents 3 or 2, and among them, a combination in which $a^3$ represents 1 and $b^3$ represents 3 is most preferable.

$a^4$ and $b^4$ represent each independently an integer of 0 to 4 satisfying the relation of $a^4+b^4=4$, and particularly preferable are combinations in which $a^4$ represents 1 or 2 and $b^4$ represents 3 or 2, and among them, a combination in which $a^4$ represents 1 and $b^4$ represents 3 is most preferable.

M represents a hydrogen atom, metal element or its oxide, hydroxide or halide.

Preferable examples of M include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi as a hydrogen atom or a metal atom. Examples of oxides include VO and GeO. Examples of hydroxides include $Si(OH)_2$, $Cr(OH)_2$ and $Sn(OH)_2$. Further, examples of halides include AlCl, $SiCl_2$, VCl, $VCl_2$, VOCl, FeCl, GaCl and ZrCl. Among them, particularly, Cu, Ni, Zn, Al and the like are preferable, and Cu is most preferable.

Pc (phthalocyanine ring) may form a dimer (for example, Pc-M-L-M-Pc) or trimer via L (divalent connecting group), and Ms in this case may be the same or different.

The divalent connecting group represented by L is preferably an oxy group (—O—), thio group (—S—), carbonyl group (—CO—), sulfonyl group (—$SO_2$—), imino group (—NH—) or methylene group (—$CH_2$—).

With respect to compounds of the general formula (C-I), particularly preferable combinations are as described below.

Particularly preferably, $X^1$ to $X^4$ represent each independently —$SO_2$-$Z^1$ or —$SO_2NR^{21}R^{22}$.

$Z^1$s each independently represents preferably a substituted or unsubstituted alkyl group, substituted or unsubstituted aryl group, or substituted or unsubstituted heterocyclic group, and among them, substituted alkyl groups, substituted aryl groups and substituted heterocyclic groups are most preferable.

$R^{21}$ and $R^{22}$ each independently represents a hydrogen atom, substituted or unsubstituted alkyl group, substituted or unsubstituted aryl group, or substituted or unsubstituted heterocyclic group, and among them, a hydrogen atom, substituted alkyl groups, substituted aryl groups and substituted heterocyclic groups are most preferable.

$Y^1$ to $Y^4$ represent preferably a hydrogen atom, halogen atom, alkyl group, aryl group, cyano group, alkoxy group, amide group, ureide group, sulfoneamide group, carbamoyl group, sulfamoyl group, alkoxycarbonyl group, carboxyl group or sulfo group, and among them, a hydrogen atom, halogen atoms, cyano groups, carboxyl group and sulfo group are preferable, and a hydrogen atom is most preferable.

$a^1$ to $a^4$ represent each independently preferably 1 or 2, and particularly preferably 1. $b^1$ to $b^4$ represent each independently preferably 3 or 2, and particularly preferably 3.

M represents a hydrogen atom, metal element or its oxide, hydroxide or halide, and particularly, Cu, Ni, Zn, Al are preferable, and Cu is most preferable.

With respect to preferable substituent combinations of compounds of the general formula (C-I), compounds in which at least one of various substituents is the preferable group are preferable, compounds in which more various substituents are the preferable group are more preferable, and compounds in which all substituents are the preferable group are most preferable.

Of compounds represented by the general formula (C-I), compounds having a structure represented by the following general formula (C-II) are more preferable.

General formula C-II

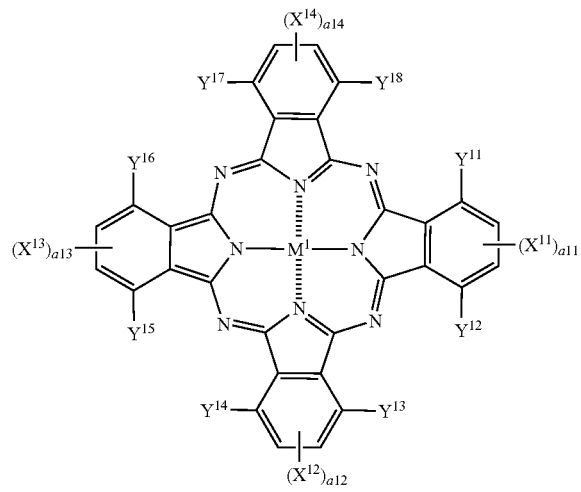

In the general formula (C-II), $X^{11}$ to $X^{14}$, $Y^{11}$ to $Y^{18}$ are as defined for $X^1$ to $X^4$, $Y^1$ to $Y^4$ in the general formula (C-I), and preferable examples thereof are also the same as those for $X^1$ to $X^4$, $Y^1$ to $Y^4$. $M^1$ is as defined for M in the general formula (C-I), and preferable examples thereof are also the same as those for M.

Specifically, in the general formula (C-II), $X^{11}$, $X^{12}$, $X^{13}$ and $X^{14}$ each independently represents —SO-$Z^{11}$, —$SO_2$-$Z^{11}$ or —$SO_2NR^{23}R^{24}$.

$Z^{11}$ represents a substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group.

$R^{23}$ represents a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group, and $R^{24}$ represents a substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group.

$Y^{11}$, $Y^{12}$, $Y^{13}$, $Y^{14}$, $Y^{15}$, $Y^{16}$, $Y^{17}$ and $Y^{18}$ each independently represents a hydrogen atom, halogen atom, alkyl group, cycloalkyl group, alkenyl group, aralkyl group, aryl group, heterocyclic group, cyano group, hydroxyl group, nitro group, amino group, alkylamino group, alkoxy group, aryloxy group, amide group, arylamino group, ureide group, sulfamoyl group, alkylthio group, arylthio group, alkoxycarbonylamino group, sulfoneamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, carboxyl group or sulfo group, and each group may further have a substituent.

$a^{11}$ to $a^{14}$ represent the number of substituents $X^{11}$ to $X^{14}$, and represent each independently an integer of 0 to 2, however, they are not simultaneously 0. When $a^{11}$ to $a^{14}$ represent 2, two $X^{11}$ to $X^{14}$ may be the same or different.

$M^1$ represents a hydrogen atom, metal element or its oxide, hydroxide or halide.

In the general formula (C-II), preferably $a^{11}$ to $a^{14}$ each independently represents an integer of 1 or 2 providing $4 \leq a^{11}+a^{12}+a^{13}+a^{14} \leq 8$, and particularly preferably, $4 \leq a^{11}+a^{12}+a^{13}+a^{14} \leq 6$, and specifically, $a^{11}=a^{12}=a^{13}=a^{14}=1$.

With respect to compounds of the general formula (C-II), particularly preferable combinations are as described below.

Particularly preferably, $X^{11}$ to $X^{14}$ each independently represents —$SO_2$-$Z^1$ or —$SO_2NR^{23}R^{24}$.

$Z^{11}$s each independently represents preferably a substituted or unsubstituted alkyl group, substituted or unsubstituted aryl group, or substituted or unsubstituted heterocyclic group, and among them, substituted alkyl groups, substituted aryl groups and substituted heterocyclic groups are most preferable.

$R^{23}$s each independently represents a hydrogen atom, substituted or unsubstituted alkyl group, substituted or unsubstituted aryl group, or substituted or unsubstituted heterocyclic group, and among them, a hydrogen atom, substituted alkyl groups, substituted aryl groups and substituted heterocyclic groups are most preferable.

$R^{24}$s each independently represents a substituted or unsubstituted alkyl group, substituted or unsubstituted aryl group, or substituted or unsubstituted heterocyclic group, and among them, a hydrogen atom, substituted alkyl groups, substituted aryl groups and substituted heterocyclic groups are most preferable.

$Y^{11}$ to $Y^{18}$ each independently represents preferably a hydrogen atom, halogen atom, alkyl group, aryl group, cyano group, alkoxy group, amide group, ureide group, sulfoneamide group, carbamoyl group, sulfamoyl group or alkoxycarbonyl group, particularly preferably a hydrogen atom, halogen atom or cyano group, and most preferably a hydrogen atom.

$a^1$ to $a^4$ each independently represents preferably 1 or 2, and particularly preferably 1.

$M^1$ represents a hydrogen atom, metal element or its oxide, hydroxide or halide, and particularly, Cu, Ni, Zn, Al are preferable, and Cu is most preferable.

With respect to preferable substituent combinations of compounds of the general formula (C-II), compounds in which at least one of various substituents is the preferable group are preferable, compounds in which more various substituents are the preferable group are more preferable, and compounds in which all substituents are the preferable group are most preferable.

The compound represented by the general formula (C-I) is, in general, inevitably a mixture of analogous substances having different introduction positions and introduction numbers of substituents Rn (n=1 to 4) and Yq (q=1 to 4) depending on its synthesis method, and the mixture of these analogous substances is indicated in statistically averaged state in may cases. In the invention, these analogous substance mixtures are classified into the following three categories, and a specific mixture has been found to be particularly preferable.

In the invention, phthalocyanine-based dye analogous substance mixtures which are compounds of the general formulae (C-I) and (C-II) are classified into the following three categories and defined based on substitution position.

(1) β-position substitution type: (phthalocyanine-based dyes having a specific substituent at 2 and/or 3-position, 6 and/or 7-position, 10 and/or 11-position, 14 and/or 15-position)

(2) α-position substitution type: (phthalocyanine-based dyes having a specific substituent at 1 and/or 4-position, 5 and/or 8-position, 9 and/or 12-position, 13 and/or 16-position)

(3) α,β-position mixed substitution type: (phthalocyanine-based dyes having a specific substituent at 1 to 16-positions without regularity)

In explaining derivatives of phthalocyanine-based dyes having different structures (particularly, substitution position) in the present specification, the β-position substitution type, α-position substitution type and α,β-position mixed substitution type are used.

The phthalocyanine derivatives used in the invention can be synthesized by a combination of methods described an cited in, for example, coauthored by Shiraiand Kobayashi, published by IPC K.K., "Phthalocyanine-Chemistry and Function—(pp. 1 to 62), coauthoredbyC. C. Leznoff and A. B. P. Lever, published by VCH, "Phthalocyanines-Properties and Applications" (pp. 1 to 54) and the like and methods analogous to them.

The compound represented by the general formula (C-I) of the invention can be synthesized, for example, via sulfonation, sulfonylchlorination and amidation of an unsubstituted phthalocyanine compound as described in WO 00/17275, 00/08103, 00/08101, 98/41853, JP-A No. 10-36471. In this case, sulfonation can take place at any position on a phthalocyanine nucleus and additionally, the number of sulfonation positions cannot be controlled easily. Therefore, when a sulfo group is introduced under such reaction conditions, the positions and numbers of sulfo groups introduced into the product cannot be specified, always resulting in formation of mixtures having different substitution numbers and substitution positions. Therefore, when a compound of the invention is synthesized using this as a raw material, the number and substitution position of heterocyclic ring-substituted sulfamoyl groups cannot be specified, consequently, the compound of the invention is obtained as an α,β-position mixed substitution type mixture containing several compounds having different substituent numbers and different substitution positions.

As described above, when an electron attractive group such as, for example, a sulfamoyl group is introduced in large amount into a phthalocyanine nucleus, the oxidation potential becomes higher, to increase ozone resistance. According to the synthesis method, the number of electron attractive groups introduced is small. Namely, mixing of a phthalocyanine dye having poorer oxidation potential cannot be avoided. Therefore, it is more preferable to use such a synthesis method as to suppress production of a compound having lower oxidation potential, for improving ozone resistance.

In contrast, the compound represented by the general formula (C-II) of the invention can be derived from a compound obtained, for example, by reacting a phthalonitrile derivative (compound P) and/or diiminoisoindoline derivative (compound Q) represented by the following formulae with a metal derivative represented by the following general formula (C-III).

Compound P

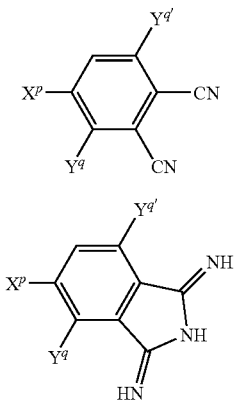

Compound Q

In compounds P and Q, p represents 11 to 14, and q and q' represent each independently 11 to 18.

General formula (C-III)

$$M\text{-}(Y)_d$$

In the general formula (C-III), M is as defined for M in compounds of the general formulae (C-I) and (C-II), and Y represents a mono-valent or di-valent ligand such as a halogen atom, acetate anion, acetylacetonate, oxygen and the like, and d represents an integer of 1 to 4.

Namely, according to the synthesis method, desired substituents can be introduced in specific number. Particularly, when a number of electron attractive groups are introduced for increasing oxidation potential as in the invention, the synthesis method is extremely excellent as compared with the method of synthesizing compounds represented by the general formula (C-I).

Thus obtained compound represented by the general formula (C-II) is usually a mixture of compounds represented by the following general formulae (C-II-1) to (C-II-4) which are isomers at several substitution positions of $Z^p$, namely, of β-position substitution type (phthalocyanine-based dye having a specific substituent at 2 and/or 3-position, 6 and/or 7-position, 10 and/or 11-position, 14 and/or 15-position).

General formula (C-II-1)

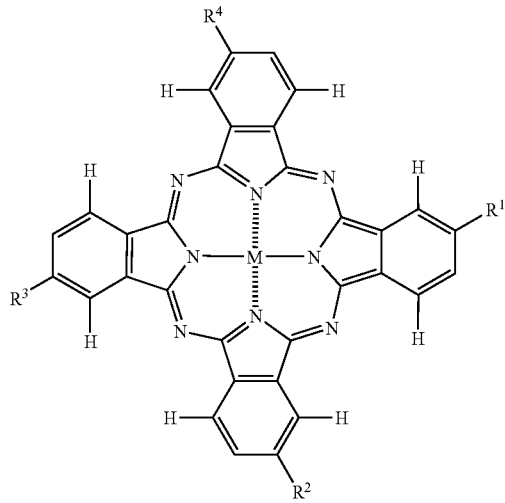

General formula (C-II-2)

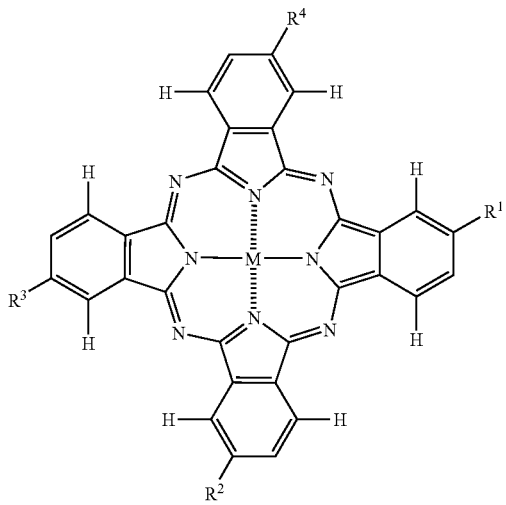

General formula (C-II-3)

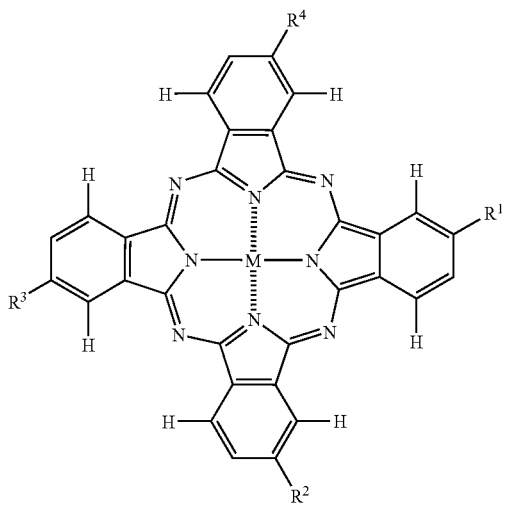

General formula (C-II-4)

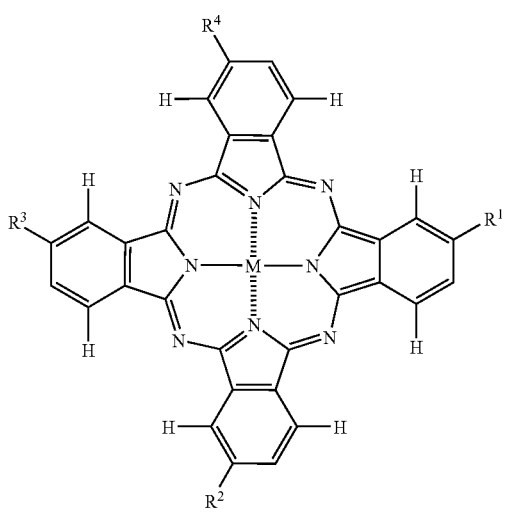

In the general formulae (C-II-1) to (C-II-4), $R^1$ to $R^4$ are as defined for $(X^{11})a^{11}$ to $(X^{14})a^{14}$ in the general formula (C-II).

In the invention, it has been found that it is very important for improvement of fastness that oxidation potential is higher than 1.0 V (vs SCE) at any substitution type. Particularly, there is a tendency that the β-position substitution type is more excellent in color hue, light fastness, ozone gas resistance and the like as compared with the α,β-position mixed substitution type.

As the exemplary compounds represented by the general formula (C-I) or (C-II), compounds (C-101 to C-120) described in Japanese Patent Application No. 2002-10361 are suitably listed, however, the scope of the invention is not limited to them.

The compound represented by the general formula (C-I) can be synthesized according to the patent. The compound represented by the general formula (C-II) can be synthesized by methods described in JP-A Nos. 2000-292645, 2001-237090, 2001-243524, 2001-280387. The starting substances, dye intermediates and synthesis routes are not limited to them.

The content of the oil-soluble dye used in the invention in an ink composition is preferably from 0.05 to 50% by mass, more preferably from 0.1 to 10% by mass based on the ink composition.

(Hydrophobic Polymer)

The hydrophobic polymer used in the invention will be illustrated below.

The colored fine particles contained in the colored fine particles dispersion and ink composition of the invention contain at least one hydrophobic dye and at least one hydrophobic polymer.

The hydrophobic polymer which is one of components constituting the colored fine particles may be a polymer obtained by poly-condensation or a polymer obtained from a vinyl monomer.

As the hydrophobic polymer according to of the invention, a homo-polymer of any monomer selected from monomers shown as specific examples below or a copolymer composed of arbitrary combination of any monomers may be used.

The usable monomer unit is not particularly restricted, and any unit can be used providing it can be polymerized by a usual radical polymerization method.

As the polymer obtained by poly-condensation, polyester-based polymers are preferable, and for example, resins constituted of poly-valent carboxylic acids and polyhydric alcohols and obtained by polymerization of single monomer or two or more monomers in combination, and the like are listed.

The poly-valent carboxylic acids are not particularly restricted, and examples thereof include aromatic poly-valent carboxylic acids, aromatic oxycarboxylic acids, aliphatic dicarboxylic acids, alicyclic dicarboxylic acids and the like exemplified by terephthalic acid, isophthalic acid, orthophthalic acid, 1,5-naphthalenedicarboxylic acid, 2,6-naphthalenedicarboxylic acid, diphenic acid, sulfoterephthalic acid, 5-sulfoisophthalic acid, 4-sulfophthalicacid, 4-sulfonaphthalene-2,7-dicarboxylicacid, 5[4-sulfophenoxy]isophthalic acid, sulfoterephthalic acid, p-oxybenzoic acid, p-(hydroxyethoxy)benzoic acid, succinic acid, adipic acid, azelaic acid, sebacic acid, dodecanedicarboxylic acid, fumaric acid, maleic acid, itaconic acid, hexahydrophthalic acid, tetrahydrophthalic acid, trimellitic acid, trimesic acid and pyromellitic acid, and these can be used also in the form of metal salts, ammonium salt and the like.

The polyhydric alcohols are not particularly restricted, and examples thereof include aliphatic polyhydric alcohols, alicyclic polyhydric alcohols, aromatic polyhydric alcohols and the like exemplified by ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol, polytetramethylene glycol, trimethylolethane, trimethylolpropane, glycerin, pentaerythritol, 1,4-cyclohexanediol, 1,4-cyclohexanedimethanol, spiro glycol, tricyclodecanediol, tricyclodecanedimethanol, metaxylene glycol, orthoxylene glycol, 1,4-phenylene glycol, bisphenol A, lactone-based polyester and polyols.

As the polyester resin obtained by polymerization of the poly-valent carboxylic acids and the polyhydric alcohols singly or in combination of two or more, those of which polar group at the end of a polymer chain has been sealed using a generally known end sealable compound can also be used.

The polymer obtained from a vinyl monomer may be a homo-polymer of any monomer selected from monomers shown as specific examples below or a copolymer composed of arbitrary combination of any monomers.

The usable monomer unit is not particularly restricted, and any material can be used providing it can be polymerized by a usual radical polymerization method.

Specific examples of the monomer include, but not limited to, the following compounds.

Examples of the monomers include olefins, α,β-unsaturated carboxylic acids and salts, α,β-unsaturated carboxylic acid derivatives, α,β-unsaturated carboxylic amides, styrene and its derivatives, vinyl ethers, vinyl esters, other polymerizable monomers.

Examples of the olefins include ethylene, propylene, isoprene, butadiene, vinyl chloride, vinylidene chloride, 6-hydroxy-1-hexene, cyclopentadiene, 4-pentenic acid, methyl 8-nonenoate, vinylsulfonic acid, trimethylvinylsilane, trimethoxyvinylsilane, butadiene, pentadiene, isoprense, 1,4-divinylcyclohexane and 1,2,5-trivinylcyclohexane.

Examples of the α,β-unsaturated carboxylic acids and salts thereof include acrylic acid, methacrylic acid, itaconic acid, maleic acid, sodium acrylate, ammonium methacrylate and potassium itaconate.

Examples of the α,β-unsaturated carboxylic acid derivatives include alkyl acrylates (for example, methyl acrylate, ethyl acrylate, n-butyl acrylate, cyclohexyl acrylate, 2-ethylhexyl acrylate, n-dodecyl acrylate), substituted alkyl acrylates (for example, 2-chloroethyl acrylate, benzyl acrylate, 2-cyanoethyl acrylate, allyl acrylate), alkyl methacrylates (for example, methyl methacrylate, n-methyl methacrylate, 2-ethylhexyl methacrylate, n-dodecyl methacrylate), substituted alkyl methacrylates [for example, 2-hydroxyethyl methacrylate, glycidyl methacrylate, glycerin mono-methacrylate, 2-acetoxyethyl methacrylate, tetrahydrofurfuryl methacrylate, 2-methoxyethyl methacrylate, ω-methoxypolyethylene glycol methacrylate (addition mol number of polyoxyethylene=2 to 100), polyethylene glycol monomethacrylate (addition mol number of polyoxyethylene=2 to 100), polypropylene glycol monomethacrylate (addition mol number of polyoxypropylene=2 to 100), 2-carboxyethyl methacrylate, 3-sulfopropyl methacrylate, 4-oxysulfobutyl methacrylate, 3-trimethoxysilylpropyl methacrylate, allyl methacrylate], unsaturated dicarboxylic acid derivatives (for example, mono-butyl maleate, dimethyl maleate, mono-methyl itaconate and dibutyl itaconate), poly-functional esters (for example, ethylene glycol diacrylate, ethylene glycol dimethacrylate, 1,4-cyclohexane diacrylate, pentaerythritol tetramethacrylate, pentaerythritol triacrylate, trimethylolpropane triacrylate, trimethylolethane triacrylate, dipentaerythritol pentamethacrylate, pentaerythritol hexaacrylate and 1,2,4-cyclohexane tetramethacrylate).

Examples of the α,β-unsaturated carboxylic amides include acrylamide, methacrylamide, N-methylacrylamide, N,N-dimethylacrylamide, N-methyl-N-hydroxyethylacrylamide, N-tert-butylacrylamide, N-tert-octylmethacrylamide, N-cyclohexylacrylamide, N-phenylacrylamide, N-(2-acetoacetoxyethyl)acrylamide, N-acryloylmorpholine, diacetoneacrylamide, itaconic diamide, N-methylmaleimide, 2-acrylamide-2-methylpropanesulfonic acid, methylenebisacrylamide and dimethacryloylpiperazine.

Examples of the styrene and derivatives thereof include styrene, vinyltoluene, p-tert-butylstyrene, vinylbenzoic acid, methylvinylbenzoate, α-methylstyrene, p-chloromethylstyrene, vinylnaphthalene, p-hydroxymethylstyrene, sodium p-styreneslfonate, potassium p-styrenesulfinate, 1,4-divinylbenzene and 2-acryloylethyl 4-vinylbenzoate.

Examples of the vinyl ethers include methyl vinyl ether, butyl vinyl ether and methoxyethyl vinyl ether.

Examples of the vinyl esters include vinyl acetate, vinyl propionate, vinyl benzoate, vinyl salicylate, vinyl chloroacetate and the like.

Examples of the other polymerizable monomers include N-vinylpyrrolidone, 2-vinyloxazoline, 2-isopropenyloxazoline and vinylsulfone.

Among the hydrophobic polymers of the invention synthesized by copolymerization combining the monomers, homopolymers and copolymers composed of acrylamide, methacrylamide, acrylate, methacrylate, styrene, vinyl ester, vinyl ether or olefin as the main component are preferably selected.

Specific examples of the preferable hydrophobic polymers of the invention include, but not limited to, the following compounds. Here, the numerical value showing the composition ratio of monomers indicates percentage by weight.

(P-1) poly(N-tert-butylacrylamide)
(P-2) poly(cyclohexyl methacrylate)
(P-3) poly(n-butyl acrylate)
(P-4) poly(methyl methacrylate)
(P-5) poly(ethyl methacrylate)
(P-6) poly(N-cyclohexylamide)
(P-7) poly(N-sec-butylacrylamide)
(P-8) poly(N,N-di-n-propylacrylamide)
(P-9) N-tert-butylacrylamide/2-hydroxyethyl methacrylate copolymer (80/20)
(P-10) methyl acrylate/2-acrylamide-2-methylpropanesulfonic acid copolymer (98/2)
(P-11) methyl acrylate/2-acrylamide-2-methylpropanesulfonic acid/2-acetoacetoxyethyl methacrylate copolymer (91/5/4)
(P-12) butyl acrylate/sodium 2-acrylamide-2-methylpropanesulfonate/2-acetoacetoxyethyl methacrylate copolymer (90/6/4)
(P-13) butyl acrylate/styrene/methacrylamide/sodium 2-acrylamide-2-methylpropanesulfonate copolymer (55/29/11/5)
(P-14) butyl acrylate/styrene/sodium 2-acrylamide-2-methylpropanesulfonate copolymer (85/10/5)
(P-15) polystyrene
(P-16) poly(4-acetoxystyrene)
(P-17) styrene/methyl methacrylate/sodium acrylate copolymer (45/50/5)
(P-18) 2-(2'-hydroxy-5'-methacryloxyethylphenyl)-2H-benzotriazole/ethyl acrylate/sodium 2-acrylamide-2-methylpropanesulfonate copolymer (74/23/3)
(P-19) N-tert-butylacrylamide/3-acrylamide-3-methylbutanoic acid copolymer (99/1)
(P-20) N-tert-butylacrylamide/methyl acrylate copolymer (50/50)
(P-21) methyl methacrylate/methyl acrylate copolymer (50/50)
(P-22) N-tert-butylacrylamide/sodium 2-acrylamide-2-methylpropanesulfonate copolymer (99/1)
(P-23) N-tert-butylacrylamide/n-butyl acrylate copolymer (50/50)
(P-24) styrene/butadiene/acrylic acid copolymer (85/12/3)
(P-25) styrene/butadiene copolymer (90/10)
(P-26) ethyl acrylate/styrene/butadiene copolymer (40/50/10)
(P-27) styrene/methyl methacrylate copolymer (80/20)
(P-28) ethyl acrylate/styrene/sodium 2-acrylamide-2-methylpropanesulfonate (55/40/5)
(P-29) n-butyl acrylate/styrene copolymer (40/60)
(P-30) n-butyl acrylate/t-butyl acrylate/acrylic acid copolymer (47/50/3)
(P-31) 2-ethylhexylacrylate/styrene copolymer (50/50)
(P-32) poly n-butyl methacrylate
(P-33) n-butyl methacrylate/methacrylic acid copolymer (90/10)
(P-34) 2-ethylhexyl methacrylate/styrene/2-hydroxyethyl methacrylate/acrylic acid copolymer (40/40/18/2)
(P-35) n-dodecyl methacrylate/methyl methacrylate/styrene/sodium styrenesulfonate copolymer (45/25/25/5)
(P-36) benzyl methacrylate/methyl acrylate copolymer (80/20)
(P-37) styrene/n-butyl acrylate/allyl methacrylate copolymer (40/30/30)
(P-38) 2-ethylhexyl methacrylate/styrene/allyl methacrylate/methacrylic acid copolymer (30/35/30/5)
(P-39) vinyl acetate (homo-polymer)
(P-40) t-butylacrylamide/n-butyl acrylate/2-carboxyethyl acrylate copolymer (45/45/10)
(P-41) methyl acrylate/2-acetoacetoxyethyl methacrylate/acrylic acid copolymer (80/17/3)
(P-42) t-butylacrylamide/n-butyl acrylate copolymer (50/50)

The hydrophobic polymers may be used singly or in combination of two or more, if necessary.

Examples of the polymerization initiator used in obtaining the hydrophobic polymer by polymerization include azobis compounds, peroxides, hydroperoxides and redox catalysts, and preferable examples thereof include inorganic peroxides suchaspotassiumpersulfate and ammoniumpersulfate, organic peroxides such as t-butyl peroctoate, benzoyl peroxide, isopropyl percarbonate, 2,4-dichlorobenzoyl peroxide, methyl ethyl ketone peroxide, cumene hydroperoxides and dicumyl peroxide, azo compounds such as 2,2'-azobis isobutyrate, sodium salt of 2,2'-azobiscyanovaleric acid, 2,2'-azobis(2-amidinopropane)hydrochloride, 2,2'-azobis[2-(5-methyl-2-imidazolin-2-yl)propane]hydrochloride and 2,2'-azobis{2-methyl-N-[1,1'-bis(hydroxymethyl)-2-hydroxyethyl]propionamide}, and among them, more preferable examples are potassium persulfate and ammonium persulfate.

Here, a case of synthesizing the hydrophobic polymer by emulsion polymerization will be illustrated below.

In the invention, the hydrophobic polymer can be synthesized by an emulsion polymerization method, and as the emulsifier used in this procedure, anionic, cationic, amphoteric and nonionic surfactants, and additionally, water-soluble polymers, are listed. Specific examples thereof include sodium laurate, sodium dodecylsulfate, sodium 1-octoxycarbonylmethyl-1-octoxycarbonylmethanesulfonate, sodium laurylnaphthalenesulfonate, sodium laurylbenzenesulfonate, sodium laurylphosphate, cetyltrimethylammonium chloride, N-2-ethylpyridinium chloride, polyoxyethylene nonylphenyl ether, polyoxyethylenesorbitanlauryl ester, polyvinyl alcohol, and emulsifiers and water-soluble polymers described in JP-B No. 53-6190.

In the case of synthesis of a hydrophobic polymer according to the invention by emulsion polymerization, a polymerization initiator, concentration, polymerization temperature, reaction time and the like can be easily altered depending on its object. In the emulsion polymerization reaction, all of monomers, surfactant and aqueous medium may be previously placed in a reaction vessel before addition of an initiator to initiate the reaction, alternatively, the reaction may be conducted while dropping part or all of either monomers or initiator solution, or both of them.

The hydrophobic polymer latex of the invention can be easily synthesized by using a usual emulsion polymerization method. The general emulsion polymerization method is described in detain in the following books. "Synthetic resin emulsion" (Taira Okuda, Hiroshi Inagaki, ed., published by Kobunshi Kanko kai, 1978), "Application of synthetic latex" (Takaaki Sugimura, Yasuo Kataoka, Soichi Suzuki, Keishi Kasahara, ed., published by Kobunshi Kanko kai, 1993), "Chemistry of synthetic latex" (Soichi Muroi, ed., published by Kobunshi Kanko kai, 1970).

Additionally, the hydrophobic polymer of the invention can be synthesized also by so-called solution polymerization and block polymerization, as well as emulsion polymerization.

The use amount of a hydrophobic polymer used for preparation of the colored fine particles of the invention is preferably from 10 to 500% by mass, more preferably from 20 to 300% by mass based on dyes co-present in the colored fine particles.

(Organic Solvent having High Boiling Point)

The organic solvent having a high boiling point used in the invention will be described below.

The colored fine particle dispersion of the invention can be prepared by mixing at least one kind of hydrophobic dye, at least one kind of hydrophobic polymer and at least one kind of organic solvents having a high boiling point, and if necessary a solution containing an auxiliary solvent having a boiling point of 200° C. or less and a solubility of water of 25 g or less, and an aqueous medium to cause emulsion dispersion, and in the case of use of the auxiliary solvent, then removing the auxiliary solvent.

In preparation of the colored fine particles, the organic solvent having a high boiling point is an essential component for forming stable colored fine particles excellent in color hue.

In the invention, the organic solvent having a high boiling point is an organic solvent having a boiling point of 200° C. or higher and a melting point of 80° C. or less, and particularly, those having a solubility of water of 4 g or less at 25° C. are preferable. When the solubility of water (25° C.) is over 4 g, increase in particle size and aggregation and the like tend to occur with the lapse of time in colored fine particles constituting an ink composition, and a significant adverse effect may be exerted on the ink ejecting property. The solubility of water is preferably 4 g or less, more preferably 3 g or less, further preferably 2 g or less, particularly preferably 1 g or less.

In the present specification, "solubility of water" is saturated concentration of water in an organic solvent having a high boiling point, and means the mass (g) of water dissolvable in 100 g of an organic solvent having a high boiling point at 25° C.

The use amount of the organic solvent having a high boiling point according to the invention is preferably from 5 to 200% by mass, and more preferably from 10 to 100% by mass, relative to dyes co-present in colored fine particles.

In the invention, the organic solvent having a high boiling point preferably includes compounds of the following formulae [S-1] to [S-9].

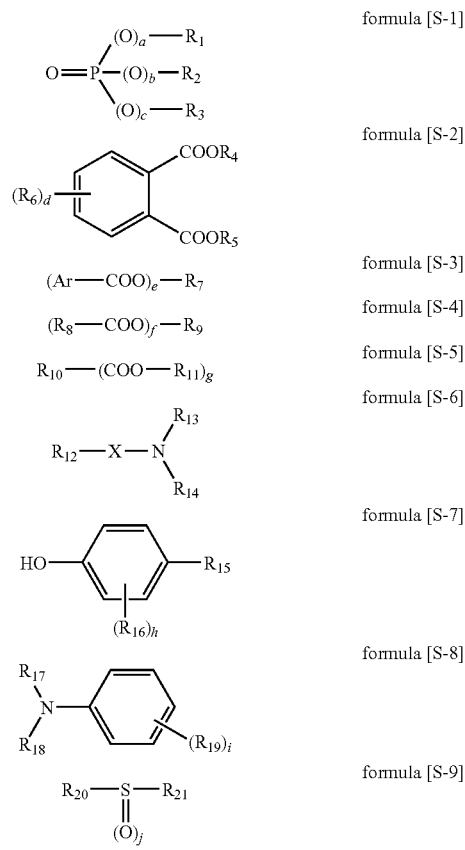

In the formula [S-1], $R^1$, $R^2$ and $R_3$ each independently represents an aliphatic group or aryl group. a, b and c each independently represents 0 or 1.

In the formula [S-2], $R_4$ and $R_5$ each independently represents an aliphatic group or aryl group, $R^5$ represents a halogenatom (F, Cl, Br, I, also in the following descriptions), alkyl group, alkoxy group, aryloxy group, alkoxycarbonyl group or aryloxycarbonyl group, and d represents an integer of 0 to 3. When d denotes 2 or more, a plurality of $R_6$s may be the same or different.

In the formula [S-3], Ar represents an aryl group, e represents an integer of 1 to 6, and $R_7$ represents an e-valent hydrocarbon group or hydrocarbon groups mutually connected via an ether bond.

In the formula [S-4], $R^8$ represents an aliphatic group, f represents an integer of 1 to 6, and $R_9$ represents a f-valent hydrocarbon group or hydrocarbon groups mutually connected via an ether bond.

In the formula [S-5], g represents an integer of 2 to 6, and $R_{10}$ represents a g-valent hydrocarbon group (excepting aryl group), and $R_{11}$ represents an aliphatic group or aryl group.

In the formula [S-6], $R_{12}$, $R_{13}$ and $R_{14}$ each independently represents a hydrogen atom, aliphatic group or aryl group. X represents —CO— or —SO$_2$—. $R_{12}$ and $R_{13}$, or $R_{13}$ and $R_{14}$ may mutually bond to form a ring.

In the formula [S-7], $R_{15}$ represents an aliphatic group, alkoxycarbonyl group, aryloxycarbonyl group, alkylsulfonyl group, arylsulfonyl group, aryl group or cyano group, and $R_{16}$ represents a halogen atom, aliphatic group, aryl group, alkoxy group or aryloxy group, and h represents an integer of 0 to 3. When h represents 2 or more, a plurality of $R_{16}$s may be the same or different.

In the formula [S-8], $R_{17}$ and $R^{18}$ represent each independently an aliphatic group or aryl group, $R_{16}$ represents a halogen atom, aliphatic group, aryl group, alkoxy group or aryloxy group, and i represents an integer of 0 to 4. When i represents 2 or more, a plurality of $R_{19}$s may be the same or different.

In the formula [S-9], $R_{20}$ and $R_{21}$ represent an aliphatic group or aryl group. j represents 1 or 2.

When $R^1$ to $R^6$, $R_8$, $R_{11}$ to $R_{21}$ are an aliphatic group or a group containing an aliphatic group in the formulae [S-1] to [S-9], the aliphatic group may be liner, branched or cyclic, and may contain an unsaturated bond or a substituent. Examples of the substituent include halogen atoms, aryl groups, alkoxy groups, aryloxy groups, alkoxycarbonyl groups, hydroxyl group, acyloxy group and epoxy groups.

When $R^1$ to $R^6$, $R_8$, $R_{11}$ to $R_{21}$ are an alicyclic group, namely, a cycloalkyl group or a group containing a cycloalkyl group in the formulae [S-1] to [S-9], the cycloalkyl group may contain an unsaturated bond in a 3- to 8-membered ring, and may have a substituent or cross-linked group. Examples of the substituent include halogen atoms, aliphatic groups, hydroxyl group, aryl groups, alkoxy groups, epoxy groups and alkyl group, and examples of the cross-linked group include methylene, ethylene and isopropylidene.

When $R^1$ to $R^6$, $R_8$, $R_{11}$ to $R_{21}$ are an aryl group, namely or a group containing an aryl group in the formulae [S-1] to [S-9], the aryl group may be substituted with a substituent such as halogen atoms, aliphatic groups, aryl groups, alkoxy groups, aryloxy groups and alkoxycarbonyl group.

When $R_7$, $R_9$ or $R_{10}$ is a hydrocarbon group in the formulae [S-3], [S-4] and [S-5], the hydrocarbon group may contain a cyclic structure (for example, benzene ring, cyclopentane ring, cyclohexane ring) or unsaturated bond, and may have a substituent. Examples of the substituent include halogen atoms, hydroxyl group, acyloxy group, aryl groups, alkoxy groups and epoxy groups.

Particularly preferable organic solvents having a high boiling point, among organic solvents having a high boiling point of the following formulae [S-1] to [S-9], will be described below.

In the formula [S-1], $R^1$, $R^2$ and $R_3$ each independently represents an aliphatic group having 1 to 24 (preferably, 4 to 18) carbon atoms (hereinafter, abbreviated as C number) (for example, n-butyl, 2-ethylhexyl, 3,3,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl, 4-methylcyclohexyl), or an aryl group having a C number of 6 to 24 (preferably, 6 to 18) (for example, phenyl, cresyl, p-nonylphenyl, xylyl, cumenyl, p-methoxypheyl, p-methoxycarbonylphenyl). a, b and c represent each independently 0 or 1, and more preferably, all of a, b and c are 1.

In the formula [S-2], $R_4$ and $R_5$ represent an aliphatic group having a C number of 1 to 24 (preferably, 4 to 18) (for example, the same groups as the alkyl groups listed for $R^1$, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, menthyl, bornyl, 1-methylcyclohexyl), or an aryl group having a C number of 6 to 24 (preferably, 6 to 18) (for example, the aryl groups listed for $R^1$, 4-t-butylphenyl, 4-t-octylphenyl, 1,3,5-trimethylphenyl, 2,4-di-t-butylphenyl, 2,4-di-t-pentylphenyl), $R^6$ represents a halogen atom (preferably, chlorine atom), alkyl group having a C number of 1 to 18 (for example, methyl, isopropyl, t-butyl, n-dodecyl), alkoxy group having a C number of 1 to 18 (for example, methoxy, n-butoxy, n-octyloxy, methoxyethoxy, benzyloxy), aryloxy group having a C number of 6 to 18 (for example, phenoxy, p-tolyloxy, 4-methoxyphenoxy, 4-t-butylphenoxy), alkoxycarbonyl group having a C number of 2 to 19 (for example, methoxycarbonyl, n-butoxycarbonyl, 2-ethylhexyloxycarbonyl) or aryloxycarbonyl group having a C number of 6 to 25, and d is 0 or 1.

In the formula [S-3], Ar represents an aryl group having a C number of 6 to 24 (preferably, 6 to 18) (for example, phenyl, 4-chlorophenyl, 4-methoxyphenyl, 1-naphthyl, 4-n-butoxyphenyl, 1,3,5-trimethylphenyl), e represents an integer of 1 to 4 (preferably, 1 to 3), and $R_7$ represents an e-valent hydrocarbon group having a C number of 2 to 24 (preferably, 2 to 18) [for example, the alkyl groups listed for $R_4$, cycloalkyl groups, aryl groups, —(CH$_2$)$_2$—,

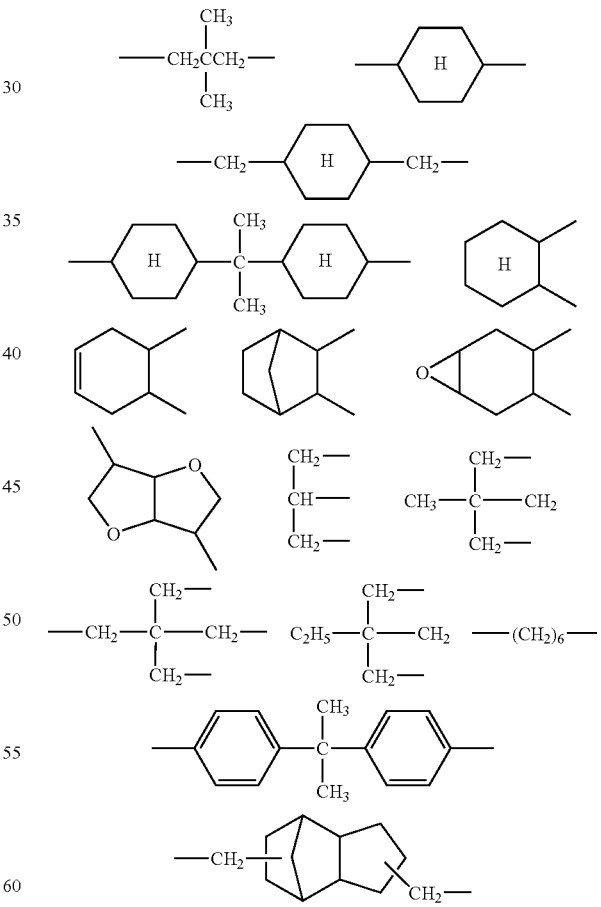

or e-valent hydrocarbon groups having a C number of 4 to 24 (preferably, 4 to 18) mutually connected via an ether bond [for example, —CH$_2$CH$_2$OCH$_2$CH$_2$—, —CH$_2$CH$_2$(OCH$_2$CH$_2$)$_3$—, —CH$_2$CH$_2$CH$_2$OCH$_2$CH$_2$CH$_2$—,

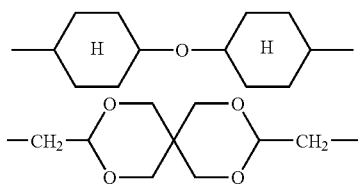

In the formula [S-4], $R_8$ represents an aliphatic group having a C number of 1 to 24 (preferably, 1 to 17) (for example, n-propyl, 1-hydroxyethyl, 1-ethylpentyl, n-undecyl, pentadecyl, 8,9-epoxyheptadecyl, cyclopropyl, cyclohexyl, 4-methylcyclohexyl), f represents an integer of 1 to 4 (preferably, 1 to 3), and $R_9$ represents an f-valent hydrocarbon group having a C number of 2 to 24 (preferably, 2 to 18) or c-valent hydrocarbon groups having a C number of 4 to 24 (preferably, 4 to 18) mutually connected via an ether bond (for example, the groups listed for $R_7$).

In the formula [S-5], g is 2 to 4 (preferably, 2 or 3), $R_{10}$ represents a g-valent hydrocarbon group [for example, $-CH_2-$, $-(CH_2)_2-$, $-(CH_2)_4-$, $-(CH_2)_7-$,

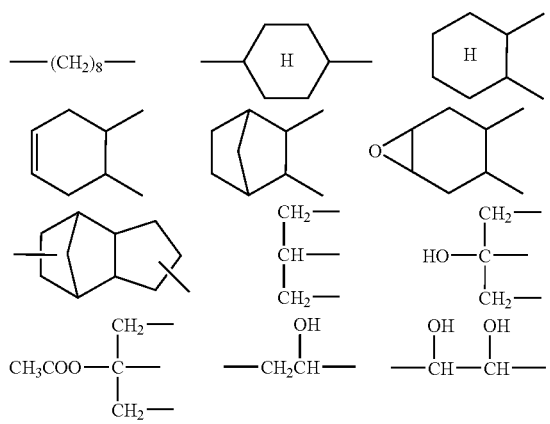

and, $R_{11}$ represents an aliphatic group having a C number of 1 to 24 (preferably, 4 to 18) or an aryl group having a C number of 6 to 24 (preferably, 6 to 18) (for example, the aliphatic groups and aryl groups listed for $R^4$).

In the formula [S-6], $R_{12}$ represents a hydrogen atom, an aliphatic group having a C number of 1 to 24 (preferably, 3 to 20) [for example, n-propyl, 1-ethylpentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy)propyl, cyclohexyl, 4-methylcyclohexyl) or an aryl group having a C number of 6 to 24 (preferably, 6 to 18) (for example, the aryls listed for Ar), and $R_{13}$ and $R_{14}$ represent a hydrogen atom, an aliphatic group having a C number of 1 to 24 (preferably, 1 to 18) (for example, methyl, ethyl, isopropyl, n-butyl, n-hexyl, 2-ethylhexyl, n-dodecyl, cyclopentyl, cyclopropyl) or an aryl group having a C number of 6 to 18 (preferably, 6 to 15) (for example, phenyl, 1-naphthyl, p-tolyl). $R_{13}$ and $R_{14}$ may mutually bond to form a pyrrolidine ring, piperidine ring or morpholine ring together with N, or $R_{12}$ and $R_{13}$ may mutually bond to form a pyrrolidone ring. X is $-CO-$ or $-SO_2-$, preferably X is $-CO-$.

In the formula [S-7], $R_{15}$ represents an aliphatic group having a C number of 1 to 24 (preferably, 3 to 18) (for example, methyl, isopropyl, t-butyl, t-pentyl, t-hexyl, t-octyl, 2-butyl, 2-hexyl, 2-octyl, 2-dodecyl, 2-hexadecyl, t-pentadecyl, cyclopentyl, cyclohexyl), alkoxycarbonyl group having a C number of 2 to 24 (preferably, 5 to 17) (for example, n-butoxycarbonyl, 2-ethylhexyloxycarbonyl, n-dodecyloxycarbonyl), alkylsulfonyl group having a C number of 1 to 24 (preferably, 1 to 18) (for example, methylsulfonyl, n-butylsulfonyl, n-dodecylsulfonyl), arylsulfonyl group having a C number of 6 to 30 (preferably, 6 to 24) (for example, p-tolylsulfonyl, p-dodecylphenylsulfonyl, p-hexadecyloxyphenylsulfonyl), aryl group having a C number of 6 to 32 (preferably, 6 to 24) (for example, phenyl, p-tolyl) or cyano group, $R_{16}$ represents a halogen atom (preferably, Cl), alkyl group having a C number of 1 to 24 (preferably, 1 to 18) (for example, the alkyl groups listed for $R_{15}$), cycloalkyl group having a C number of 3 to 18 (preferably, 5 to 17) (for example, cyclopentyl, cyclohexyl), aryl group having a C number of 6 to 32 (preferably, 6 to 24) (for example, phenyl, p-tolyl), alkoxy group having a C number of 1 to 24 (preferably, 1 to 18) (for example, methoxy, n-butoxy, 2-ethylhexyloxy, benzyloxyl, n-dodecyloxy, n-hexadecyloxy) or aryloxy group having a C number of 6 to 32 (preferably, 6 to 24) (for example, phenoxy, p-t-butylphenoxy, p-t-octylphenoxy, m-pentadecylphenoxy, p-dodecyloxyphenoxy), and h is an integer of 1 to 2.

In the formula [S-8], $R_{17}$ and $R_{18}$ are the same as the $R_{13}$ and $R_{14}$, and $R_{19}$ is the same as the $R_{16}$.

In the formula [S-9], $R_{20}$ and $R_{21}$ are the same as the $R^1$, $R^2$ and $R_3$. j represents 1 or 2, preferably, j is 1.

Specific examples of the organic solvent having a high boiling point used in the invention, compounds (S-1 to S-93) described in Japanese Patent Application No. 2002-10361 are suitably listed, however, the scope of the invention is not limited to them.

In the invention, the organic solvent having a high boiling point may be used singly or in combination of two or more [for example, tricresyl phosphate and dibutyl phthalate, trioctyl phosphate and di(2-ethylhexyl)sebacate, dibutyl phthalate and poly(N-t-butylacrylamide)].

In the invention, the mass ratio of the hydrophobic dye to the organic solvent having a high boiling point is preferably 1:0.01 to 1:1, more preferably 1:0.05 to 1:0.5.

Exemplary compounds other than the organic solvent of high boiling points used in the invention, and/or methods of synthesizing these organic solvents having a high boiling point are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, 5,013,639, EP Nos. 276,319A, 286,253A, 289, 820A, 309,158A, 309,159A, 309,160A, 509,311A, 510,576A, East Germany Patent Nos. 147,009, 157, 147, 159, 573, 225,240A, U.K. Patent No. 2,091,124A, JP-A Nos. 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946 and 4-346338.

(Auxiliary Solvent)

In the invention, an auxiliary solvent can be used, if necessary, together with the organic solvent having a high boiling point. This auxiliary solvent is a solvent having a low boiling point or a water-soluble organic solvent, and a solvent to be removed by vaporization, membrane dialysis, ultrafiltration and the like, after emulsion-dispersion of an organic solvent phase containing a dye.

In the case of preparation of colored fine particles containing at least a hydrophobic dye, hydrophobic polymer and organic solvent having a high boiling point according to of the invention, it is preferable that the auxiliary solvent has a lower solubility in water, for obtaining a dispersion having a narrow particle size distribution and stability. On the other hand, for smooth and easy removal of an auxiliary solvent after emulsion-dispersion, a certain degree of solubility in water is necessary. Consequently, solvents which are completely dissolved in water, for example, methanol, ethanol, isopropyl alcohol and acetone are not preferable for obtaining a dispersion having a narrow particle size distribution and stability.

The solubility in water of the auxiliary solvent according to the invention (for 100 g of water at 25° C.) is preferably 0.5 g or more and 25 g or less, more preferably 1 g or more and 20 g or less.

Preferable specific examples (AS-1 to AS-11) of the auxiliary solvent and solubilities of the solvents in water, are shown below, however, the scope of the invention is not limited to them.

| auxiliary solvent | solubility in water (25° C.) |
|---|---|
| (AS-1) ethyl acetate | 8 g |
| (AS-2) propyl acetate | 2 g |
| (AS-3) 2-ethylbutyl acetate | <1 g |
| (AS-4) 2-ethylene acetate | 20 g |
| (AS-5) 2-ethoxyethyl acetate | 25 g |
| (AS-6) butyl acetate | 2 g |
| (AS-7) ethyl propionate | 2 g |
| (AS-8) acetyl acetone | 12 g |
| (AS-9) ethyl acetoacetate | 12 g |
| (AS-10) 2-(2-n-butoxyethoxy)ethyl acetate | 2 g |
| (AS-11) cyclohexanone | 15 g |

The use amount of the auxiliary solvent in the invention is preferably 1 to 200-fold, more preferably 2 to 100-fold, based on dyes co-present in colored fine particles.

(Ink Composition)

The ink composition of the invention can be used in various fields, and can be suitably used as an ink composition for writing aqueous ink, aqueous printing ink and information recording ink.

The ink composition of the invention may further contain other components appropriately selected, depending on applications and necessity, in addition to the components.

Examples of the other components include known additives such as drying inhibitors, permeation accelerators, ultraviolet absorbers, antioxidants, antifungal agents, pH regulators, surface tension regulators, de-foaming agents, viscosity regulators, dispersing agents, dispersion stabilizers, anticorrosive agents and chelating agents.

The drying inhibitor is used for the purpose of preventing clogging caused by drying of an ink at an ink ejection port of a nozzle used in an ink jet recording method.

The drying inhibitor is preferably a water-soluble organic solvent having a lower vapor pressure than that of water. Specific examples of the drying inhibitor include polyhydric alcohols typified by ethylene glycol, propylene glycol, diethylene glycol, polyethylene glycol, thiodiglycol, dithioglycol, 2-methyl-1,3-propanediol, 1,2,3-hexatriol, acetylene glycol derivatives, glycerin and trimethylolpropane, lower alkyl ethers of polyhydric alcohols such as ethylene glycol monomethyl (or ethyl) ether and triethylene glycol monoethyl (or butyl) ether, heterocyclic rings such as 2-pyrrolidone, N-methyl-2-pyrrolidone, 1,3-dimethyl-2-imidazolidinone and N-ethylmorpholine, sulfur-containing compounds such as sulfolane, dimethylsulfoxide and 3-sulforene, poly-functional compounds such as diacetone alcohol and diethanolamine, urea derivatives. Among them, polyhydric alcohols such as glycerin and diethylene glycol are more preferable.

These may be used singly or in combination of two or more. It is preferable that these drying inhibitors are contained in an ink composition in a proportion of 10 to 50 parts by mass.

Examples of the permeation accelerator include alcohols such as ethanol, isopropanol, butanol, diethylene glycol monobutyl ether, triethylene glycol monobutyl ether and 1,2-hexanediol, sodium laurylsulfate and sodium oleate, and non-ionic surfactants listed as the surfactant for emulsion dispersion. These exhibit a sufficient effect when added into an ink composition in an amount of 10 to 30% by mass, and these are added in an amount in the range not causing bleeding of print, and print through.

The ultraviolet absorber is used for the purpose of improving the storability of images and examples thereof include benzotriazole-based compounds described in JP-A Nos. 58-185677, 61-190537, 2-782, 5-197075 and 9-34057, benzophenone-based compounds described in JP-A Nos. 46-2784, 5-194483 and U.S. Pat. No. 3,214,463, cinnamic acid-based compounds described in JP-B Nos. 48-30492 and 56-21141 and JP-A No. 10-88106, triazine-based compounds described in JP-A Nos. 4-298503, 8-53427, 8-239368, 10-182621 and Japanese Patent Application National Publication (Laid-Open) No. 8-501291, compounds described in Research Disclosure No. 24239, and compounds emitting fluorescence by absorbing ultravioler ray typified by stilbene-based compounds and benzooxazole-based compounds, what is called, fluorescent whitening agents.

The antioxidant is used for the purpose of improving the storability of images, and for example, various organic and metal complex-based anti-fading agents are suitably listed.

Examples of the organic anti-fading agents include hydroquinones, alkoxyphenols, dialkoxyphenols, phenols, anilines, amines, indanes, coumarones, alkoxyanilines and heterocyclic rings.

As the metal complex-based anti-fading agent, a nickel complex and zinc complex are listed, and specifically, compounds described in patents cited in Research Disclosure No. 17643, VII, columns I to J, No. 15162, No. 18716, p. 650, left column, No. 36544, p. 527, No. 307105, p. 872, No. 15162, and compounds included in exemplary compounds and general formulae of typical compounds described in JP-A No. 62-215272, pp. 127 to 137, are suitably listed.

Examples of the antifungal agent include sodium dehydroacetate, sodiumbenzoate, sodiumpyridinethion-1-oxide, ethyl p-hydroxybenzoate, 1,2-benzisothiazoline-3-one and salts thereof. It is preferable that these are contained in an ink in a proportion of 0.02 to 1.00% by mass.

Examples of the pH regulator include hydroxides of alkali metals such as lithium hydroxide and potassium hydroxide, carbonates such as sodium carbonate and sodium hydrogen carbonate, inorganic bases such as potassium acetate, sodium cinnamate and disodium phosphate, and organic bases such as N-methyldiethanolamine and triethanolamine.

Examples of the surface tension regulator include nonionic, cationic and anionic surfactants. For example, the surfactants used for emulsion-dispersion can be used, and as the surfactant used here, those showing a solubility in water at 25° C. of 0.5% or more are preferable.

Preferable examples of the dispersing agent and dispersion stabilizer include the cationic, anionic and nonionic surfactants.

Examples of the de-foaming agent include fluorine-based and silicone-based compounds, and chelating agents typified by EDTA.

The pH value of the ink composition of the invention is preferably 6 to 10, more preferably 7 to 10 from the standpoint of improvement in storage stability. The surface tension of the ink composition is preferably 20 to 60 mN/m, more preferably 25 to 45 mN/m.

The viscosity of the ink composition is preferably 30 mPa·s or less, more preferably 20 mPa·s or less.

(Ink Jet Recording Medium)

The ink jet recording medium of the invention will be described in detail below.

The ink jet recording medium of the invention has a colorant receiving layer of porous structure containing at least polymer fine particles, on a support, and further, has other layers appropriately selected depending on the object and necessity, for example, a back layer, protective layer, intermediate layer, primer layer, cushion layer, antistatic layer, reflection layer, color regulating layer, storability improving layer, adhesion preventing layer, anti-curl layer and smoothing layer. The layers may have a single-layer structure, or a laminated structure.

In the invention, the colorant receiving layer constituting the ink jet recording medium has pores and has a porous structure. This porous structure of the colorant receiving layer formed of secondary particles of polymer fine particles is preferable since porosity can be increased and ink absorption amount can be increased.

Here, a pore distribution curve at adsorption side of the colorant receiving layer can be, for example, measured by a nitrogen gas adsorption method and calculating by a BJH method.

Figure 2:
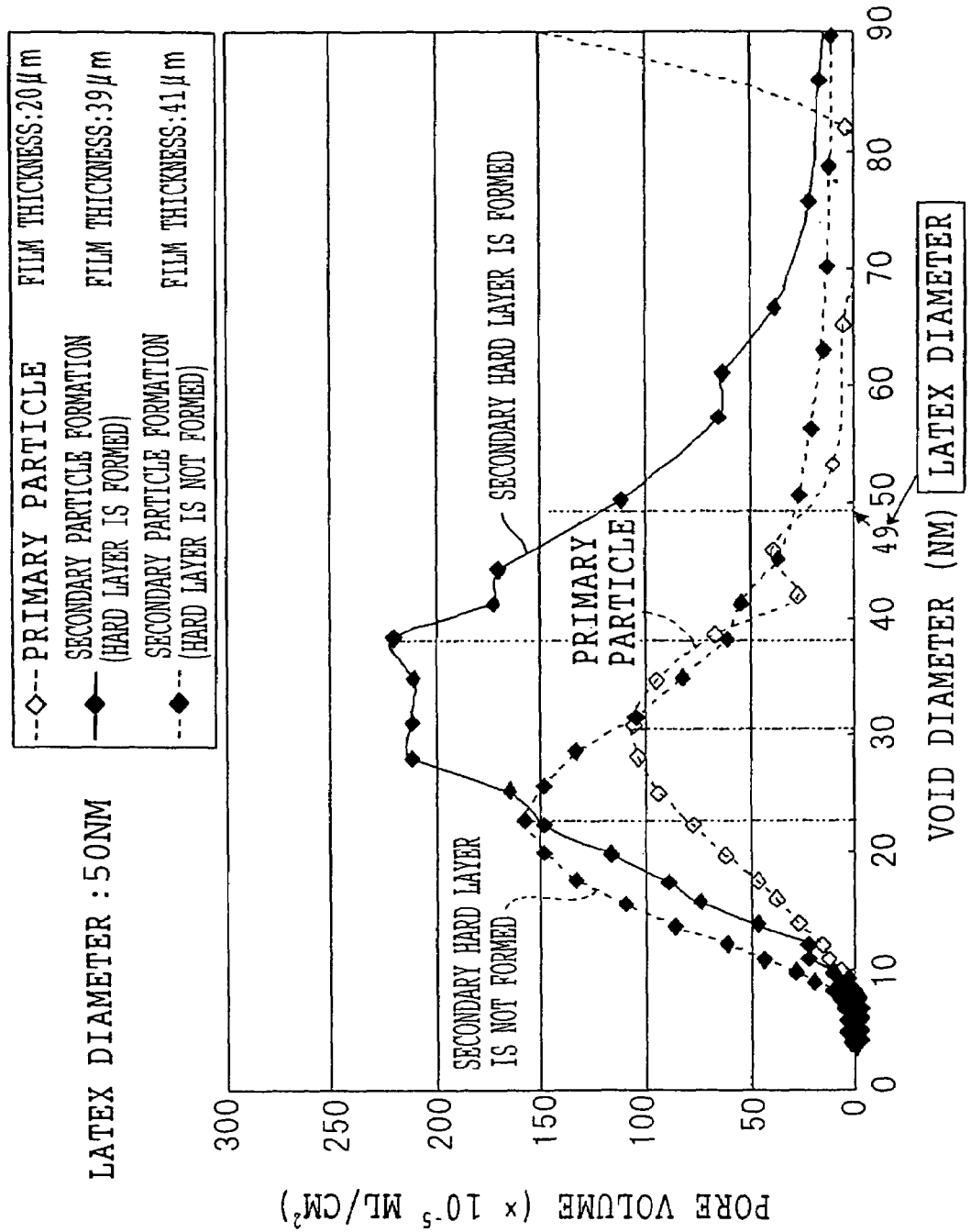
FIG. 2 is a graph showing a pore distribution curve of an ink jet recording sheet.

Specifically, as shown in FIG. 1 (primary particle size of polymer fine particles is 75 nm) and FIG. 2 (primary particle size of polymer fine particles is 49 nm), it is recognized that a pore distribution curve when secondary particles of polymer fine particles are formed and hardened shows increase in maximum peak of the void volume and increase in the corresponding void diameter, as compared with a pore distribution curve when secondary particles are formed without hardening and a pore distribution curve when only primary particles are formed. Optimization of the pore distribution curve of the colorant receiving layer of the porous structure can be derived also from results of examples described later.

Therefore, in the invention, a void volume per unit thickness of the colorant receiving layer (A/B) calculated by dividing a void volume A ($\times 10^{-5}$ ml/cm$^2$) of the colorant receiving layer at the same void diameter as the particle size of the polymer fine particles obtained from a pore distribution curve by a nitrogen gas adsorption method by a dry layer thickness B (μm) of the dye receiving layer is 2.0 ($\times 10^{-5}$ ml/cm$^2$/μm) or more, and the (A/B) is more preferably 3.0 ($\times 10^{-5}$ ml/cm$^2$/μm) or more, particularly preferably 3.0 to 5.0 ($\times 10^{-5}$ ml/cm$^2$/μm).

When the void volume per unit thickness of the colorant receiving layer (A/B) is less than 2.0 ($\times 10^{-5}$ ml/cm$^2$/μm), the porosity of the colorant receiving layer per unit thickness decreases, leading to small ink absorption amount.

The void volume A of the colorant receiving layer at the same void diameter as the particle size of the polymer fine particles varies depending on the dry film thickness of the colorant receiving layer, and it is preferably 50 ($\times 10^{31\ 5}$ ml/cm$^2$) or more, more preferably 100 ($\times 10^{-5}$ ml/cm$^2$) or more, and particularly preferably 130 ($\times 10^{-5}$ ml/cm$^2$) or more.

The void volume A at the same void diameter as the particle size of the polymer fine particles contained in the colorant receiving layer can be measured from a pore distribution curve obtained by measuring by a nitrogen gas adsorption method and calculating by a BJH method.

The ratio [(Y/X)×100] of a void diameter Y (nm) corresponding to the maximum peak of the void volume of the colorant receiving layer obtained from a pore distribution curve by a nitrogen gas adsorption method to the particle size X (nm) of the polymer fine particles is 65% or more, and more preferably 70% or more. When the ratio [(Y/X)×100] is less than 65%, ink absorptivity deteriorates and images bleed in some cases. The dry layer thickness of the colorant receiving layer is not particularly restricted and preferably from 10 to 100 μm, more preferably from 15 to 70 μm, particularly preferably from 20 to 50 μm.

The void diameter Y corresponding to the maximum peak of the void volume by secondary particles of polymer fine particles of the colorant receiving layer obtained from a pore distribution curve by a nitrogen gas adsorption method is 33 nm or more, preferably 35 nm or more, particularly preferably 40 nm or more. If the pore distribution curve of the colorant receiving layer has a maximum peak at a site where the void diameter Y is less than 33 nm, a sufficient ink absorption ability may not be obtained. Here, the maximum peak means a largest one of peaks in the pore distribution curve of the colorant receiving layer.

The maximum peak of the void volume varied depending on the dry layer thickness of the dye receiving layer, and it is, for example, preferably 200 ml/cm$^2$ or more, more preferably 220 ml/cm$^2$ or more. Further, it is preferable that the pore distribution curve has a maximum peak of void volume in the range of void diameter of from 30 to 80 nm.

(Colorant Receiving Layer)

Formation of pores satisfying the characteristics as described above of a colorant receiving layer constituting the ink jet recording medium of the invention is made possible by appropriately regulating the relation of the kind, particle size and form of polymer fine particles which are materials for forming the colorant receiving layer, the kind of a water-soluble resin used together with polymer fine particles, the mixing ratio of a water-soluble resin to polymer fine particles, further, the kind and the addition amount of a cross-linking agent and mordant constituting a colorant receiving layer, the drying conditions and layer thickness in the case of formation of a colorant receiving layer. Components constituting a colorant receiving layer will be described in detail below.

(Polymer Fine Particles)

A porous structure is obtained by inclusion of polymer fine particles in the colorant receiving layer, so that the ink absorptivity can be enhanced. In particular, when solid content in the colorant receiving layer of polymer fine particles is 50% by mass or more, more preferably over 60% by mass, formation of a further excellent porous structure is made possible, and an ink jet recording medium having sufficient ink absorptivity is preferably obtained. The upper limit of the solid content in the colorant receiving layer of polymer fine particles is not particularly restricted, and usually, it is desirably 90% by mass or less. Here, the solid content in the colorant receiving layer of the polymer fine particles is a content calculated based on components other than water in a composition constituting the colorant receiving layer.

The polymer fine particles (latex) can be used in the form of dispersion of various polymers in a hydrophilic solvent. Specifically, water dispersion systems of a (co)polymer of a vinyl monomer, ester-based polymer, urethane-based polymer, amide-based polymer, epoxy-based polymer, amide-based polymer and, modified materials and copolymers of them, can be used. Among them, use of a (co)polymer of a vinyl monomer, urethane-based polymer is preferable, and particularly, a (co) polymer of a vinyl monomer is preferable from the standpoint of ink absorptivity and coating layer strength.

Preferably used as the vinyl monomer are aromatic vinyl compounds (for example, styrene, α-methylstyrene, p-hydroxystyrene, chloromethylstyrene and vinyltoluene), vinyl cyanides (for example, (meth)acrylonitrile and α-chloroacrylonitrile), vinyl carbonates (for example, vinyl acetate, vinyl benzoate, vinyl formate), aliphatic conjugated dienes (for example, 1,3-butadiene and isoprene), alkyl (meth)acrylates (for example, methyl (meth)acrylate, ethyl (meth)acrylate, n-butyl (meth)acrylate, i-butyl (meth)acrylate, 2-ethylhexyl (meth)acrylate, alkylaryl (meth)acrylates (for example, benzyl (meth)acrylate)), (meth)acrylic acid-substituted alkyl esters (for example, glycidyl (meth)acrylate, 2-hydroxyethyl (meth)acrylate, dimethylaminoethyl (meth)acrylate, dimethylaminopropyl (meth)acrylate), alkyl (meth)acrylamides (for example, (meth)acrylamide, dimethyl(meth)acrylamide, N-isopropyl(meth)acrylamide, n-butyl(meth)acrylamide, tert-butyl(meth)acrylamide, tert-octyl(meth)acrylamide), substituted alkyl(meth)acrylamides (for example, dimethylamino(meth)acrylamide, dimethylaminopropyl(meth)acrylamide), and polymerizable oligomers (for example, one-end methacryloylated polymethyl methacrylate oligomer, one-end methacryloylated polystyrene oligomer, one-terminal-end methacryloylated polyethylene glycol).

It is desirable that the polymer fine particles are cross-linked with a poly-functional monomer. Examples of the poly-functional monomer include aromatic divinyl compounds (for example, divinylbenzene, divinylnaphthalene or derivatives thereof), esters and amides of diethylenecarboxylic acid (for example, ethylene glycol di(meth)acrylate, trimethylolpropane tri(meth)acrylate, dipentaerythritol hexa(meth)acrylate), and other divinyl compounds (for example, divinyl sulfide compounds or divinyl sulfone compounds).

The ratio of introduction of a poly-functional monomer into the polymer fine particles is preferably 2% by mole or more, more preferably 5% by mole or more. By this, deformation of particles in application and drying can be prevented, and voids in a colorant receiving layer can be increased.

Usually, these polymer fine particles are obtained by an emulsion polymerization method. The surfactant and polymerization initiator used in this case can be appropriately selected from those used in ordinary methods. Methods of synthesizing the polymer fine particles are described in detail in U.S. Pat. Nos. 2,852,368, 2,853,457, 3,411,911, 3,411,912, 4,197,127, Belgium Patent Nos. 688,882, 691,360, 712,823, JP-B No. 45-5331, JP-A Nos. 60-18540, 51-130217, 58-137831 and 55-50240.

The average particle size of the polymer fine particles is preferably from 10 to 100 nm, more preferably from 15 to 80 nm. Though the glass transition temperature (Tg) of the polymer fine particles is not particularly restricted, those having high glass transition temperature and which are hard are preferable in general from the standpoint of prevention of deformation of particles in application and drying, and can be appropriately selected in view of the relation of the kind of a binder used, the mass ratio to a binder and ink absorptivity.

As the polymer fine particles, those forming secondary particles are preferable, so that the void ratio of a colorant receiving layer can be increased.

(Water-soluble Resin)

In the ink jet recording medium of the invention, its colorant receiving layer contains a water-soluble resin together with the polymer fine particles, in preferable embodiments.

Example of the water-soluble resin include polyvinyl alcohol-based resins having a hydroxyl group as a hydrophilic structure unit [polyvinyl alcohol (PVA), acetacetyl-modified polyvinyl alcohol, cation-modified polyvinyl alcohol, anion-modified polyvinyl alcohol, silanol-modified polyvinyl alcohol, polyvinyl acetyl], cellulose-based resins [methylcellulose (MC), ethylcellulose (EC), hydroxyethylcellulose (HEC), carboxymethylcellulose (CMC), hydroxypropylcellulose (HPC), hydroxyethylmethylcellulose, hydroxypropylmethylcellulose], chitins, chitosans, starch, and resins having an ether bond [polyethylene oxide (PEO), polypropylene oxide (PPO), polyethylene glycol (PEG), polyvinyl ether (PVE)], resins having a carbamoyl group [polyacrylamide (PAAM), polyvinylpyrrolidone (PVP), polyacrylic hydrazide].

Further, polyacrylates, maleic acid resin, alginate and gelatins having a carboxyl group as a dissociable group are exemplified.

Among the compounds, polyvinyl alcohol-based resins are particularly preferable. Examples of the polyvinyl alcohol-based resins are described in JP-B Nos. 4-52786, 5-67432, 7-29479, Japanese Patent No. 2537827, JP-B No. 7-57553, Japanese Patent Nos. 2502998, 3053231, JP-A No. 63-176173, Japanese Patent No. 2604367, JP-A Nos. 7-276787, 9-207425, 11-58941, 2000-135858, 2001-205924, 2001-287444, 62-278080, 9-39373, Japanese Patent No. 2750433, JP-A Nos. 2000-158801, 2001-213045, 2001-328345, 8-324105 and 11-348417.

Examples of water-soluble resins other than the polyvinyl alcohol-based resins are described in JP-A No. 11-165461, paragraphs [0011] to [0014]. These water-soluble resins may be used singly or in combination of two or more.

The content the water-soluble resin of the invention is preferably 4 to 25% by mass, more preferably 5 to 16% by mass based on the total solid weight of a colorant receiving layer.

In ink jet recording, a porous colorant receiving layer obtained as described above can absorb an ink quickly by a capillary phenomenon and form dots of excellent circularity causing no ink bleeding.

(Mass Content Ratio of Polymer Fine Particle to Water-Soluble Resin)

The weight content ratio [PB ratio (x/y)] of polymer fine particles (x) to a water-soluble resin (y) exerts a significant influence also on the layer structure and layer strength of a colorant receiving layer. Namely, when the weight content ratio [PB ratio] increases, porosity, void volume and surface area [per unit weight] increase, while the density and strength tend to decrease.

In the colorant receiving layer of the invention, the weight content ratio [PB ratio (x/y)] is preferably 4/1 to 20/1, more preferably 6/1 to 20/1 from the standpoint of preventing reduction of the layer strength and cracking in drying attributed to an excessively high PB ratio, and preventing lowering in ink absorptivity by decrease in porosity due to tendency of easy clogging of voids with a resin attributed to excessively low PB ratio.

When an ink jet recording medium passes through an ink jet printer, stress may be applied to the recording medium, and therefore, it is necessary that a colorant receiving layer has a sufficient layer strength. When the recording medium is cut into a sheet form, it is preferable that the colorant receiving layer has a sufficient layer strength, for preventing cracking and peeling of the colorant receiving layer.

(Cross-Linking Agent)

In the colorant receiving layer of the ink jet recording medium of the invention, a coating layer containing the water-soluble resin preferably further contains a cross-linking agent capable of cross-linking the water-soluble resin, and particularly, it is preferable that the colorant receiving layer contains the polymer fine particles and the water-soluble resin together, further, the layer is a porous layer hardened by a cross-linking reaction of the cross-linking agent with the water-soluble resin.

For cross-linking of the water-soluble resin, particularly, of polyvinyl alcohol, a boron compound is preferable. Examples of the boron compound include borax, boric acid, borates (for example, orthoborate, $InBO_3$ $ScBO_3$, $YBO_3$, $LaBO_3$, $Mg_3(BO_3)_2$, $CO_3(BO_3)_2$, diborates (for example, $Mg_2B_2O_5$, $CO_2B_2O_5$), metaborates (for example, $LiBO_2$, $Ca(BO_2)_2$, $NaBO_2$1 $KBO_2$), tetraborates (for example, $Na_2B_4O_7 \cdot 10H_2O$) and pentaborates (for example, $KB_5O_8 \cdot 4H_2O$, $Ca_2B_6O_{11} \cdot 7H_2O$, $CsB_5O_5$). Among them, borax, boric acid and borates are preferable from the standpoint of capability of causing a cross-linking reaction quickly, and particularly, boric acid is preferable.

As the cross-linking agent for a water-soluble resin, the following compounds other than boron compounds can also be used:

for example, aldehyde-based compounds such as formaldehyde, glyoxal, glutaraldehyde; ketone-based compounds such as diacetyl, cyclopentanedione; active halogen compounds such as bis(2-chloroethylurea)-2-hydroxy-4,6-dichloro-1,3,5-triazine, 2,4-dichlor-6-S-triazine.sodium salt; active vinyl compounds such as divinylsulfonic acid, 1,3-vinylsulfonyl-1-propanol, N,N'-ethylenebis(vinylsulfonylacetamide), 1,3,5-triacryloyl-hexahydro-S-triazine; N-methylol compounds such as dimethylolurea, methyloldimethylhydantoin; melamine resins (for example, methylolmelamine, alkylated methylolmelamine); epoxy resins; isocyanate-based compounds such as 1,6-hexamethylene diisocyanate; aziridine-based compounds described in U.S. Pat. Nos. 3,017,280, 2,983,611; carboxyimide-based compounds described in U.S. Pat. No. 3,100,704; epoxy-based compounds such as glycerol triglycidyl ether; ethyleneimino-based compounds such as 6-hexamethylene-N,N'-bisethyleneurea; halogenated carboxyaldehyde-based compounds such as mucochloric acid, mucophenoxychloric acid; dioxane-based compounds such as 2,3-dihydroxydioxane; metal-containing compounds such as titanium lactate, aluminum sulfate, chrome alum, potassium alum, zirconyl acetate, chrome acetate; polyamine compounds such as tetraethylenepentamine; hydrazide compounds such as adipic hydrazide; lower molecular weight compounds or polymers containing two or more oxazoline groups.

The cross-linking agents may be used singly or in combination of two or more.

In the invention, it is preferable that the cross-link hardening is conducted by adding a cross-linking agent to a coating solution containing polymer fine particles and a water-soluble resin and the like (hereinafter, referred to as "coating solution A" in some cases) and/or the following basic solution, and applying a basic solution having a pH value of 8 or more (hereinafter, referred to as "coating solution B" in some cases) to a coated layer, (1) simultaneously with formation of the coated layer by applying the coating solution A, or (2) during drying of the coated layer formed by applying the coating solution A and before falling drying rate of the coated layer.

The application of the cross-linking agent is preferably conducted as described below, in the case of a boron compound. Namely, when the colorant receiving layer is a layer obtained by cross-link-hardening an coated layer obtained by applying coating solution comprising polymer fine particles and a water-soluble resin containing polyvinyl alcohol (coating solution A), the cross-link-hardening is conducted by applying a basic solution having a pH value of 8 or more (coating solution B) to a coated layer, (1) simultaneously with formation of the coated layer by applying the coating solution A, or (2) during drying of the coated layer formed by applying the coating solution A and before falling drying rate of the coated layer. A boron compound as a cross-linking agent may be contained in either the coating solution A or the coating solution B, or in both of the coating solution A and coating solution B.

The use amount of the cross-linking agent is preferably 1 to 50% by mass, more preferably 5 to 40% by mass relative to the water-soluble resin.

(Mordant)

In the invention, for improving water-resistance bleeding-resistance of formed images over time, a mordant is preferably contained in a colorant receiving layer. As the mordant, cationic polymers as organic mordants (cationic mordant) or inorganic mordants are preferable, and in the presence of the mordant in a colorant receiving layer, it is possible to cause an interaction between the mordant and a liquid ink having an anionic dye as a colorant to stabilize the colorant and to improve water-resistance and bleeding-resistance over time. An organic mordant and inorganic mordant each may be used singly, or an organic mordant and an inorganic mordant may be used together.

A method of adding the mordant to the coating solution A containing polymer fine particles and water-soluble resin can be used, or, when there is a possibility of occurrence of aggregation of the mordant with polymer fine particles, a method of adding the mordant to the coating solution B can be used.

As the cationic mordant, polymer mordants having a primary to tertiary amino group or a quaternary ammonium base as a cationic group are suitably used, however, cationic non-polymer mordants can also be used. As these mordants, compounds having a weight-average molecular weight of 500 to 100000 are preferable from the standpoint of improvement in ink absorptivity of a colorant receiving layer.

As the polymer mordant, those obtained in the form of a homo-polymer of a monomer (mordant monomer) having a primary to tertiary amino group and its salt or a quaternary ammonium base, a copolymer of the mordant monomer with other monomer (hereinafter, referred to as "non-mordant monomer"), or a poly-condensate thereof, are preferable. These polymer mordants can be used in the form of either a water-soluble resin or water-dispersible latex particles or the like.

Examples of the monomer (mordant monomer) include trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenzylammonium chloride, N,N-diethyl-N-ethyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride, trimethyl-p-vinylbenzylammonium chloride, trimethyl-m-vinylbenzylammonium chloride;

trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl) ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl-N-2-(4-vinylphenyl)ethylammonium acetate; quaternarized substances of methylchloride, ethylchloride, methylbromide, ethylbromide, methyliodide or ethyliodide of N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-dimethylaminoethyl (meth)acrylamide, N,N-diethylaminoethyl (meth)acrylamide, N,N-dimethylaminopropyl (meth)acrylamide, N,N-diethylaminopropyl (meth)acrylamide, or sulfonates, alkylsulfonates, acetates or alkylcarboxylates obtained by substitution of an anionic group in these compounds.

Specific examples thereof include also monomethyldiallylammonium chloride, trimethyl-2-(methacryloyloxy)ethylammonium chloride, triethyl-2-(methacryloyloxy)ethylammonium chloride, trimethyl-2-(acryloyloxy)ethylammonium chloride, triethyl-2-(acryloyloxy)ethylammonium chloride, trimethyl-3-(methacryloyloxy)propylammonium chloride, triethyl-3-(methacryloyloxy)propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino)propylammonium chloride, triethyl-3-(acryloylamino)propylammonium chloride, N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino)propylammonium chloride, triethyl-2-(methacryloyloxy) ethylammonium bromide, trimethyl-3-(acryloylamino) propylammonium bromide, trimethyl-2-(methacryloyloxy) ethylammonium sulfonate, trimethyl-3-(acryloylamino) propylammonium acetate and the like. Additionally, N-vinylimidazole and N-vinyl-2-methylimidazole are also listed as the copolymerizable monomer.

Further, allylamine, diallylamine and their derivatives, salts and the like can also be utilized. Examples of such compounds include allylamine, allylamine hydrochloride, allylamine acetate, allylamine sulfate, diallylamine, diallylamine hydrochloride, diallylamine acetate, diallylamine sulfate, diallylmethylamine and salts thereof (for example, hydrochloride, acetate, sulfate), diallylethylamine and salts thereof (for example, hydrochloride, acetate, sulfate), diallyldimethylammonium salts (chloride, acetate ion and sulfate ion as the counter anion of the salt). These allylamine and diallylamine derivatives are inferior in polymerizability in the form of amine, therefore, it is general that these allylamine and diallylamine derivatives are polymerized in the form of salt, and de-salted if necessary. Further, units such as N-vinylacetamide and N-vinylformamide are polymerized and hydrolyzed to obtain vinylamine units, and these are converted into salts which can be utilized.

The non-mordant monomers denote monomers which do not contain basic or cationic parts such as a primary to tertiary amino group and salts thereof or a quaternary ammonium base and do not show an interaction with a dye in an ink jet ink, or show substantially little interaction with a dye.

Examples of the non-mordant monomer include alkyl (meth)acrylates; cycloalkyl (meth)acrylates such as cyclohexyl (meth) acrylate; aryl (meth) acrylates such as phenyl (meth)acrylate; aralkyl (meth)acrylates such as benzyl (meth) acrylate; aromatic vinyl such as styrene, vinyltoluene, α-methylstyrene; vinyl esters such as vinyl acetate, vinyl propionate, vinyl versatate; allyl esters such as allyl acetate; halogen-containing monomers such as vinylidene chloride, vinyl chloride; vinyl cyanides such as (meth)acrylonitrile; olefins such as ethylene propylene.

The alkyl (meth)acrylate is preferably an alkyl (meth) acrylate having 1 to 18 carbon atoms at the alkyl portion, and examples thereof include methyl (meth)acrylate, ethyl (meth) acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate and stearyl (meth)acrylate. Among them, methyl acrylate, ethyl acrylate, methyl methacrylate, ethyl methacrylate, hydroxyethyl methacrylate are preferable.

The non-mordant monomers can also be used singly or in combination of two or more.

Preferable examples of the polymer mordant include also polydiallyldimethylammonium chloride, polymethacryloyloxyethyl-β-hydroxyethyldimethylammonium chloride, polyethyleneimine, polyallylamine and derivatives thereof, polyamide-polyamine resin, cationated starch, dicyanediamide formalin condensate, dimethyl-2-hydroxypropylammonium salt polymer, polyamidine, polyvinylamine, cyan-based cation resins typified by dicyanediamide-formalin polycondensate, polyamine-based cation resins typified by dicyanediamide-diethylenetriamine polycondensate, epichlorhydrin-dimethylamine addition polymer, dimethyldiallylammonium chloride-SO$_2$ copolymer, diallylamine salt-SO$_2$ copolymer, (meth)acrylate-containing polymers having a quaternary ammonium base-substituted alkyl group at the ester portion, styryl type polymers having a quaternary ammonium base-substituted alkyl group.

Specific examples of the polymer mordant include those described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236, U.S. Pat. Nos. 2,484,430, 2,548,564, 3,148,061, 3,309,690, 4,115,124, 4,124,386, 4,193,800, 4,273,853, 4,282,305, 4,450,224, JP-A Nos. 1-161236, 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, 2001-301314, JP-B Nos. 5-35162, 5-35163, 5-35164, 5-88846, JP-A Nos. 7-118333, 2000-344990, Japanese Patent Nos. 2648847, 2661677. Among them, polyallylamines and derivatives thereof are particularly preferable.

As the organic mordant in the invention, polyallylamines and derivatives thereof having a weight-average molecular weight of 100000 or less are preferable particularly from the standpoint of preventing bleeding over time.

As the polyallylamines and derivatives thereof of the invention, known various allylamine polymers and derivatives thereof can be used. Examples of such derivatives include salts of polyallylamines with acids (the acids include inorganic acids such as hydrochloric acid, sulfuric acid, phosphoric acid, nitric acid, organic acids such as methanesulfonic acid, toluenesulfonic acid, acetic acid, propionic acid, cinnamic acid, (meth)acrylic acid, or combinations thereof, and partial salts of allylamine), derivatives of polyallylamines by a polymer reaction, copolymers of polyallylamines with other copolymerizable monomers (specific examples of the monomers include (meth)acrylates, styrenes, (meth)acrylamides, acrylonitrile, vinyl esters).

Specific examples of the polyallylamines and derivatives thereof include compounds described in JP-B Nos. 62-31722, 2-14364, 63-43402, 63-43403, 63-45721, 63-29881, 1-26362, 2-56365, 2-57084, 4-41686, 6-2780, 6-45649, 6-15592, 4-68622, Japanese Patent Nos. 3199227, 3008369, JP-A Nos. 10-330427, 11-21321, 2000-281728, 2001-106736, 62-256801, 7-173286, 7-213897, 9-235318, 9-302026, 11-21321, WO 99/21901, WO 99/19372, JP-A No. 5-140213, Japanese Patent Application National Publication (Laid-Open) No. 11-506488.

Inorganic mordants can also be used as the mordant of the invention, and poly-valent water-soluble metal salts and hydrophobic metal salt compounds are exemplified.

Specific examples of the inorganic mordants include salts or complexes of metals selected from magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten, bismuth.

Specific examples thereof include calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupric chloride, ammonium copper (II) chloride dihydrate, copper sulfate, cobalt chloride, cobalt thiocyanate, cobalt sulfate, nickel sulfate hexahydrate, nickel chloride hexahyrdate, nickel sulfate tetrahydrate, nickel ammonium sulfate hexahydrate, nickel amidesulfate tetrahydrate, aluminum sulfate, aluminum alum, basic polyaluminum hydroxide, aluminum sulfite, aluminum thiosulfate, polyaluminum chloride, aluminum nitrate nonahydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetyl acetonate, titanium lactate, zirconium acetyl acetonate, zirconyl acetate, zirconyl sulfate, zirconyl ammonium carbonate, zirconyl stearate, zirconyl octylate, zirconyl nitrate, zirconium oxychloride, zirconium hydroxychloride, chromium acetate, chromium sulfate, magnesium sulfate, magnesium chloride hexahydrate, magnesium citrate nonahydrate, sodium phosphorustungstate, sodium tungsten citrate, 12 tungstophosphoric acid n-hydrate, 12 tungstosilic acid 26-hydrate, molybdenum chloride, 12-molybdophosphoric acid n-hydrate, galliumnitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride, bismuth nitrate.

Preferable examples of the inorganic mordant of the invention include aluminum-containing compounds, titanium-containing compounds, zirconium-containing compounds, metal compounds (salts or complexes) of Periodic Table of Element, IIIB group series.

The amount of the mordant contained in a colorant receiving layer in the invention is preferably 0.01 g/m$^2$ to 5 g/m$^2$, more preferably 0.1 g/m$^2$ to 3 g/m$^2$.

(Other Components)

The ink jet recording medium of the invention can contain, if necessary, further various known additives such as acids, ultraviolet absorbers, antioxidants, fluorescent whitening agents, monomers, polymerization initiators, polymerization inhibitors, bleeding inhibitors, preservatives, viscosity stabilizers, de-foaming agents, surfactants, antistatic agents, matting agents, curl inhibitors, water-proofing agents.

In the invention, the colorant receiving layer may contain an acid. By addition of an acid, the pH value of the surface of an colorant receiving layer is regulated at 3 to 8, preferably 5 to 7.5. By this, yellowing-resistance of white background parts is improved, desirably. Measurement of the pH value of surface is conducted by the method A (coating method) among methods of measurement of the pH value of the surface defined by Nippon Kami Parupu Gijutsu Kyokai (J. TAPPI). For example, this measurement can be conducted by using a paper surface PH measurement set "Form MPC", manufactured by KYORITSU CHEMICAL-CHECK, in compliance with the method A.

Specific examples of the acid include formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, metal salicylates (salts of Zn, Al, Ca, Mg), methanesulfonic acid, itaconic acid, benzenesulfonic acid, toluenesulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, sulfanilic acid, sulfamic acid, α-resorcinic acid, β-resorcinic acid, γ-resorcinic acid, gallic acid, phloroglucin, sulfosalicylic acid, ascorbic acid, erisorbic acid, bisphenolic acid, hydrochloric acid, nitric acid, sulfuric acid, phosphoric acid, polyphosphoric acid, boric acid, boronic acid. The addition amount of these acids may be advantageously determined so that the pH value of the surface of a colorant receiving layer is 3 to 8. The acids may also be used in the form of metal salts (for example, salts of sodium, potassium, calcium, cesium, zinc, copper, iron, aluminum zirconium, lanthanum, yttrium, magnesium, strontium, cerium) or amine salt (for example, ammonia, triethylamine, tributylamine, piperazine, 2-methylpiperazine, polyallylamine).

In the invention, it is preferable that a colorant receiving layer contains storage improving agents such as ultraviolet absorbers, antioxidants, bleeding preventing agents and the like.

Examples of these ultraviolet absorbers, antioxidants, bleeding preventing agents include alkylated phenol compounds (including hindered phenol compounds), alkylthiomethylphenol compounds, hydroquinone compounds, alkylated hydroquinone compounds, tocopherol compounds, thiodiphenyl ether compounds, compounds having two or more thioether bonds, bisphenol compounds, O-, N- and S-benzyl compounds, hydroxybenzyl compounds, triazine compounds, phosphonate compounds, acylaminophenol compounds, ester compounds, amide compounds, ascorbic acid, amine-based antioxidants, 2-(2-hydroxyphenyl)benzotriazole compounds, 2-hydroxybenzophenone compound, acrylates, water-soluble or hydrophobic metal salts, organic metal compounds, metal complexes, hindered amine compounds (including TEMPO compound), 2-(2-hydroxyphenyl)1,3,5-triazine compound, metal deactivating agents, phosphite compounds, phosphonite compounds, hydroxylamine compounds, nitron compounds, peroxide scavengers, polyamide stabilizers, polyether compounds, basic auxiliary stabilizers, nucleating agents, benzofuranone compounds, indolinone compounds, phosphine compounds, polyamide compounds, thiourea compounds, urea compounds, hydrazide compounds, amidine compounds, sugar compounds, hydroxybenzoic acid compounds, dihydrozybenzoic acid compounds, trihydroxybenzoic acid compounds.

Among them, alkylated phenol compounds, compounds having two or more thioether bonds, bisphenol compounds, ascorbic acid, amine-based antioxidants, water-soluble or hydrophobic metal salts, organic metal compounds, metal complexes, hindered amine compounds, hydroxylamine compounds, polyamine compounds, thiourea compounds, hidrazide compounds, hydroxybenzoic acid compounds, dihydroxybenzoic acid compounds, and trihydroxybenzoic acid compounds.

Specific examples thereof include compounds described in JP-A Nos. 2002-307822, 10-182621, 2001-260519, JP-B Nos. 4-34953, 4-34513, JP-A No. 11-170686, JP-B No. 4-34512, EP 1138509, JP-A Nos. 60-67190, 7-276808, 2001-94829, 47-10537, 58-111942, 58-212844, 59-19945, 59-46646, 59-109055, 63-53544, JP-B Nos. 36-10466, 42-26187, 48-30492, 48-31255, 48-41572, 48-54965, 50-10726, U.S. Pat. Nos. 2,719,086, 3,707,375, 3,754,919, 4,220,711, JP-B Nos. 45-4699, 54-5324, EP Laid-Open Nos. 223739, 309401, 309402, 310551, 310552, 459416, German Patent No. 3435443, JP-A Nos. 54-48535, 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 66-88381, 63-113536, 63-163351, 63-203372, 63-224989, 63-251282, 63-267594, 63-182484, 1-239282, 2-262654, 2-71262, 3-121449, 4-291685, 4-291684, 5-61166, 5-119449, 5-188687, 5-188686, 5-110490, 5-1108437, 5-170361, JP-B Nos. 48-43295, 48-33212, U.S. Pat. No. 4,814,262, 4,980,275.

The other components may be used singly or in combination of two or more. These other components may be made into a water-soluble substance, dispersion, polymer dispersion, emulsion or oil drop before addition, and may also be enclosed in a micro capsule. In the ink jet recording medium of the invention, the addition amount of these other components is preferably from 0.01 to 10 g/m$^2$.

In the invention, it is preferable that the coating liquid for colorant receiving layer contains a surfactant. As the surfactant, any of cationic, anionic, nonionic, amphoteric, fluorine-based, and silicone-based surfactants can be used.

Examples of the nonionic surfactants include polyoxyalkylene alkyl ethers and polyoxyalkylene alkylphenyl ethers (for example, diethylene glycol monoethyl ether, diethylene glycol diethyl ether, polyoxyethylene lauryl ether, polyoxyethylene stearyl ether, polyoxyethylene nonylphenyl ether), oxyethylene-oxypropylene block polymer, sorbitan fatty esters (for example, sorbitan monolaurate, sorbitan monooleate, sorbitan trioleate), polyoxyethylene sorbitan fatty esters (for example, polyoxyethylene sorbitan monolaurate, polyoxyethylene sorbitan monooleate, polyoxyethylene sorbitan trioleate), polyoxyethylene sorbitol fatty esters (for example, polyoxyethylene sorbitol tetraoleate), glycerin fatty esters (for example, glycerol monooleate), polyoxyethylene glycerin fatty esters (for example, polyosyethylene glycerin monostearate, polyoxyethylene glycerin monooleate), polyoxyethylene fatty esters (for example, polyethylene glycol monolaurate, polyethylene glycol monooleate), polyoxyethylene alkylamine, acetylene glycols (for example, 2,4,7,9-tetramethyl-5-decin-4,7-diol, and ethylene oxide adduct and propylene oxide adduct of this diol), and preferable are polyoxyalkylene alkyl ethers. The nonionic surfactants can be used in first coating liquid and second coating liquid. The nonionic surfactants may be used singly or in combination of two or more.

Examples of the amphoteric surfactants include amino acid types, carboxyammonium betaine types, sulfoneammonium betaine types, ammoniumsulfate betaine types and imidazolium betaine types, and those described, for example, in U.S. Pat. No. 3,843,368, JP-A Nos. 59-49535, 63-236546, 5-303205, 8-262742, 10-282619, Japanese Patent Nos. 2514194, 2759795, JP-A No. 2000-351269 can be suitably used. Among the amphoteric surfactants, amino acid types, carboxyammonium betaine types and sulfoneammonium betaine types are preferable. The amphoteric surfactants may be used singly or in combination of two or more.

Examples of the anionic surfactant include fatty salts (for example, sodium stearate, potassium oleate), alkysulfates (for example, sodium laurylsulfate, triethanolamine laurylsulfate), sulfonates (for example, sodium dodecylbenzenesulfonate), alkylsulfosuccinates (for example, sodium dioctylsulfosuccinate), alkyldiphenyl ether disulfonates and alkylphosphates.

Examples of the cationic surfactant include alkylamine salts, quaternary ammonium salts, pyridinium salts and imidazolium salts.

Example of the fluorine-based surfactant include compounds derived via an intermediate having a perfluoroalkyl group using electrolytic fluorination, telomerization, oligomerization. Examples thereof include perfluoroalkylsulfonates, perfluoroalkylcarbonates, perfluoroalkyl ethylene oxide adducts, perfluoroalkyl trialkyl ammonium salts, perfluoroalkyl group-containing oligomers, perfluoroalkyl phosphates.

The silicone-bases surfactant is preferably a silicone oil modified with an organic group, and it can have a structure modified with an organic group at the side chain of a siloxane structure, a structure modified at both ends, or a structure modified at one end. Examples of the organic group modification include amino modification, polyether modification, epoxy modification, carboxyl modification, carbinol modification, alkyl modification, aralky modification, phenol modification and fluorine modification.

The content of the surfactant is preferably 0.001 to 2.0%, more preferably 0.01 to 1.0% based on coating solution for colorant receiving layer. When the coating is carrried out using two or more solutions as the coating solution for the colorant receiving layer, it is preferable the surfactant is added to each coating solution.

In the invention, it is preferable that a colorant receiving layer contains an organic solvent having a high boiling point for preventing curl. The organic solvent having a high boiling point is an organic compound having a boiling point of 150° C. or more under normal pressure, and is a water-soluble or hydrophobic compound. These may be liquid or solid at room temperature, and may have low molecular weight or high molecular weight.

Specific examples thereof include aromatic carboxylates (for example, dibutyl phthalate, diphenyl phthalte, phenyl benzoate), aliphatic carboxylates (for example, dioctyl adipate, dibutyl sevacate, methyl stearate, dibutyl maleate, dibutyl furamate, triethyl acetylcitrate), phosphates (for example, trioctyl phosphate, tricresyl phosphate), epoxys (for example, epoxidized soy bean, epoxidized fatty methyl), alcohols (for example, stearyl alcohol, ethylene glycol, propylene glycol, diethylene glycol, triethylene glycol, glycerin, diethylene glycol monobutyl ether (DEGMBE), triethylene glycol monobutyl ether, glycerin monomethyl ether, 1,2,3-butanetriol, 1,2,4-butanetriol, 1,2,4-pentanetriol, 1,2,6-hexanetriol, thiodiglycol, triethanolamine, polyethylene glycol), vegetable oils (for example, soybean oil, sunflower oil), higher aliphatic carboxylic acids (for example, linolic acid, oleic acid).

(Support)

As the support of the invention, both of transparent supports made of a transparent material such as plastics and opaque supports made of an opaque material such as paper and the like can be used. For utilizing transparency of a colorant receiving layer, it is preferable to use a transparent support or a highly glossy opaque support. It is also possible to apply a colorant receiving layer to the side of a label of a read-only optical disk such as CD-ROM, DVD-ROM, write once type optical disk such as CD-R, DVD-R, further, rewritable optical disk as a support.

The material which can be used in the transparent support is preferably a material which is transparent and having a nature capable of enduring radiant heat when used in an OHP and back light display. Examples of these materials include polyesters such as polyethylene terephthalate (PET); polysulfones, polyphenylene oxides, polyimides, polycarbonates, and polyamides. Among them, polyesters are preferable, and particularly, polyethylene terephthalate is preferable. The thickness of the transparent support is not particularly restricted and preferably from 50 to 200 μm from the standpoint of easy handling.

As the highly glossy opaque support the surface, on which a colorant receiving layer is provided, has a glossiness of 40% or more are preferable. The glossiness is a value determined by a method described in JIS P-8142 (paper and paperboard 750 mirror surface glossiness test method). Specifically, the following supports are mentioned.

For example, paper supports of high glossiness such as art paper, coat paper, cast coat paper, baryta paper used for a support for silver salt photography; films of high glossiness made opaque by inclusion of a white pigment and the like into a film made of plastic such as polyesters such as polyethylene terephthalate (PET), cellulose esters such as nitrocellulose, cellulose acetate, cellulose acetate butyrate, and polysulfones, polyphenylene oxides, polyimides, polycarbonates, polyamides (surface calender treatment may be performed); and supports having a coat layer made of polyolefin containing or not containing a white pigment provided on the surface of the transparent support or a film of high glossiness containing a white pigment. White pigment-containing foamed polyester films (for example, foamed PET obtained by adding polyolefin fine particles and forming voids by drawing) are also suitably listed. Further, resin-coated paper used as silver salt photographic paper is also suitable.

The thickness of the opaque support is also not particularly restricted, and preferably from 50 to 300 μm from the standpoint of handling.

For improving wet property and adhesion, corona discharge treatment, glow discharge treatment, flame treatment, ultraviolet irradiation treatment may be performed on the surface of the support.

Next, base paper used for the resin-coated paper will be illustrated in detail.

The base paper is made by using wood pulp as a main raw material, and if necessary, using synthetic pulp such as polypropylene and synthetic fiber such as nylon and polyester, in addition to wood pulp. As the wood pulp, any of LBKP, LBSP, NBKP, NBSP, LDP, NDP, LUKP, NUKP can be used, and it is preferable to use LBKP, NBSP, LBSP, NDP or LDP containing predominant amount of short fiber, in large amount. However, the ratio of LBSP and/or LDP is 10% by mass or more and 70% by mass or less.

As the pulp, chemical pulp (sulfate pulp, sulfite pulp) having small impurity content is preferably used, and pulp having improved whiteness by conducting bleaching treatment is also useful.

Into base paper, size agents such as higher fatty acids and alkyl ketene dimmers, white pigments such as calcium carbonate, talc and titanium oxide, paper force enhancing agents such as starch, polyacrylamide and polyvinyl alcohol, water retention agents such as optical whitening agents and polyethylene glycol, dispersing agents, softening agents such as quaternary ammonium, and the like can be appropriately added.

The freeness of pulp used for paper production is preferably 200 to 500 ml under prescription of CSF, and regarding fiber length after tap decomposition, the sum of 24 mesh residue mass % and 42 mesh residue mass % defined in JIS P-8207 is preferably from 30 to 70%. It is preferable that the mass % of 4 mesh residue is 20% by mass or less.

The basic weight of the base paper is preferably from 30 to 250 g, and particularly preferably from 50 to 200 g. The thickness of the base paper is preferably from 40 to 250 μm. Base paper can also be subjected to calender treatment at paper production stage or after paper production, to give high smoothness. The density of base paper is, in general, from 0.7 to 1.2 $g/m^2$ (JIS P-8118).

Further, the rigidity of the base paper is preferably from 20 to 200 g under conditions prescribed in JIS P-8143.

A surface size agent may be applied on the surface of the base paper, and as the size agent, a size agent analogous to a size agent which can be added into the base paper can be used. pH of base paper is preferably from 5 to 9, when measured by a hot water extraction method prescribed in JIS P-8113.

The polyethylene to be used for coating the front surface and rear surface of base paper is mainly a polyethylene of low density (LDPE) and/or a polyethylene of high density (HDPE), and other LLDPE and polypropylene can be partially used.

Particularly, the polyethylene layer, on which a colorant receiving layer is to be formed, that has an improved opaqueness, whiteness and color hue by adding rutile or anatase type titanium oxide, optical whitening agent and ultramarine into polyethylene is preferable, as widely conducted in photographic print paper. Here, the titanium oxide content is preferably from about 3 to 20% by mass, more preferably from 4 to 13% by mass based on polyethylene. The thickness of a polyethylene layer is not particularly restricted, and suitably from 10 to 50 μm both on the front surface and rear surface. Further, a primer layer can also be provided on a polyethylene layer, for imparting close adherence with a colorant receiving layer. As the primer layer, aqueous polyester, gelatin and PVA are preferable. The thickness of the primer layer is preferably from 0.01 to 5 µm.

The polyethylene-coated paper is used also as glossy paper, and paper having a mat surface or silky surface as obtained in usual photographic print paper formed by conducting a so-called embossing treatment, when polyethylene is melt-extruded on the surface of base paper, can also be used.

A back coat layer can also be provided on a support, and as components which can be added to this back coat layer, white pigments, aqueous binders and other components are listed.

Examples of the white pigment contained in the back coat layer include white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydro-halloysite, magnesium carbonate and magnesium hydroxide, and organic pigments such as styrene-based plastic pigments, acrylic plastic pigments, polyethylene, microcapsules, urea resins and melamine resins.

Examples of the aqueous binder used in the back coat layer include water-soluble polymers such as styrene/maleic acid copolymer, styrene/acrylate copolymer, polyvinyl alcohol, silanol-modified polyvinyl alcohol, starch, cationized starch, casein, gelatin, carboxymethylcllulose, hydroxyethylcellulose and polyvinylpyrrolidone, and water-dispersible polymers such as styrene butadiene latex and acryl emulsion. As other components contained in the back coat layer, de-foaming agents, foam-suppressing agents, dyes, optical whitening agents, preservatives and water-proofing agents.

(Production of Ink Jet Recording Medium)

The colorant receiving layer of the ink jet recording medium of the invention is preferably formed, for example, by a method (Wet-on-Wet method) in which a first coating solution containing at least polymer fine particles and water-soluble resin (hereinafter, referred to as "coating solution (A)" in some cases) is applied on the surface of a support, and a second coating solution having a pH value of 8 or more containing at least a mordant (hereinafter, referred to as "coating solution(B)" in some cases) is applied, (1) simultaneously with the application of coating solution (A), or (2) during drying of an coated layer formed by the application of the coating solution (A) and before falling drying rate of the coated layer, then, the coated layer to which the second coating solution has been applied is cross-link hardened. Here, it is preferable that the polymer fine particles of the invention are contained in at least one of the coating solution (A) and coating solution (B). It is preferable that the cross-linking agent capable of cross-linking the water-soluble resin is also contained in at least one of the coating solution (A) and coating solution (B). To provide thus cross-link hardened colorant receiving layer is preferable from the standpoint of ink absorptivity and prevention of cracking of a layer.

By the treatment, a mordant is present in large amount near the surface of the colorant receiving layer, therefore, a colorant for ink jet is sufficiently mordanted and the water-resistance of letters and images after printing is advantageously improved. Part of a mordant may be contained in the coating solution (A), and in this case, the mordant in the coating solution (A) may be the same as or different from the mordant in the coating solution (B).

Application of the coating solution for the colorant receiving layer can be conducted by known application means, such as, for example, an extrusion die coater, air doctor coater, bread coater, rod coater, knife coater, squeeze coater, reverse roll coater and bar coater.

Simultaneously or after application of the coating solution for the colorant receiving layer (coating solution (A)), the coating solution (B) is applied onto the coated layer formed by the coating solution (A), however, the coating solution (B) may also be coated, before the coated layer formed by the coating solution (A) shows falling dryingrate. Namely, a layer is suitably produced by introducing a mordant after application of the coating solution for the colorant receiving layer (coating solution (A)) and during expression of constant drying rate by this coated layer.

Here, the term "before the coated layer shows falling drying rate" indicates usually a process of several minutes immediately after application of coating liquid for colorant receiving layer, and shows a phenomenon of "constant drying rate" in which the content of a solvent (dispersing medium) in the coated layer applied decreases in proportion to time, during the process. Time showing this "constant drying rate" is described, for example, in Chemical Engineering Handbook (pp. 707 to 712, published by Maruzen Co., Ltd., Oct. 25, 1980).

As described above, drying is conducted until the coated layer shows a falling drying rate, after the application of the first coating solution, and this drying is conducted in general, at 50 to 180° C. for 0.5 to 10 minutes (preferably, 0.5 to 5 minutes). This drying time varies naturally depending on coating amount, and usually, the time in this range is suitable.

As the method of imparting before the first coated layer shows a falling drying speed, (1) a method of further applying the coating solution (B) on the coated layer, (2) a method of spraying by a method such as spray and the like, and (3) a method of impregnating a support on which the coated layer has been formed, into the coating solution (B).

The method of applying the coating solution (B) in the method (1) can utilize known application means, such as, a curtain flow coater, extrusion die coater, air doctor coater, bread coater, rod coater, knife coated, squeeze coater, reverse roll coated and bar coater. However, it is preferable to utilize methods in which a coater does not directly contact with the first coated layer already formed, such as the extrusion die coater, curtain flow coater and bar coater.

After coating of the mordant solution (coating solution (B)), drying and hardening are conducted by heating, in general, at 40 to 180° C. for 0.5 to 30 minutes. Particularly, it is preferable to conduct heating at 40 to 150° C. for 1 to 20 minutes.

When the mordant solution (coating solution (B)) is coated simultaneously with application of the coating solution for the colorant receiving layer (coating solution (A)), the coating solution for the colorant receiving layer (coating solution (A)) and the mordant solution (coating solution (B)) are applied simultaneously (multiple coating) onto a support so that the coating solution for the colorant receiving layer (coating solution (A)) comes into contact with the support, then, the solutions are dried and hardened, thus the colorant receiving layer can be formed.

The simultaneous coating (multiple coating) can be performed by a coating method, for example, using an extrusion die coater or curtain flow coater. After simultaneous coating, the formed coated layers are dried, and drying in this case is conducted, generally, by heating the coated layers at 40 to 150° C. for 0.5 to 10 minutes, and preferably at 40 to 100° C. for 0.5 to 5 minutes.

When the simultaneous coating (multiple coating) is performed, for example, by an extrusion die coater, two coating solutions discharged simultaneously are double-layered near the discharge ports of the extrusion die coater, namely, before being transferred onto a support, and under this condition, multiple-coated on the support. The two layers of the coating solutions overlapped before coating are subject to a cross-linking reaction in the vicinity of the interface of the two solutions when being transferred onto a support, consequently, the two solutions tend to be easily mixed to increase viscosity near the discharge ports of the extrusion die coater so that a problem for the coating operation may arise. Therefore, when the simultaneous coating is carried out as described above, it is preferable to perform a simultaneous triple layer coating including the coating of the coating solution for the colorant receiving layer (coating solution (A)) and the mordant solution (coating solution (B)) and the coating of a barrier layer solution (intermediate layer solution) intervening the two solutions.

The barrier layer solution can be selected without limitation. For example, an aqueous solution containing a small amount of a water-soluble resin, and water and the like are mentioned. The water-soluble resin is used in light of coating property for the purpose of thickening and the like, and examples thereof include polymers such as cellulose resins (for example, hydroxypropylmethylcellulose, methylcellulose, hydroxyethylmethylcellulose), polyvinylpyrrolidone, gelatin and the like. The barrier layer solution may also contain the mordant.

After formation of a colorant receiving layer on a support, the colorant receiving layer can be subjected to, for example, a calender treatment passing through between roll nips under heat and pressure using a super calender or gloss calender and the like, to improve the surface smoothness, glossiness, transparency and coated layer strength. However, this calender treatment may be contributable to decrease in porosity (namely, ink absorptivity may decrease), therefore, conditions where reduction of the porosity is small should be selected.

The roll temperature in the case of conducting the calender treatment is preferably from 30 to 150° C., more preferably from 40 to 100° C.

The linear load between rolls in the calender treatment is preferably from 50 to 400 kg/cm, more preferably from 100 to 200 kg/cm.

The dry layer thickness of the colorant receiving layer should be determined in connection with the porosity in the layer, in the case of ink jet recording, since an absorption capacity capable of absorbing all of liquid drops is required. For example, when the ink quantity is 8 nL/mm$^2$ and the porosity is 60%, a layer thickness of about 15 μm or more is necessary.

In view of this point, the dry layer thickness of the colorant receiving layer is preferably from 10 to 100 μm in the case of ink jet recording.

It is preferable that the colorant receiving layer has an excellent transparency, and as its measure, the haze value when the colorant receiving layer is formed on a transparent film support is preferably 30% or less, more preferably 20% or less. The haze value can be measured using a haze meter (trade name: "HGM-2DP", manufactured by Suga Test Instrument Co., Ltd.).

The ink jet recording medium of the invention can be produced also by methods described in JP-A Nos. 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093.

(Ink Jet Recording Method)

The ink jet recording method of the invention is carried out using an ink composition containing a hydrophobic dye and, a colored fine particle dispersion containing a hydrophobic polymer and an organic solvent having a high boiling point and the like, on the ink jet recording medium, and forms images by impinging the droplets of the ink composition onto the image receiving recording medium.

In a preferable embodiment of the ink jet recording method of the invention, after an image has been formed by impinging the droplets of the ink composition onto the image receiving recording medium, the heating treatment and/or pressing treatment is subjected to the colored fine particles and the porous resin layer to fuse the colored fine particles.

In a preferable embodiment, the hydrophobic dyes include at least one compound selected from the group consisting of compounds represented by the general formula (I), compounds represented by the general formula (Y-I), compounds represented by the general formula (M-I) and compounds represented by the general formula (C-I).

The image receiving recording medium is an ink jet recording medium having a support and a colorant receiving layer of porous structure containing at least polymer fine particles provided on the support, wherein a void volume per unit thickness of the colorant receiving layer (A/B) calculated by dividing a void volume A ($\times 10^{-5}$ ml/cm$^2$) of the colorant receiving layer at the same void diameter as the particle size of the polymer fine particles by a dry layer thickness B (pm) of the colorant receiving layer is 2.0 ($\times 10^{-5}$ ml/cm$^2$/μm) or more.

In preferable embodiments, a void volume A of the colorant receiving layer at the same void diameter as the particle size of the polymer fine particles is 50 ($\times 10^{-5}$ ml/cm$^2$) or more, and in preferable embodiments, the ratio $[(Y/X) \times 100]$ of a void diameter Y (nm) corresponding to the maximum peak of the void volume of the colorant receiving layer to the particle size X (nm) of the polymer fine particles is 65% or more.

Further, in a preferable embodiment, the porous structure of the colorant receiving layer is formed of secondary particles of polymer fine particles, and in more preferable embodiment, a void diameter Y corresponding to the maximum peak of a void volume formed of secondary particles of polymer fine particles of the colorant receiving layer is 33 nm or more.

The ink jet recording medium of the invention may be any method, provided that an ink can be effectively released from nozzles and the ink can be applied to a recording medium. Particularly, an ink jet recording method described in JP-A No. 54-59936 in which an ink is subject to an action due to thermal energy and the volume of the ink changes abruptly, so that the ink is discharged from nozzles by the force generated by this change in volume, can be effectively used.

The ink jet recording medium of the invention is not particularly restricted, and includes known methods, for example, an electric charge control method in which an ink is discharged utilizing electrostatic attractive force, a drop on demand method utilizing vibration pressure of a piezo element (pressure pulse method), an acoustic ink jet method in which an electric signal is converted into an acoustic beam and an ink is irradiated with this beam, to cause discharge of the ink utilizing the radiation pressure, and a thermal ink jet in which an ink is heated to form bubbles and the generated pressure is utilized (bubble jet (R) method).

The ink jet recording method includes a method in which an ink having a low concentration called photo ink is ejected in the form of a number of droplets in a small volume, a method in which the image quality is improved by using a plurality of inks having substantially the same color hue and different concentrations, and a method using a colorless and transparent ink.

The ink jet head used in the ink jet recording method of the invention may be of on a demand mode or continuous mode. Specific examples of the discharge method includes electricity-mechanical conversion methods (for example, a single cavity type, double cavity type, vendor type, piston type, share mode type, shared wall type), electricity-heat conversion methods (for example, a thermal ink jet type, bubble jet (registered trademark) type), electrostatic suction methods (for example, an electric field control type, slit jet type) and discharge methods (for example, spark jet type). Any of these methods may be used.

The ink nozzles used for recording by the ink jet recording method of the invention is not particularly restricted, and can be appropriately selected depending on the object.

EXAMPLES

Examples of the present invention will be illustrated below, however, the scope of the invention is not limited to these examples. In the examples, "parts" and "%" are "parts by mass" and "% by mass", respectively, unless otherwise stated.

Production Example 1

Preparation of Colored Fine Particle Dispersion (D-1)

A mixed solution was prepared composed of 10 parts of an auxiliary solvent (ethyl acetate), 0.6 parts of a hydrophobic dye of the following structural formula (a) and 1.8 parts of a hydrophobic polymer (n-butyl acrylate/methyl methacrylate (50/50) copolymer). Separately, a mixed solution was prepared composed of 15 parts of water and 0.3 parts of sodium di(2-ethylhexyl)sulfosuccinate. The two mixed solutions were combined, and emulsion-dispersed using a homogenizer, then, ethyl acetate was removed, to obtain a colored fine particle dispersion having a solid content of 17.5%. The particle size of the colored fine particles in this colored fine particle dispersion was measure by a particle size distribution measuring apparatus, "LB-500" (trade name), manufactured by Horiba Ltd., to find a volume-average particle size of 85 nm. Hereinafter, this is abbreviated as the colored fine particle dispersion (D-1).

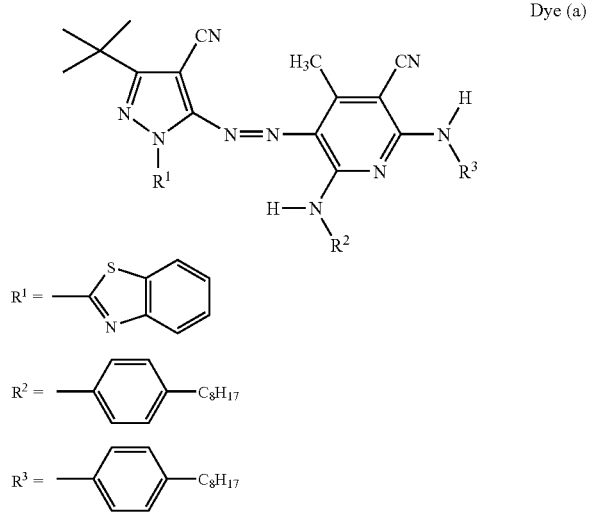

Dye (a)

(Preparation of Ink Composition 01)

The following components were mixed and filtered through a filter of 0.45 μm, to prepare the intended aqueous ink jet recording ink composition (01).

| | |
|---|---|
| The colored fine particle dispersion (D-1) | 50 parts |
| Diethylene glycol | 5 parts |
| Glycerin | 15 parts |
| Diethylene glycol | 1 part |
| Olfin "E1010" | 1 part |
| (surfactant manufactured by Air Products and Chemicals, Inc.) | |
| Water | to give 100 parts in total |

Production Examples 2 to 4

Preparation of Colored Fine Particle Dispersions (D-2 to D-4)

Colored fine particle dispersions (D-2 to D-4) were prepared in the same manner as in Production Example 1 except that the following hydrophobic dyes (b) to (d) were used instead of the hydrophobic dye (a) in Production Example 1.

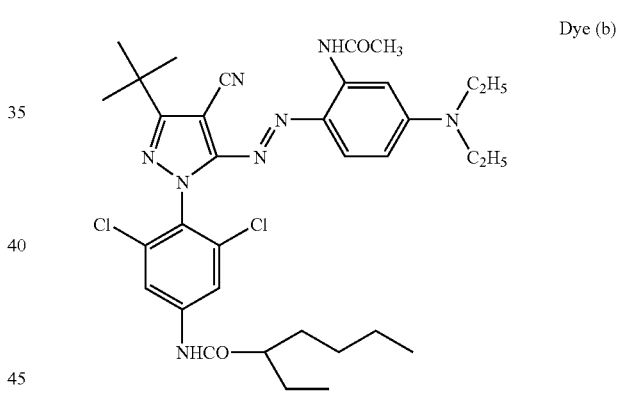

Dye (b)

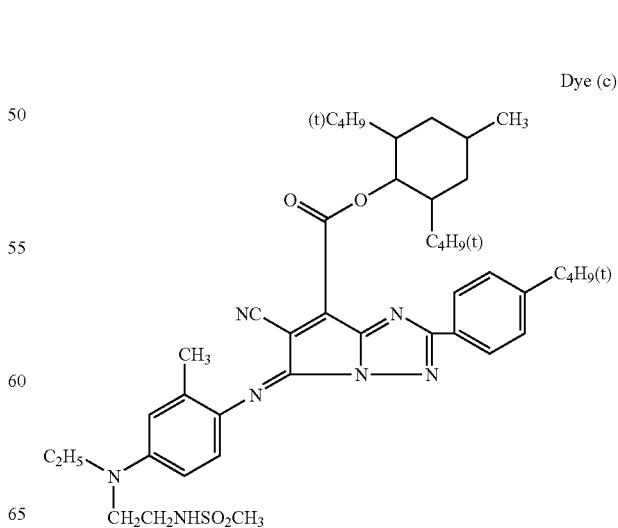

Dye (c)

-continued

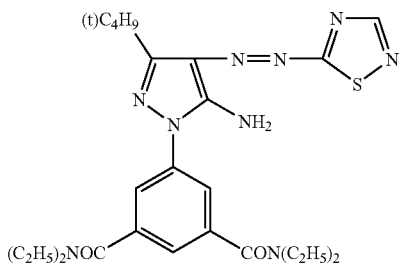

Dye (d)

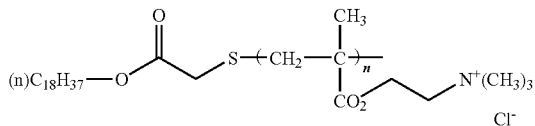

Cation polymer (1)

Number average molecular weight: 4000

(Production of Support)

Wood pulp composed of 100 parts of LBKP was beat-decomposed to 300 ml of Canadian freeness by a double disc refiner, and to this was added 0.5 parts of epoxidated behanic amide, 1.0 part of anion polyacrylamide, 0.1 part of polyamidepolyamineepichlorhydrin and 0.5 parts cation polyacrylamide, each in bone dry mass ratio based on the pulp, and weighed by a fourdrinier machine to produce a base paper of 170 $g/m^2$.

For regulating the surface size of the base paper, 0.04% of a fluorescent whitening agent (trade name: "Whitex BB", manufactured by Sumitomo Chemical Co., Ltd.) was added to a 4% aqueous solution of polyvinyl alcohol, and the base paper was impregnated with the resultant solution, and was dried in an amount of 0.5 $g/m^2$ in terms of a bone drymass. Thereafter, this paper was subjected to a calender treatment to obtain a base paper having a density regulated to 1.05 g/cc.

Corona discharge treatment was conducted on the wire surface (rear surface) side of the resultant base paper, and high density polyethylene was coated on this using an melt extruder to obtain a thickness of 19 μm, to form a resin layer having a mat surface (hereinafter, this resin layer surface is abbreviated as "rear surface"). Corona discharge treatment was further performed on the resin layer on the rear surface side, and a dispersion prepared by dispersing aluminum oxide (trade name: "Alumina sol 100", manufactured by Nissan Chemical Industries, Ltd.) and silicon dioxide (trade name: "Snowtex O", manufactured by Nissan Chemical Industries, Ltd.) at a mass ratio of 1:2 in water was applied as an antistatic agent so that the dry weight was 0.2 $g/m^2$.

Further, corona discharge treatment was performed on the felt surface (front surface) side on which the resin layer was not provided, and thereafter, low density polyethylene containing 10% of anatase type titanium dioxide, a trace amount of ultramarine and 0.01% (based on polyethylene) of a fluorescent whitening agent and having a MFR (melt flow rate) of 3.8 was extruded using a melt extruder to form a thickness of 29 μm, to obtain a thermoplastic resin layer of high glow on the front surface side of the base paper (hereinafter, this high glossiness surface is abbreviated as "front surface"), obtaining the intended support.

(Preparation of Ink Compositions 02 to 04)

Aqueous ink jet recording ink compositions (02 to 04) were prepared in the same manner as for the ink composition (01) except that the colored fine particle dispersions (D-2 to D-4) were used instead of the colored fine particle dispersion (D-1) in the preparation of the ink composition (01).

Synthetic Example 1

Production of Polymer Fine Particles (1)

To 160 parts of ion exchange water was added 0.6 parts of sodium dodecylsulfate, 27 parts of methyl methacrylate and 3 parts of divinylbenzene, and the mixture was heated while the mixture was stirred under nitrogen gas flow at a temperature 70° C. To this was added an initiator solution prepared by dissolving 0.40 parts of potassium peroxydisulfate in 10 parts of ion exchange water. Further, they were reacted at a temperature of 70° C. for 2 hours while stirring the mixture under a nitrogen gas flow, to obtain a 15.0% suspension of polymer fine particles (1). The resulted polymer fine particles (1) had an average particle size of 49 nm.

Synthetic Example 2

Production of Polymer Fine Particles (2)

A 15.0% suspension of polymer fine particles (2) was obtained in the same manner as in Synthetic Example 1 except that the amount of sodium dodecylsulfate was changed to 1.5 parts from 0.6 parts in Synthetic Example 1. The resultant polymer fine particles (2) had an average particle size of 30 nm.

Synthetic Example 3

Production of Polymer Fine Particles (3)

A 15.0% suspension of polymer fine particles (3) was obtained in the same manner as in Synthetic Example 1 except that 3 parts of divinylbenzene was substituted by 3 parts of ethylene glycol dimethacrylate in Synthetic Example 1. The resultant polymer fine particles (3) had an average particle size of 39 nm.

Synthetic Example 4

Production of Polymer Fine Particles (4)

A 15.0% suspension of polymer fine particles (4) was obtained in the same manner as in Synthetic Example 1 except that 0.6 parts of sodium dodecylsulfate was substituted by 1.5 parts of a cation polymer (1) of the following structural formula in Synthetic Example 1. The resultant polymer fine particles (4) had an average particle size of 75 nm.

Example 1

(Preparation of Coating Solution A for Colorant Receiving Layer)

A polymer fine particle suspension, a surfactant solution, a polyvinyl alcohol solution and ion exchange water were mixed in the order as shown in the following composition while stirring them, to prepare a coating solution A for a colorant receiving layer.

| <Composition of coating solution A for colorant receiving layer> | |
|---|---|
| Polymer fine particles suspension in Synthetic Example 1 | 10.0 parts |
| Polyoxyethylene lauryl ether (surfactant) (trade name: "Emulgen 109P", manufactured by Kao Corp., 10% aqueous solution, HLB value: 13.6) | 0.14 parts |
| Polyvinyl alcohol (water-soluble resin) 7% aqueous solution (trade name: "PVA 420", manufactured by Kurary Co., Ltd., degree of saponification: 78%, degree of polymerization: 2,000) | 2.40 parts |
| Ion exchange water | 7.76 parts |

(Production of Ink Jet Recording Sheet)

Corona discharge treatment was conducted on the front surface of the support, and thereafter, the coating liquid (A) for colorant receiving layer obtained above was applied onto the front surface of the support using an extrusion die coater in an coating amount of 180 ml/m$^2$, and dried by a hot air drier at a temperature of 80° C. (wind velocity: 3 to 8 m/second) until the solid concentration of the coated layer reached 20%. This coated layer showed constant drying rate during this operation. Immediately after this, the support was immersed into a cross-linking agent coating solution (B) of the following composition for 30 seconds to adhere in an amount of 20 g/m$^2$ thereof onto the coated layer (process of coating the cross-linking agent solution), further, drying at 80° C. was conducted for 10 minutes (drying process).

By this, an ink jet recording sheet (1) of the invention carrying a colorant receiving layer having a dry layer thickness of 39 μm provided thereof was produced.

| <Composition of cross-linking agent coating liquid B> | |
|---|---|
| Boric acid (cross-linking agent) | 6.6 parts |
| Polyallylamine "PAA-10C" 10% aqueous solution (mordant, manufactured by Nittobo) | 66 parts |
| Ion exchange water | 157 parts |
| Ammonium chloride (surface pH regulator) | 2.6 parts |
| Polyoxyethylene lauryl ether (surfactant) (trade name: "Emulgen 109P", manufactured by Kao Corp., 2% aqueous solution, HLB value: 13.6) | 26.4 parts |
| Megaface F1405 10% aqueous solution (fluorine-based surfactant manufactured by Dainippon Ink and Chemicals, Incorporated) | 5.3 parts |

A print was prepared by using the ink composition (01) in the above on the ink jet recording sheet (1) obtained above using an ink jet printer "PM-890C" (trade name), manufactured by Seiko Epson Corporation, to produce a sample (A) for test evaluation.

Example 2

An ink jet recording sheet (2) of the invention was produced in the same manner as in Example 1 except that 10 parts of the polymer fine particle suspension in Synthetic Example 2 was used instead of 10 parts of the polymer fine particle suspension in Synthetic Example 1 in preparation of the coating solution (A) for colorant receiving layer, in Example 1. Then, a print was prepared by using the ink composition (01) in the same manner as in Example 1, to obtain a sample (B) for test evaluation.

Example 3

An ink jet recording sheet (3) of the invention was produced in the same manner as in Example 1 except that 10 parts of the polymer fine particle suspension in Synthetic Example 3 was used instead of 10 parts of the polymer fine particle suspension in Synthetic Example 1 in the coating solution (A) for colorant receiving layer, in Example 1. Then, a print was prepared by using the ink composition (01), to obtain a sample (C) for test evaluation.

Example 4

An ink jet recording sheet (4) of the invention was produced in the same manner as in Example 1 except that 10 parts of the polymer fine particle suspension in Synthetic Example 4 was used instead of 10 parts of the polymer fine particle suspension in Synthetic Example 1 in the coating solution (A) for colorant receiving layer, in Example 1. Then, a print was prepared by using the ink composition (01), to obtain a sample (D) for test evaluation.

Example 5

A sample (E) for test evaluation was obtained in the same manner as in Example 1 except that printing was conducted using the ink composition (02) prepared above instead of the ink composition (01), in Example 1.

Example 6

A sample (F) for test evaluation was obtained in the same manner as in Example 1 except that printing was conducted using the ink composition (03) prepared above instead of the ink composition (01), in Example 1.

Example 7

A sample (G) for test evaluation was obtained in the same manner as in Example 1 except that printing was conducted using the ink composition (04) prepared above instead of the ink composition (01), in Example 1.

Comparative Example 1

An ink jet recording sheet (1) for comparison was produced in the same manner as in Example 1 except that "PVA 124" (trade name), manufactured by Kuraray Co., Ltd. was used instead of polyvinyl alcohol "PVA420" (trade name) in preparation of the coating solution (A) for colorant receiving layer, in Example 1, and printing was conducted in the same manner as in Example 1 to produce a sample (H) for test evaluation.

Comparative Example 2

An ink jet recording sheet (2) for comparison was produced in the same manner as in Example 1 except that 6.6 parts of boric acid was deleted in the cross-linking agent coating solution (B), in Example 1, and printing was conducted in the same manner as in Example 1 to produce a sample (I) for test evaluation.

Comparative Example 3

A sample (J) for test evaluation was produced in the same manner as in Example 1 except that printing was conducted using amagenta ink "PM890C" (trade name), manufactured by Seiko Epson Incorporated instead of the ink composition (01), in Example 1.

(Pore Distribution Curve)

Next, regarding the ink jet recording sheets (1) to (7) of the invention and the ink jet recording sheets (1) to (3) for comparison obtained above, pore distribution curves at the adsorption side of the colorant receiving layer were measured and the results are shown in Table 1. Here, the measurements were conducted using a high speed specific surface area/pore distribution measuring apparatus, "ASAP-2400" (trade name), manufactured by Shimadzu Micromelitex, and analysis was conducted-according to "BJH" method.

density of the print surface was measured by a Macbeth reflection densitometer, and evaluated according to the following criteria.

<Evaluation Criteria>
AA: Reflection density was 2.0 or more.
BB: Reflection density was 1.8 or more and less than 2.0.
CC: Reflection density was less than 1.8.

(3) Bleeding Over Time

Using an ink jet printer, "PM-900C" (trade name), manufactured by Seiko Epson Corporation, grid-like line patterns having magenta ink and black ink patterns adjacent to each other (line width: 0.28 mm) were printed on each ink jet recording sheet, and the visual densities (OD fresh) were

TABLE 1

|  | Particle size X of polymer fine particles (nm) | Gas adsorption peak top $Y^{*1}$ (nm) | $(Y/X) \times 100$ (%) | Void volume $A^{*2}$ ($\times 10^{-5}$ ml/cm$^2$) | Layer thickness B (μm) | A/B ($\times 10^{-5}$ ml/cm$^2$/μm) |
|---|---|---|---|---|---|---|
| Example 1 | 49 | 36 | 73 | 140 | 39 | 3.6 |
| Example 2 | 30 | 35 | 117 | 130 | 37 | 3.5 |
| Example 3 | 39 | 37 | 95 | 140 | 39 | 3.6 |
| Example 4 | 49 | 40 | 82 | 150 | 40 | 3.8 |
| Example 5 | 75 | 55 | 73 | 180 | 44 | 4.1 |
| Example 6 | 49 | 36 | 73 | 130 | 34 | 3.8 |
| Example 7 | 49 | 38 | 78 | 160 | 39 | 4.1 |
| Comparative Example 1 | 49 | 30 | 61 | 40 | 26 | 1.5 |
| Comparative Example 2 | 49 | 24 | 49 | 40 | 36 | 1.1 |
| Comparative Example 3 | 49 | 22 | 45 | 38 | 35 | 1.1 |

In the above Table 1, $*^1$Y (nm) represents void diameter of a colorant receiving layer corresponding to the maximum peak of a pore distribution curve at the absorption side measured by a nitrogen gas absorption method and calculated by a BJH method,
$*^2$A ($\times 10^{-5}$ ml/cm$^2$) represents a void volume of a colorant receiving layer at the same pore size as the particle size of polymer fine particles.

(Evaluation Test)

With respect to the print samples (A to J) obtained above, the following evaluation tests were conducted, and the results are shown in the following Table 2.

(1) Ink Absorptivity

Using an ink jet printer, "PM-900C" (trade name), manufactured by Seiko Epson Corporation, solid images of Y (yellow), M (magenta), C (cyan), K (black), B (blue), G (green) and R (red) were printed on each ink jet recording sheet, immediately after this (after about 10 seconds), paper was pressed to contact on the images, and transferring of the ink to the paper was observed visually and evaluated according to the following criteria. Here, when transfer of the ink onto the paper is not observed, the ink absorption speed is regarded as excellent.

<Evaluation Criteria>
AA: Transfer of ink onto paper was not observed at all.
BB: Transfer of ink onto paper was observed partially.
CC: Transfer of ink onto paper was fairly observed.

(2) Print Density

Using an ink jet printer, "PM-900C" (trade name), manufactured by Seiko Epson Corporation, a solid image of K (black) was printed on each ink jet recording sheet, and after the print was allowed to stand for 3 hours, the reflection measured by X-Rite "310TR" (trade name, manufactured by X-Rite Inc.). After the measurements, the each printed ink jet recording sheet was placed in a clear holder file, and stored in a thermo-hygrostat of a temperature of 35° C. and a relative humidity of 80% for 3 days, then, the visual densities (OD thermo) were again measured, and the density change ratio [(OD thermo/OD fresh)×100] were calculated and evaluated according to the following criterion. Here, when the value of the density change ratio is smaller, bleeding over time is smaller, indicating an excellent result.

<Evaluation Criteria>
AA: Concentration change ratio is less than 140%.
BB: Concentration change ratio is 140% or more and less than 160%.
CC: Concentration change ratio is 160% or more.

(4) Light Fastness

Using an ink jet printer, "PM-900C" (trade name), manufactured by Seiko Epson Corporation, solid images of magenta and cyan were printed on each ink jet recording sheet, then, were subjected to a cycle test including irradiation with a lamp for 3.8 hours under environmental conditions at a temperature of 25° C. and a relative humidity of 32% using Xenon Weather-ometer "Ci65A" (trade name, manufactured by ATLAS) through a filter blocking ultraviolet ray of a wavelength range of 365 nm or less and, then, was allowed to stand for 1 hour under environmental conditions at a temperature of 20° C. and a relative humidity of 91% without irradiation with light repeatedly over a period of 168 hours. Image density of each color before and after this test were measured by a Macbeth reflection densitometer, and the remaining ratio of the density of each color was calculated and evaluated according to the following criteria.

<Evaluation Criteria>
AA: Remaining ratio is 80% or more.
BB: Remaining ratio is less than 80% and 70% or more.
CC: Remaining ratio is less than 70%.

TABLE 2

| | Ink absorptivity | Print density | Bleeding resistance over time | Color fading |
|---|---|---|---|---|
| Example 1 (A) | AA | AA | AA | AA |
| Example 2 (B) | AA | AA | AA | AA |
| Example 3 (C) | AA | AA | AA | AA |
| Example 4 (D) | AA | AA | AA | AA |
| Example 5 (E) | AA | AA | AA | AA |
| Example 6 (F) | AA | AA | AA | AA |
| Example 7 (G) | AA | AA | AA | AA |
| Comparative Example 1 (H) | CC | Measurement impossible*3 | Measurement impossible*3 | Measurement impossible*3 |
| Comparative Example 2 (I) | CC | Measurement impossible*3 | Measurement impossible*3 | Measurement impossible*3 |
| Comparative Example 3 (J) | AA | AA | BB | CC |

In the Table 2, *3 "measurement impossible" indicates that an ink could not absorbed sufficiently and an image bled and its evaluation was impossible.

As is apparent from the results in Table 2, the ink jet recording sheets according to the invention (Examples 1 to 7) were excellent in ink absorptivity, and had excellent abilities of the print density, bleeding resistance over time and light fastness. On the other hand, the ink jet recording sheets in Comparative Examples 1 and 2 showed poor ink absorptivity, and image bleeding resistance. In the case of the ink jet recording sheet using conventional silica particles of Comparative Example 3, ink absorptivity was excellent and excellent image density was observed, however, bleeding resistance over time and light fastness were inferior to those in Examples 1 to 7.

According to the invention, The ink jet recording method showing an excellent discharge stability and ink absorptivity, and giving excellent print density, bleeding resistance over time and light fastness can be provided.

What is claimed is:

1. An ink jet recording method for recording on an ink jet recording medium comprising a support and a colorant receiving layer provided on the support, wherein the colorant receiving layer has a porous structure containing at least organic polymer fine particles, the method comprising utilizing an ink composition comprising a colored fine particle dispersion containing at least one kind of hydrophobic dye, at least one kind of hydrophobic polymer and at least one kind of organic solvent having a high boiling point, wherein a void volume per unit thickness (A/B) of the colorant receiving layer calculated by dividing a void volume A ($\times 10^{-5}$ ml/cm$^2$) of the colorant receiving layer at a void diameter equal to a particle size of the polymer fine particles obtained from a pore distribution curve by a nitrogen gas adsorption method, by a dry layer thickness B (μm) of the colorant receiving layer is 3.0 to 5.0 ($\times 10^{-5}$ ml/cm$^2$/μm), wherein the colorant receiving layer is formed by:
adding a cross-linking agent to at least one of a) the coating solution containing polymer fine particles and a water-soluble resin, and b) the following basic solution;
applying a basic solution having a pH value of 8 or more to a coated layer, (1) simultaneously with formation of the coated layer by applying the coating solution, or (2) during drying of the coated layer formed by applying the coating solution and before falling drying rate of the coated layer; and
hardening the coating layer by a cross-linking reaction.

2. An ink jet recording method according to claim 1, wherein the hydrophobic dye contains at least one kind of compound selected from the group consisting of compounds represented by the following general formula (I), compounds represented by the following general formula (II), compounds represented by the following general formula (Y-I), compounds represented by the following general formula (M-I) and compounds represented by the following general formula (C-I):

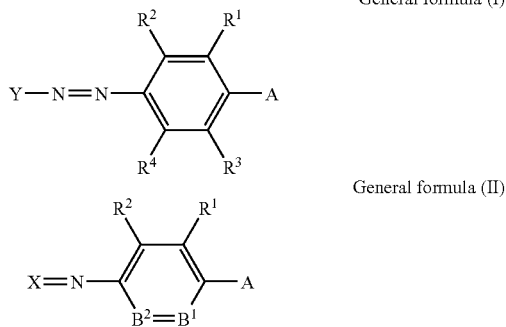

General formula (I)

General formula (II)

wherein, in General formula (I) and General formula (II), $R^1$, $R^2$, $R^3$ and $R^4$ each independently represent a hydrogen atom, a halogen atom, an aliphatic group, an aromatic group, a heterocyclic group, a cyano group, a hydroxy group, a nitro group, an amino group, an alkylamino group, an alkoxy group, an aryloxy group, an amide group, an arylamino group, a ureide group, a sulfamoylamino group, an alkylthio group, an arylthio group, an alkoxycarbonylamino group, a sulfoneamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphoryl group, an acyl group, a carboxyl group, or a sulfo group; A represents —NR$^5$R$^6$ or a hydroxyl group; R$^5$ and R$^6$ each independently represent a hydrogen atom, an aliphatic group, an aromatic group or a heterocyclic group; R$^5$ and R$^6$ may mutually bond to form a ring; B$^1$ represents =C(R$^3$)— or =N—; B$^2$ represents —C(R$^4$)= or —N=; and R$^1$ and R$^5$, R$^3$ and R$^6$ may mutually bond to form an aromatic ring or a heterocyclic ring, and/or R$^1$ and R$^2$ may mutually bond to form an aromatic ring or a heterocyclic ring, General formula (Y-I)

A-N=N—B wherein, in General formula (Y-I), A and B each independently represent an optionally substituted heterocyclic group,

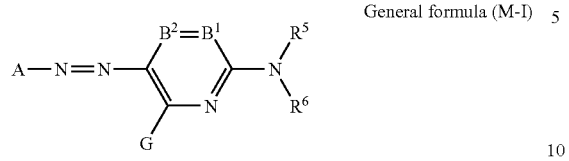

General formula (M-I)

wherein, in General formula (M-I), A represents a moiety of a 5-membered heterocyclic diazo component (A-NH$_2$); B$^1$ represents =CR$^1$— and B$^2$ represents —CR$^2$=, or alternatively, one of B$^1$ and B$^2$ represents a nitrogen atom and the other represents =CR$^1$— or —CR$^2$=; R$^5$ and R$^6$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, each of which may further have a substituent; G, R$^1$ and R$^2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxyl group, a heterocyclic oxy group, an alkoxycarbonyloxy group, an aryloxycarbonyloxy group, an amino group substituted with an alkyl group, an aryl group or a heterocyclic group, an acylamino group, a ureide group, a sulfamoylamino group, an alkoxycarbonylamino group, an aryloxycarbonylamino group, an alkylarylsulfonylamino group, an arylsulfonylamino group, an aryloxycarbonylamino group, a nitro group, an alkylthio group, an arylthio group, an alkylsulfonyl group, an arylsulfonyl group, an alkylsulfinyl group, an arylsulfinyl group, a sulfamoyl group, a sulfo group, or a heterocyclic thio group, each of which may further be substituted; and R$^1$ and R$^5$, or R$^5$ and R$^6$ may bond to form a 5 or 6-membered ring, General formula (C-I)

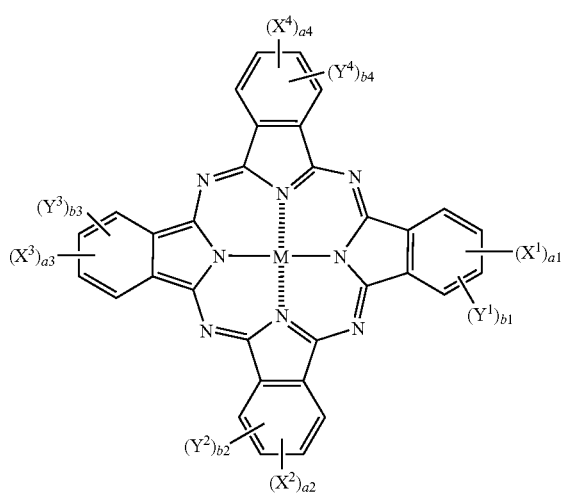

wherein, in General formula (C-I), X$^1$, X$^2$, X$^3$ and X$^4$ each independently represent —SO-Z$^1$, —SO$_2$-Z$^1$ or —SO$_2$NR$^{21}$R$^{22}$; Z$^1$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; R$^{21}$ and R$^{22}$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; Y$^1$, Y$^2$, Y$^3$ and Y$^4$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureide group, a sulfamoylamino group, an alkylthio group, an arylthio group, an alkoxycarbonylamino group, a sulfoneamide group, a carbamoyl group, a sulfamoyl group, a sulfonyl group, an alkoxycarbonyl group, a heterocyclic oxy group, an azo group, an acyloxy group, a carbamoyloxyl group, a silyloxy group, an aryloxycarbonyl group, an aryloxycarbonylamino group, an imide group, a heterocylic thio group, a phosphoryl group, an acyl group, a carbonyl group, or a sulfo group, each of which may further have a substituent; a$^1$ to a$^4$ and b$^1$ to b$^4$ represent the numbers of substituents X$^1$ to X$^4$ and Y$^1$ to Y$^4$, respectively; a$^1$ to a$^4$ each independently represent an integer of 0 to 4; b$^1$ to b$^4$ each independently represent an integer of 0 to 4; the sum of a$^1$ to a$^4$ is 2 or more; when any one of a$^1$ to a$^4$ and b$^1$ to b$^4$ represent an integer of 2 or more, a corresponding plurality of any one of X$^1$ to X$^4$ and Y$^1$ to Y$^4$ may be the same or different; a$^1$ and b$^1$ each independently represent an integer of 0 to 4 satisfying the relation of a$^1$+b$^1$=4; a$^2$ and b$^2$ each independently represent an integer of 0 to 4 satisfying the relation of a$^2$+b$^2$=4; a$^3$ and b$^3$ each independently represent an integer of 0 to 4 satisfying the relation of a$^3$+b$^3$=4; a$^4$ and b$^4$ each independently represent an integer of 0 to 4 satisfying the relation of a$^4$+b$^4$=4; and M represents a hydrogen atom, a metal element or its oxide, hydroxide, or halide.

3. An ink jet recording method according to claim 1, wherein the organic solvent having a high boiling point is an organic solvent having a water solubility of 4 g or less.

4. An ink jet recording method according to claim 1, wherein the void volume A of the colorant receiving layer at the same void diameter as the particle size of the polymer fine particles is 50 (×10$^{-5}$ml/cm$^2$) or more.

5. An ink jet recording method according to claim 1, wherein a ratio {(Y/X)×100%} of a void diameter Y (nm) corresponding to a maximum peak of the void volume of the colorant receiving layer obtained from a pore distribution curve by a nitrogen gas adsorption method, to the particle size X (nm) of the polymer fine particles is 65% or more.

6. An ink jet recording method according to claim 1, wherein the porous structure of the colorant receiving layer is formed of secondary particles of the polymer fine particles.

7. An ink jet recording method according to claim 2, wherein the porous structure of the colorant receiving layer is formed of secondary particles of the polymer fine particles.

8. An ink jet recording method according to claim 3, wherein the porous structure of the colorant receiving layer is formed of secondary particles of the polymer fine particles.

9. An ink jet recording method according to claim 4, wherein the porous structure of the colorant receiving layer is formed of secondary particles of the polymer fine particles.

10. An ink jet recording method according to claim 5, wherein the porous structure of the colorant receiving layer is formed of secondary particles of the polymer fine particles.

11. An ink jet recording method according to claim 6, wherein a void diameter Y corresponding to a maximum peak of a void volume formed by the secondary particles of polymer fine particles of the colorant receiving layer obtained from a pore distribution curve by a nitrogen gas adsorption method is 33 nm or more.

12. An ink jet recording method according to claim 7, wherein a void diameter Y corresponding to a maximum peak of a void volume formed by the secondary particles of polymer fine particles of the colorant receiving layer obtained from a pore distribution curve by a nitrogen gas adsorption method is 33 nm or more.

13. An ink jet recording method according to claim 8, wherein a void diameter Y corresponding to a maximum peak of a void volume formed by the secondary particles of polymer fine particles of the colorant receiving layer obtained from a pore distribution curve by a nitrogen gas adsorption method is 33 nm or more.

14. An ink jet recording method according to claim 9, wherein a void diameter Y corresponding to a maximum peak of a void volume formed by the secondary particles of polymer fine particles of the colorant receiving layer obtained from a pore distribution curve by a nitrogen gas adsorption method is 33 nm or more.

15. An ink jet recording method according to claim 10, wherein a void diameter Y corresponding to a maximum peak of a void volume formed by the secondary particles of polymer fine particles of the colorant receiving layer obtained from a pore distribution curve by a nitrogen gas adsorption method is 33 nm or more.

16. An ink jet recording method according to claim 1, wherein the organic polymer fine particles are a (co)polymer of a vinyl monomer, an ester-based polymer, a urethane-based polymer, an amide-based polymer, an epoxy-based polymer or an amide-based polymer, or modified materials or copolymers thereof.

17. An ink jet recording method according to claim 1, wherein the cross-linking agent is used in an amount of 1 to 50% by mass relative to the water-soluble resin.

* * * * *